US008700505B2

(12) United States Patent
McCrea

(10) Patent No.: US 8,700,505 B2
(45) Date of Patent: Apr. 15, 2014

(54) SYSTEM AND METHOD FOR IMPROVED TIME REPORTING AND BILLING

(75) Inventor: Frank McCrea, Toronto (CA)

(73) Assignee: Keal, Inc. (CA)

( * ) Notice: Subject to any disclaimer, the term of this patent is extended or adjusted under 35 U.S.C. 154(b) by 1877 days.

(21) Appl. No.: 11/514,203

(22) Filed: Sep. 1, 2006

(65) Prior Publication Data

US 2007/0094110 A1 Apr. 26, 2007

Related U.S. Application Data

(63) Continuation of application No. 10/862,762, filed on Jun. 7, 2004.

(51) Int. Cl.
*G07F 19/00* (2006.01)

(52) U.S. Cl.
USPC .......... 705/34; 705/8

(58) Field of Classification Search
USPC .......... 705/34
See application file for complete search history.

(56) References Cited

U.S. PATENT DOCUMENTS

| | | | | |
|---|---|---|---|---|
| 6,574,605 | B1 * | 6/2003 | Sanders et al. | 705/7.26 |
| 7,117,162 | B1 * | 10/2006 | Seal et al. | 705/7.15 |
| 2002/0165749 | A1 | 11/2002 | Northcutt et al. | |
| 2003/0033167 | A1 * | 2/2003 | Arroyo et al. | 705/1 |
| 2005/0197913 | A1 * | 9/2005 | Grendel et al. | 705/26 |
| 2007/0094110 | A1 | 4/2007 | McCrea | |
| 2008/0120152 | A1 | 5/2008 | McCrea | |

OTHER PUBLICATIONS

U.S. Appl. No. 12/318,605, filed Dec. 31, 2008.
www.brainhunter.com see attached excerpts.
www.teksystems.com see attached excerpts.
www.taleo.com.
www.beeline.com.
www.procurestaff.com.
www.iqnavigator.com see attached excerpts.
www.cncglobal.com see attached excerpts.
U.S. Appl. No. 10/862,762, filed Jun. 7, 2004.
Office Action dated Mar. 18, 2009 issued on U.S. Appl. No. 10/862,762.

* cited by examiner

*Primary Examiner* — Garcia Ade
(74) *Attorney, Agent, or Firm* — Merek, Blackmon & Voorhees, LLC

(57) ABSTRACT

The present invention provides an integrated time reporting and billing solution that facilitates billing and payment for time-related activities and manages contract workflow from end to end. The present invention can be employed in any industry for any employment relationship where in-house or supplemental contract labor is tracked by time. In one embodiment, the invention includes a contractor submission and tracking system (CSTS) and back office workflow management system (BOSS) to track and report vendor activity and contractor spend. The present invention can be used by employer-clients, contractors and contractor suppliers to facilitate contractor requisition, contract creation and modification, document tracking, business rule implementation, reporting, communications, timesheet entry, timesheet approval, and billing presentment, payment and other aspects of contract workflow management.

22 Claims, 68 Drawing Sheets

10
20
12
Access/Login
22
Candidate Submission (CSTS)
Invoice/ Billing
Contract Details (CDI)
Document Tracking (DTS)
Timesheet
Vendor
16
Client
14
29
24
26
28
18
Timekeeper 10
12
Access/Login
20
Candidate Submission (CSTS)
22
Contract Details (CDI)
24
Document Tracking (DTS)
26
Timesheet
28
Invoice/ Billing
29
Vendor
16
Timekeeper
18
Client
14

19
76
60
246
Time-
sheet
info
Records
16
Reports
Tables
E-mail
backup
62
243
247
13

Fig. 5
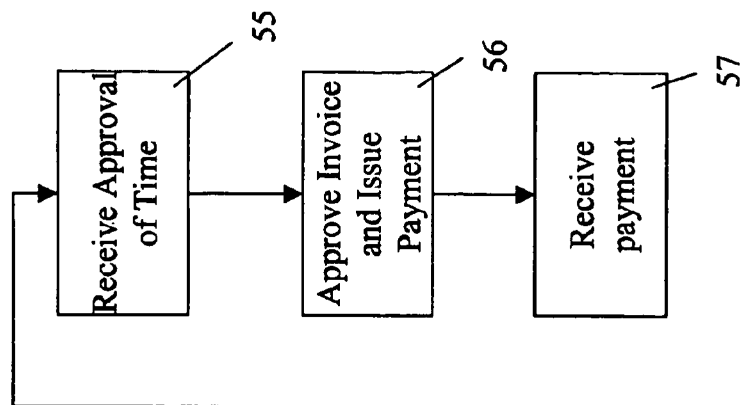
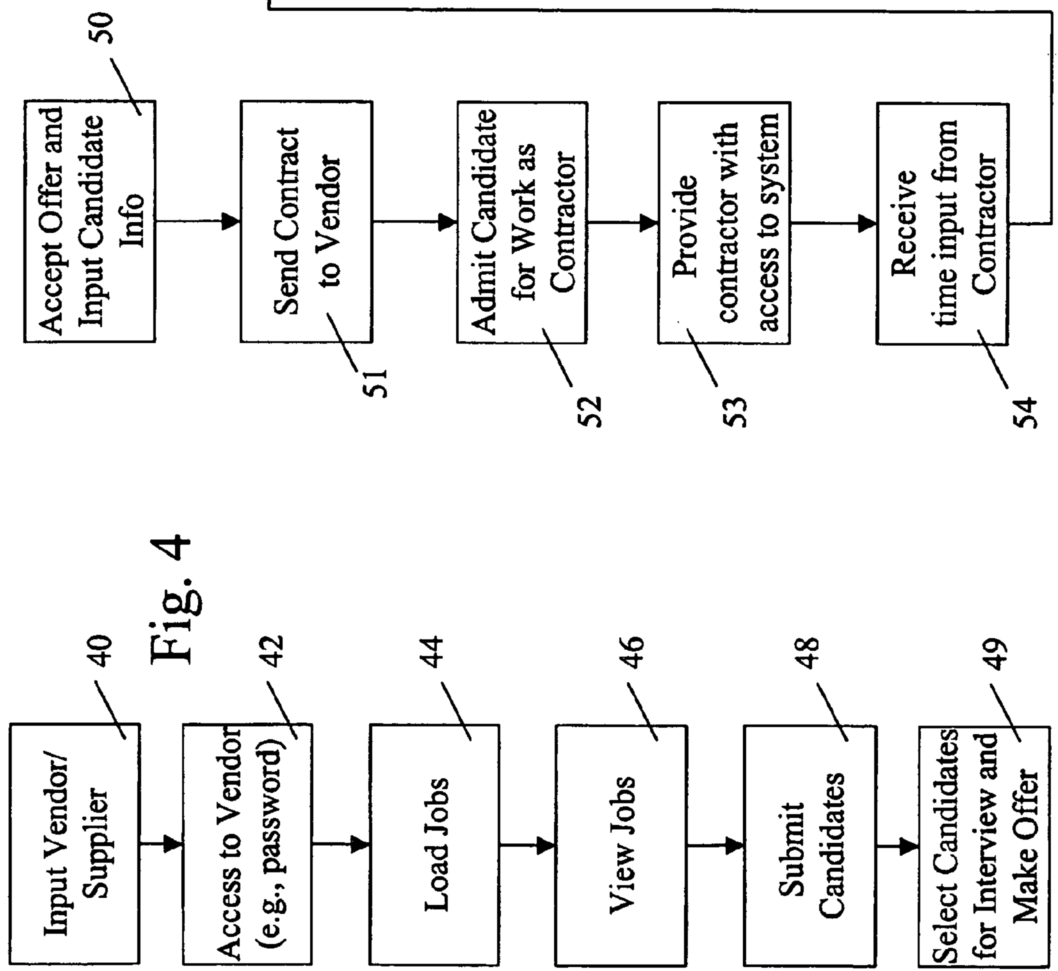
Fig. 4

28
Time Sheet
26
DTS
42
SIS data
45
Individual Invoices
48
Consolidated Invoice Data
47
Consolidated Report
46
Client
14
Client Approval
41
43

Time Input
70
Client Time Reporting System
71
Time Sheet Details
72
12
Billing
29
Time Detail
74
SIS
76
16
14

Time Sheet System
28
Invoice billing system
29
SIS
76
Supplier Bank EFT
89
Paychex
80
Direct Deposit
81
EDI Interface
82
Client specs.
83
Outstanding cheques
98
accounting
86
Commissions sub system
84
Commission statements
85
EFT/ Bank deposits
89
Automated Cheque Reconcil-iation
88
Bank
87

Figure 16:
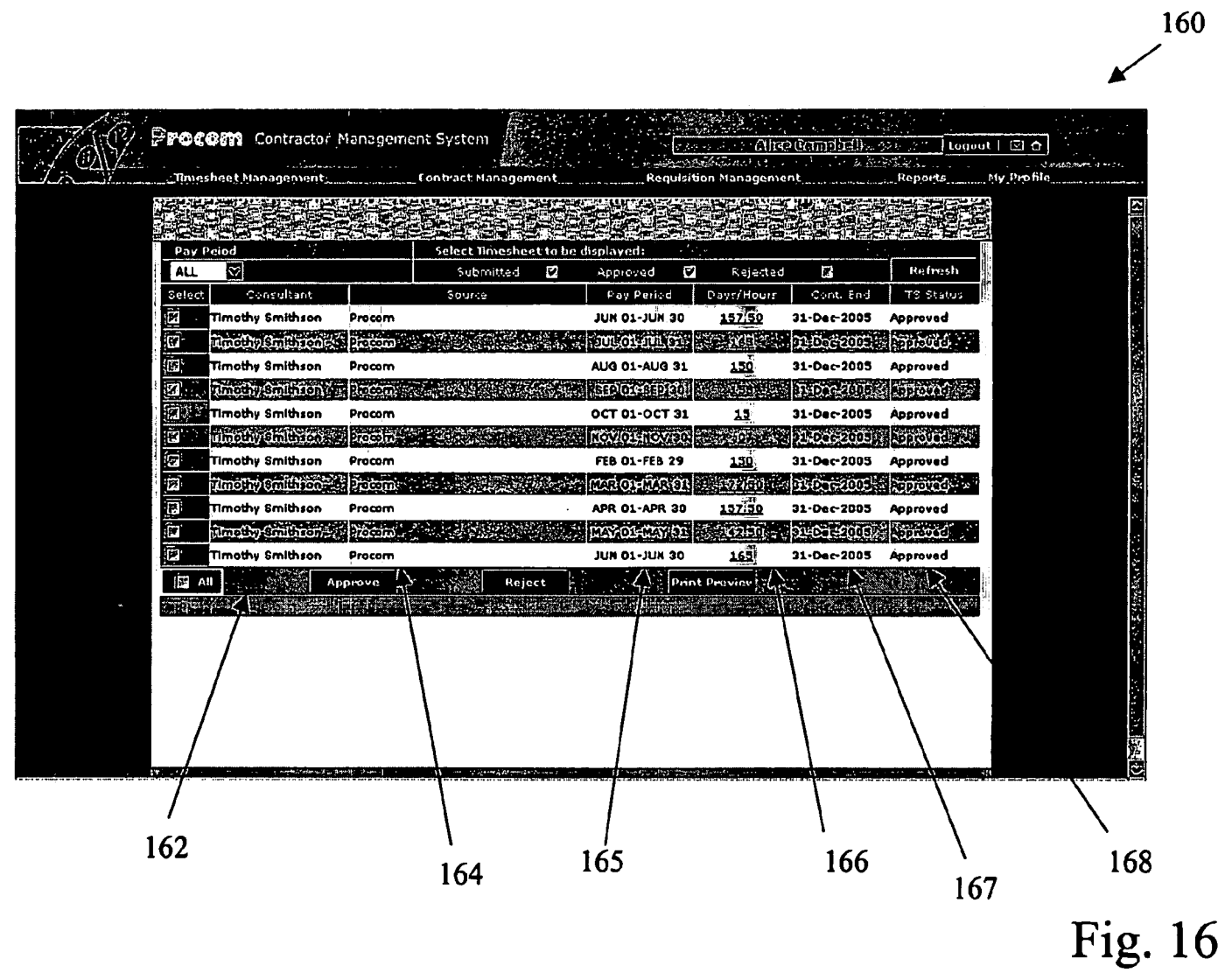

Procom STATEMENT OF WORK COMPLETED TID:103058

TIME PERIOD: Jun 1, 2003 to Jun 30, 2003 For: Timothy Smithson

TIMESHEET FOR CLIENT : ABC Company Ltd.

| Timesheet Approved | | | | | | | | |
|---|---|---|---|---|---|---|---|---|
| | SUN | MON | TUE | WED | THU | FRI | SAT | WEEKLY TOTAL |
| Week #23 | Jun 1 | Jun 2 | Jun 3 | Jun 4 | Jun 5 | Jun 6 | Jun 7 | |
| Regular Hours | | 7.50 | 7.50 | 7.50 | 7.50 | 7.50 | | 37.50 |
| Week #24 | Jun 8 | Jun 9 | Jun 10 | Jun 11 | Jun 12 | Jun 13 | Jun 14 | |
| Regular Hours | | 7.50 | 7.50 | 7.50 | 7.50 | 7.50 | | 37.50 |
| Week #25 | Jun 15 | Jun 16 | Jun 17 | Jun 18 | Jun 19 | Jun 20 | Jun 21 | |
| Regular Hours | | 7.50 | 7.50 | 7.50 | 7.50 | 7.50 | | 37.50 |
| Week #26 | Jun 22 | Jun 23 | Jun 24 | Jun 25 | Jun 26 | Jun 27 | Jun 28 | |
| Regular Hours | | 7.50 | 7.50 | 7.50 | 7.50 | 7.50 | | 37.50 |
| Week #27 | Jun 29 | Jun 30 | | | | | | |
| Regular Hours | | 7.50 | | | | | | 7.50 |
| | | | | | | | Total | 157.50 |

CONSULTANT SIGNATURE: ______________________

*AS THE AUTHORIZED CLIENT REPRESENTATIVE, I HEREBY ACKNOWLEDGE THAT THE ABOVE MENTIONED CONSULTANT HAS WORKED THE NUMBER OF HOURS INDICATED, THAT I HAVE VERIFIED THE WORK AND THAT I AM SATISFIED WITH THE QUALITY THEREOF. EN TANT QUE REPRÉSENTANT AUTORISÉ DU CLIENT, JE RECONNAIS PAR CECI QUE LE CONSEILLER MENTIONNÉ CI-DESSUS A TRAVAILLÉ LE NOMBRE D'HEURES INDIQUÉES, QUE J'AI VÉRIFIÉ LE TRAVAIL ET QUE J'EN SUIS SATISFAIT DE LA QUALITÉ.

CLIENT SIGNATURE: Approved Online On Mar 23, 2004 04:28 PM by Alice Campbell

PLEASE FAX YOUR SIGNED TIMESHEET TO:

240
242
Frocom Contractor Management System
Timesheet Management
Contract Management
Requisition Management
Reports
My Profile
Logout
Required Skills - Microsoft Internet Explorer
Required Skills:
Level
Role
Platform
Skill 1
Skill 2
Skill 3
Senior
DBA
UNIX
Maintenance
Help Desk
Migration
Other
Other
Other
Other
Other
Other

270

272

290
292
293
294
295
296
297
298
299
Contractor Management System
Timesheet Management
Contract Management
Requisition Management
Reports
My Profile
Logout
New Job Requisition
Job Info:
Contract
Full Time
Position Title
Start Date
Duration
Location
Billing Rate
Job Description
Mandatory Skills
Skill
Yrs Exp
Add Another Mandatory Skill

Figure 40:
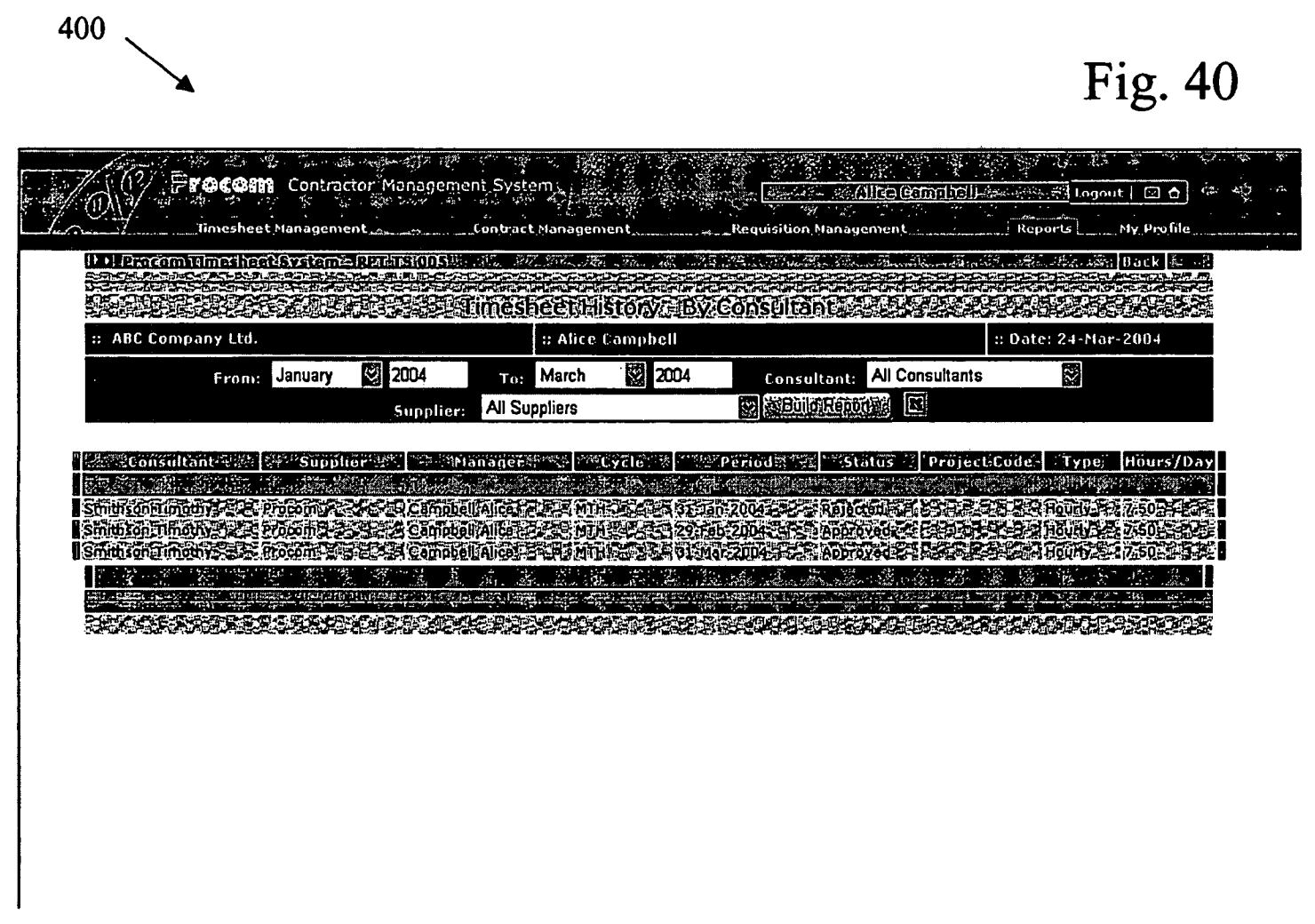

Procom Contractor Management System

Alice Campbell | Logout

Timesheet Management | Contract Management | Requisition Management | Reports | My Profile Procom Timesheet System - RPT-TS005 | Back Timesheet History - By Consultant :: ABC Company Ltd. | :: Alice Campbell | :: Date: 24-Mar-2004

From: January 2004 To: March 2004 Consultant: All Consultants

Supplier: All Suppliers | Build Report

| Consultant | Supplier | Manager | Cycle | Period | Status | Project Code | Type | Hours/Day |
|---|---|---|---|---|---|---|---|---|
| Smithson Timothy | Procom | Campbell Alice | MTH | 31-Jan-2004 | Rejected | | Hourly | 7.50 |
| Smithson Timothy | Procom | Campbell Alice | MTH | 29-Feb-2004 | Approved | | Hourly | 7.50 |
| Smithson Timothy | Procom | Campbell Alice | MTH | 01-Mar-2004 | Approved | | Hourly | 7.50 |

Figure 42:
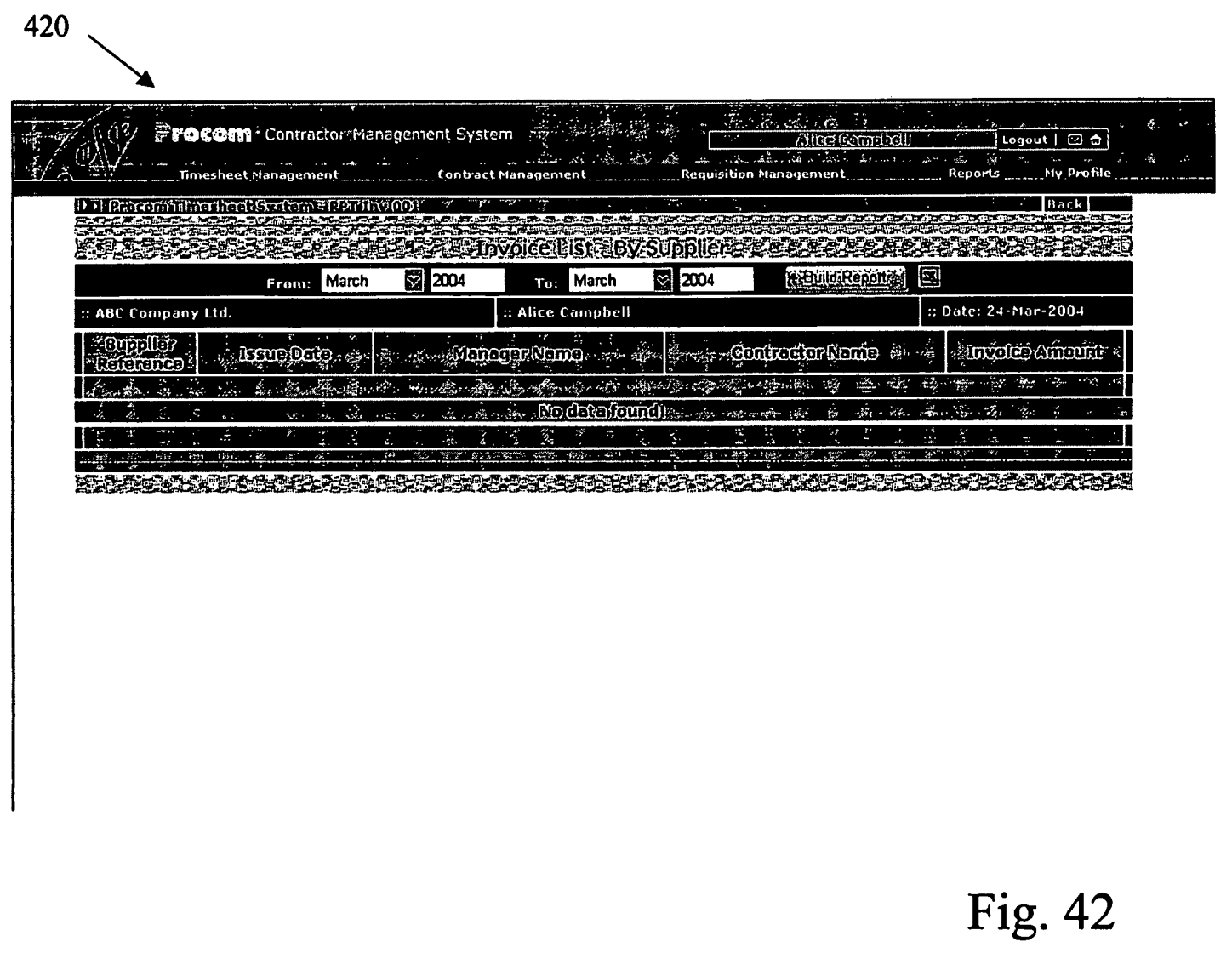

420

Procom Contractor Management System

Alice Campbell

Logout | ✉ ⌂

Timesheet Management Contract Management Requisition Management Reports My Profile Procom Timesheet System :: PRTIN7007

Back

Invoice List - By Supplier

From: March 2004 To: March 2004 Build Report

:: ABC Company Ltd. :: Alice Campbell :: Date: 24-Mar-2004

| Supplier Reference | Issue Date | Manager Name | Contractor Name | Invoice Amount |
|---|---|---|---|---|
| No data found! | | | | |

470
471
472
473
474
475
476
Contractor Management System
Timesheet Management
Contract Management
Requisition Management
Reports
My Profile
About Us
Logout
Candidate Submission
Status: New
First Name:
Last Name:
Job Number:
20: software developer
Supplier:
Procom
Availability:
Rate:
:: Skills Summary
Skill
Yrs Exp.
Add Another Skill
:: Comments

Figure 55:
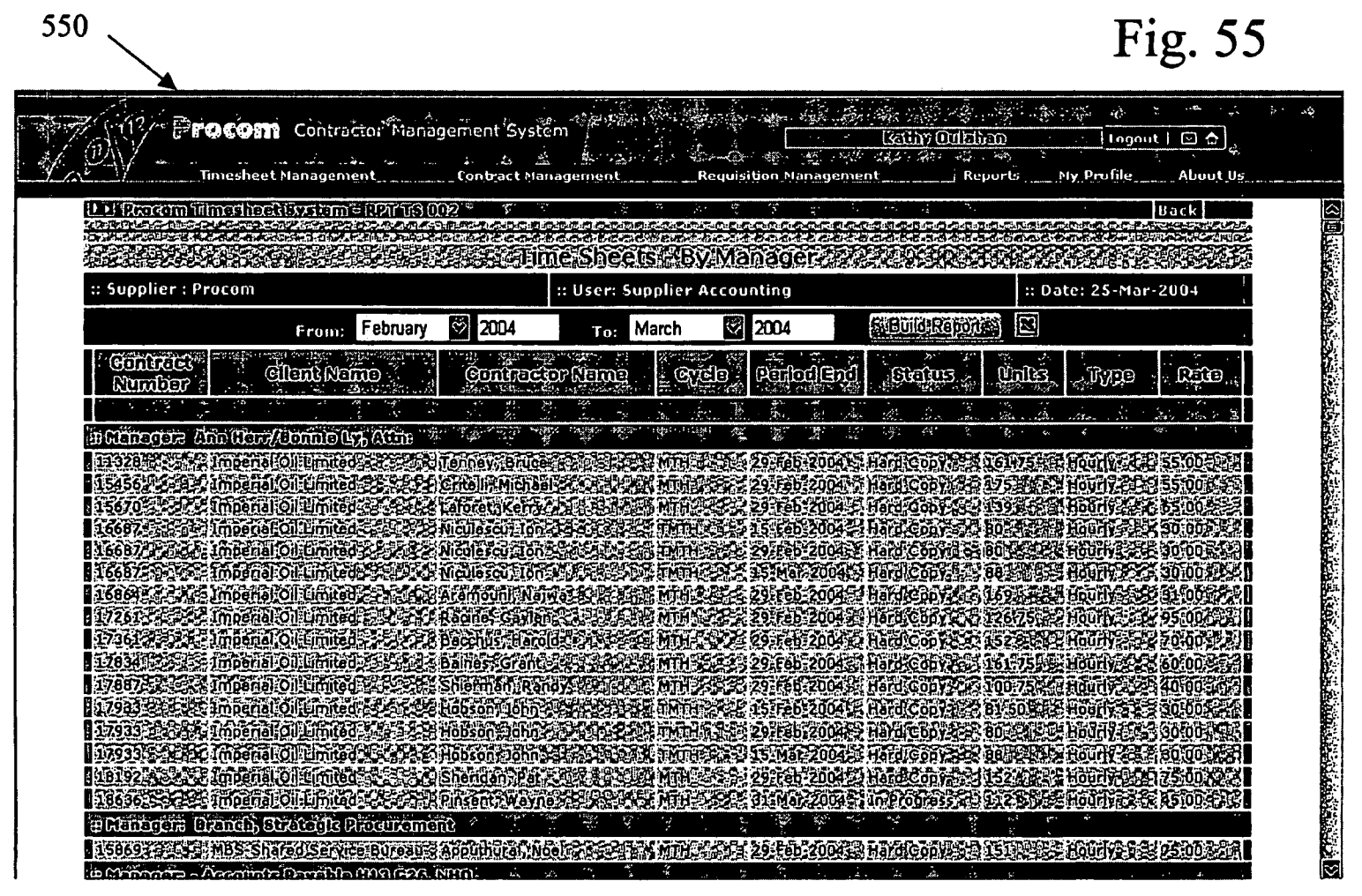

Procom Contractor Management System

Kathy Oulahan | Logout

Timesheet Management | Contract Management | Requisition Management | Reports | My Profile | About Us Procom Timesheet System - RPT TS 002 | Back

Time Sheets - By Manager

:: Supplier : Procom | :: User: Supplier Accounting | :: Date: 25-Mar-2004

From: February 2004 To: March 2004 Build Report

| Contract Number | Client Name | Contractor Name | Cycle | Period End | Status | Units | Type | Rate |
|---|---|---|---|---|---|---|---|---|
| :: Manager: Ann Herr/Bonnie Ly, Attn: | | | | | | | | |
| 11328 | Imperial Oil Limited | Tenney, Bruce | MTH | 29-Feb-2004 | Hard Copy | 161.75 | Hourly | 55.00 |
| 15456 | Imperial Oil Limited | Critelli, Michael | MTH | 29-Feb-2004 | Hard Copy | 175 | Hourly | 55.00 |
| 15670 | Imperial Oil Limited | Laforet, Kerry | MTH | 29-Feb-2004 | Hard Copy | 139 | Hourly | 65.00 |
| 16687 | Imperial Oil Limited | Niculescu, Ion | TMTH | 15-Feb-2004 | Hard Copy | 80 | Hourly | 30.00 |
| 16687 | Imperial Oil Limited | Niculescu, Ion | TMTH | 29-Feb-2004 | Hard Copy | 80 | Hourly | 30.00 |
| 16687 | Imperial Oil Limited | Niculescu, Ion | TMTH | 15-Mar-2004 | Hard Copy | 88 | Hourly | 30.00 |
| 16864 | Imperial Oil Limited | Aramouni, Najwa | MTH | 29-Feb-2004 | Hard Copy | 169 | Hourly | 31.00 |
| 17261 | Imperial Oil Limited | Racine, Gaylan | MTH | 29-Feb-2004 | Hard Copy | 126.75 | Hourly | 95.00 |
| 17361 | Imperial Oil Limited | Bacchus, Harold | MTH | 29-Feb-2004 | Hard Copy | 152 | Hourly | 70.00 |
| 17834 | Imperial Oil Limited | Baines, Grant | MTH | 29-Feb-2004 | Hard Copy | 161.75 | Hourly | 60.00 |
| 17887 | Imperial Oil Limited | Shierman, Randy | MTH | 29-Feb-2004 | Hard Copy | 100.75 | Hourly | 40.00 |
| 17933 | Imperial Oil Limited | Hobson, John | TMTH | 15-Feb-2004 | Hard Copy | 81.50 | Hourly | 30.00 |
| 17933 | Imperial Oil Limited | Hobson, John | TMTH | 29-Feb-2004 | Hard Copy | 80 | Hourly | 30.00 |
| 17933 | Imperial Oil Limited | Hobson, John | TMTH | 15-Mar-2004 | Hard Copy | 88 | Hourly | 30.00 |
| 18192 | Imperial Oil Limited | Sheridan, Pat | MTH | 29-Feb-2004 | Hard Copy | 152 | Hourly | 75.00 |
| 18636 | Imperial Oil Limited | Pinsent, Wayne | MTH | 31-Mar-2004 | In Progress | 112.5 | Hourly | 45.00 |
| :: Manager: Branch, Strategic Procurement | | | | | | | | |
| 15869 | MBS Shared Service Bureau | Apputhurai, Noel | MTH | 29-Feb-2004 | Hard Copy | 151 | Hourly | 25.00 |
| :: Manager: - Accounts Payable H13 C26, NHQ | | | | | | | | |

Figure 57:
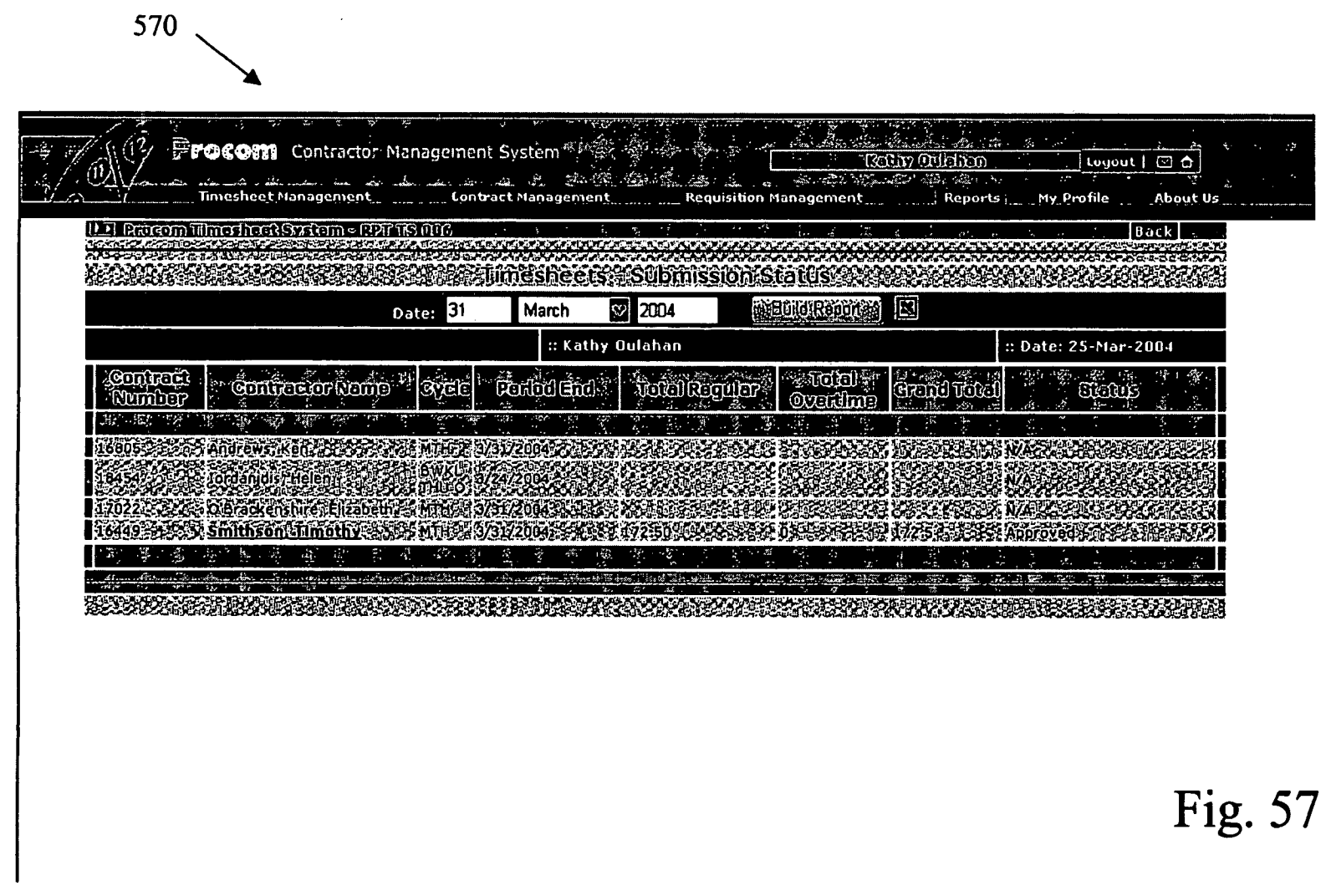

570

Procom Contractor Management System

Kathy Oulahan | Logout |

Timesheet Management | Contract Management | Requisition Management | Reports | My Profile | About Us Procom Timesheet System - RPT TS 006 | Back Timesheets - Submission Status Date: 31 March 2004 Build Report :: Kathy Oulahan :: Date: 25-Mar-2004

| Contract Number | Contractor Name | Cycle | Period End | Total Regular | Total Overtime | Grand Total | Status |
|---|---|---|---|---|---|---|---|
| 16805 | Andrews, Ken | MTH | 3/31/2004 | [illegible] | [illegible] | [illegible] | N/A |
| 18454 | Iordanidis, Helen | BWKL THU-0 | 3/24/2004 | [illegible] | [illegible] | [illegible] | N/A |
| 17022 | O Brackenshire, Elizabeth | MTH | 3/31/2004 | [illegible] | [illegible] | [illegible] | N/A |
| 16449 | Smithson, Timothy | MTH | 3/31/2004 | 172.50 | 0 | 172.5 | Approved |

Figure 59:
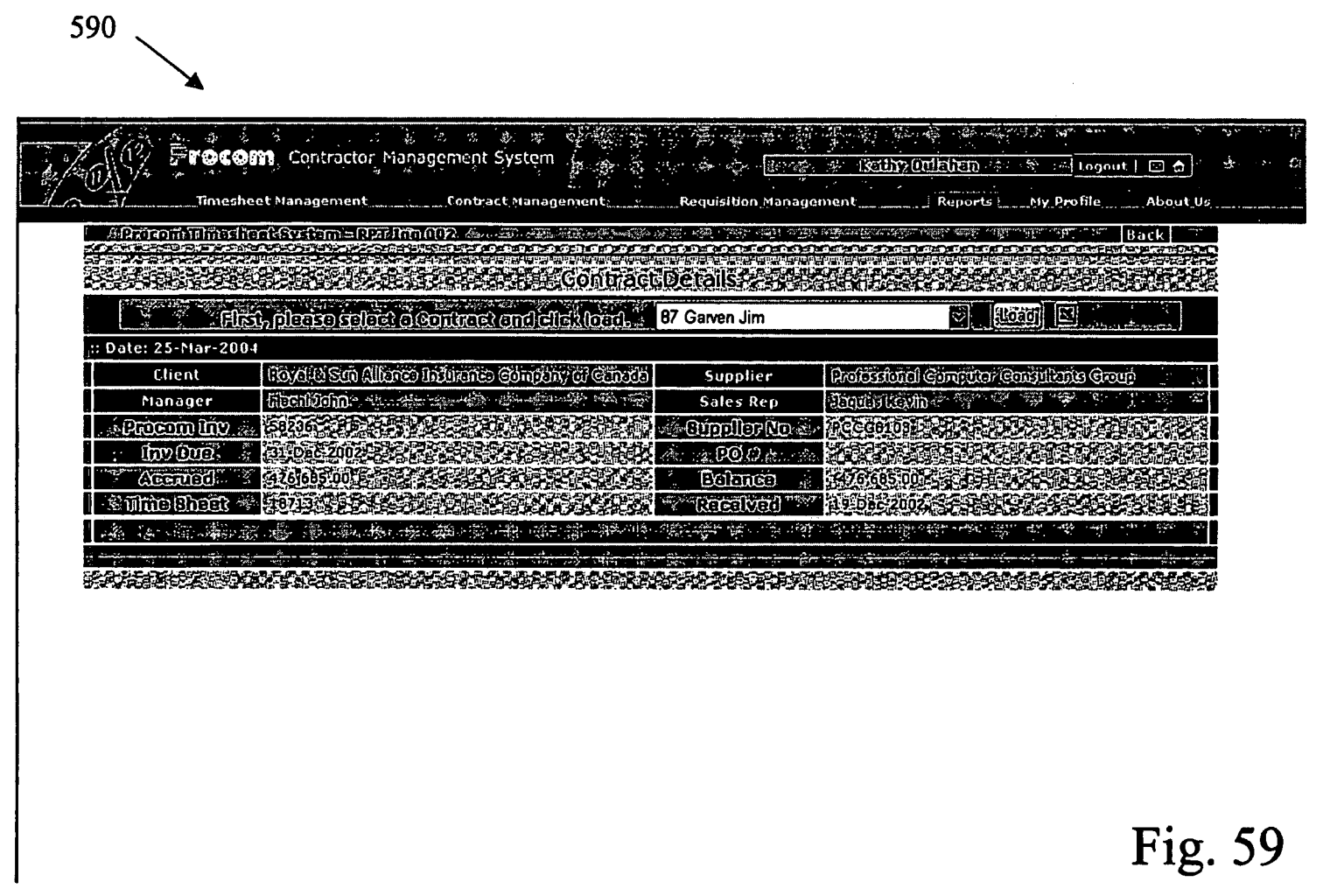

Procom Contractor Management System

Kathy Oulahan | Logout

Timesheet Management | Contract Management | Requisition Management | Reports | My Profile | About Us Procom Timesheet System - RPT.Inv.002 | Back Contract Details First, please select a Contract and click load. 87 Garven Jim | Load :: Date: 25-Mar-2004

| Client | Royal & Sun Alliance Insurance Company of Canada | Supplier | Professional Computer Consultants Group |
|---|---|---|---|
| Manager | Flechi John | Sales Rep | Jaquis Kevin |
| Procom Inv | 58236 | Supplier No | PCCG6109 |
| Inv Due | 31-Dec-2002 | PO # | |
| Accrued | 476,685.00 | Balance | 476,685.00 |
| Time Sheet | 18713 | Received | 19-Dec-2002 |

Figure 63:
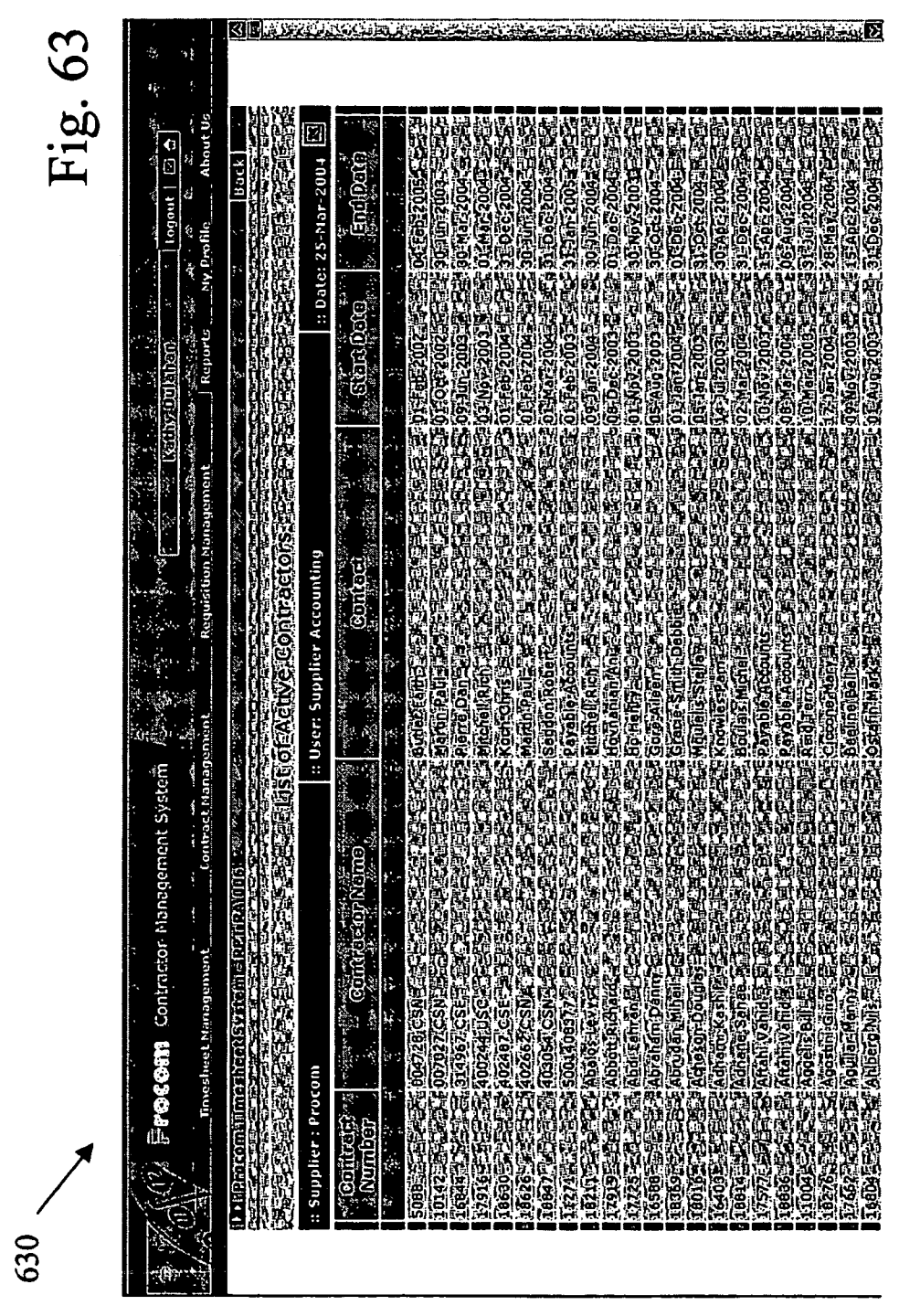

Procom Contractor Management System

Kathy Dulkahan | Logout |

Timesheet Management | Contract Management | Requisition Management | Reports | My Profile | About Us :: Procom Timesheet System - RPTRA006 | Back List of Active Contractors :: Supplier : Procom | :: User: Supplier Accounting | :: Date: 25-Mar-2004

| Contract Number | Contractor Name | Contact | Start Date | End Date |
|---|---|---|---|---|
| 5088 | 004728 CSN | Butler Earth | 01-Feb-2002 | 04-Feb-2005 |
| 10142 | 007027 CSN | Martin Paul | 01-Oct-2002 | 30-Jun-2003 |
| 16844 | 314967 CSE | Pierre Dan | 09-Jun-2003 | 30-Mar-2004 |
| 17916 | 400244 USC | Mitchell Rich | 03-Nov-2003 | 01-Mar-2004 |
| 18630 | 402487 CSE | Koch Chris | 01-Feb-2004 | 31-Dec-2004 |
| 18626 | 402662 CSN | Martin Paul | 01-Feb-2004 | 30-Jun-2004 |
| 18847 | 403054 CSN | Seddon Robert | 01-Mar-2004 | 31-Dec-2004 |
| 11271 | 5001408377 | Payable Accounts | 01-Feb-2003 | 31-Jan-2005 |
| 18211 | Abalos Levy | Mitchell Rich | 09-Jan-2004 | 30-Jun-2004 |
| 17919 | Abbott Richard | Hovnanian Ani | 08-Dec-2003 | 01-Dec-2004 |
| 17725 | Abdi Eahran | Ho Henry | 01-Nov-2003 | 30-Nov-2003 |
| 16588 | Abraham Danny | Gore Aileen | 05-Aug-2003 | 30-Oct-2004 |
| 18369 | Abrudan Mihail | Gracie-Smith Debbie | 01-Jan-2004 | 01-Dec-2004 |
| 18016 | Acheson Douglas | Moulelis Stella | 05-Jan-2003 | 31-Oct-2004 |
| 16403 | Adhami Kashif | Knowles Pam | 14-Jul-2003 | 30-Apr-2004 |
| 18814 | Adnane Sahae | Boulais Michel | 02-Mar-2004 | 31-Dec-2004 |
| 17577 | Aftahi Vahid | Payable Accounts | 10-Nov-2003 | 15-Apr-2004 |
| 18836 | Aftahi Vahid | Payable Accounts | 08-Mar-2004 | 06-Aug-2004 |
| 11004 | Aggelis Bill | Reid Terri | 10-Mar-2003 | 31-Jul-2004 |
| 18276 | Agostini Gino | Ciccone Mary | 17-Jan-2004 | 28-May-2004 |
| 17662 | Aguilar Menny | Baeline Bell | 09-Nov-2003 | 15-Apr-2004 |
| 18804 | Ahlberg Nils | Ostafin Mark | 01-Aug-2003 | 31-Dec-2004 |

SYSTEM AND METHOD FOR IMPROVED TIME REPORTING AND BILLING

RELATED APPLICATIONS

The subject patent application is a continuation of U.S. patent application Ser. No. 10/862,762 filed on Jun. 7, 2004, the entire contents of which is incorporated herein by reference.

FIELD OF THE INVENTION

The present invention relates to time reporting and billing, and more particularly to an integrated time reporting and billing solution that facilitates billing and payment for time-related activities and manages contract workflow from end to end.

BACKGROUND OF THE RELATED ART

Manual time sheet and billing systems are well-known in the services industries as a way for service providers to record time spent on a work activity and thereafter be paid for the work. In a typical example, a contractor may submit to a potential client an estimate of the cost for a particular job in terms of time and materials. If the client reaches agreement with the contractor on the terms, the contractor's time can be recorded so that the client can review and approve the time spent by the contractor in performing the work. Typically, the contractor will write or type onto a timesheet the amount of time the contractor has worked over the course of the contract, usually on a per time unit basis (e.g., hours per day). Depending upon the length of the contract, the contractor might regularly submit aggregated time sheets covering a pre-determined period (e.g., one month) to the client for approval and payment. If the client approves the time spent by the contractor, the contractor can then draw up an invoice to provide to the client for payment.

While many variations to the above-described scenario exist, there are many common deficiencies inherent in the general procedures currently used to record and submit time sheets for approval and subsequent billing. For example, if a worker works extra hours on a given day or works on a holiday, overtime pay may be required. Additionally, if a worker's time entries are inaccurate, not signed, or not approved by the client, billing and payment for the work can be delayed. Further, if multiple projects are being coordinated by a general contractor, individual time sheets must be pooled for each project, and then each of the projects must be pooled in order for the contractor or a vendor representing the contractor to approve and submit a bill for payment.

Attempts at automating time sheet and billing systems to date have not met with widespread success. What is needed is an automated, integrated time sheet and billing system which can (1) incorporate client, timekeeper (e.g., contractor) and contract details, (2) receive, record and track individual time entries per timekeeper, (3) communicate time sheets to clients for approval in a client-desired format, and (4) upon approval, automatically generate invoices for submission to the client for payment. In addition to the above, what is needed is a customizable solution to time recording and billing that can accommodate multiple billing cycles, multiple languages, multiple currencies as well as local employment practices and regulations.

SUMMARY OF THE PRESENT INVENTION

The present invention provides a system and method that improve upon past manual practices and processes of time reporting and billing. The present invention manages contract workflow from end to end, i.e., from requisition definition to payment ("req to check"). The present invention further streamlines the number of vendor contacts while allowing for maintenance of relationships through fair and open processes. The present invention further provides a consultant/contractor submission and tracking system (CSTS) and back office workflow management system (BOSS) to track and report vendor activity and contractor spend. The timesheet component of the present invention provides efficient management of the client/contractor interface for the provision of payrolling, invoicing, specialized reporting, tax payments and year end tax requirements, for example.

The present invention can be used in any industry or employment relationship where in-house labor is tracked by time and/or where supplemental contract labor is required. In one embodiment, the present invention employs a sophisticated on line time reporting system to enable contractors (e.g., timekeepers) to report their time. This system enables the contractor to report time worked at a project level. When the contractor submits a time sheet for approval, the component parts can be sent to the individual client managers to obtain their approval for their component projects. Upon receipt of the individual approvals, for each project component can be submitted to the client for payment.

BRIEF DESCRIPTION OF THE DRAWINGS

FIGS. 4 and 5 are flow charts illustrating sample steps in the candidate submission and time recordation and billing aspects, respectively, of one embodiment of the present invention.

FIGS. 15 through 44 are example screen interfaces showing aspects of a manager interface in accordance with the contractor management component of the present invention.

FIGS. 45 through 64 are example screen interfaces showing aspects of a supplier interface in accordance with the timekeeper management component of the present invention.

FIGS. 65 through 69 are example screen interfaces showing aspects of a consultant interface in connection with one embodiment of the present invention.

DETAILED DESCRIPTION OF THE PREFERRED EMBODIMENTS

Figure 1:
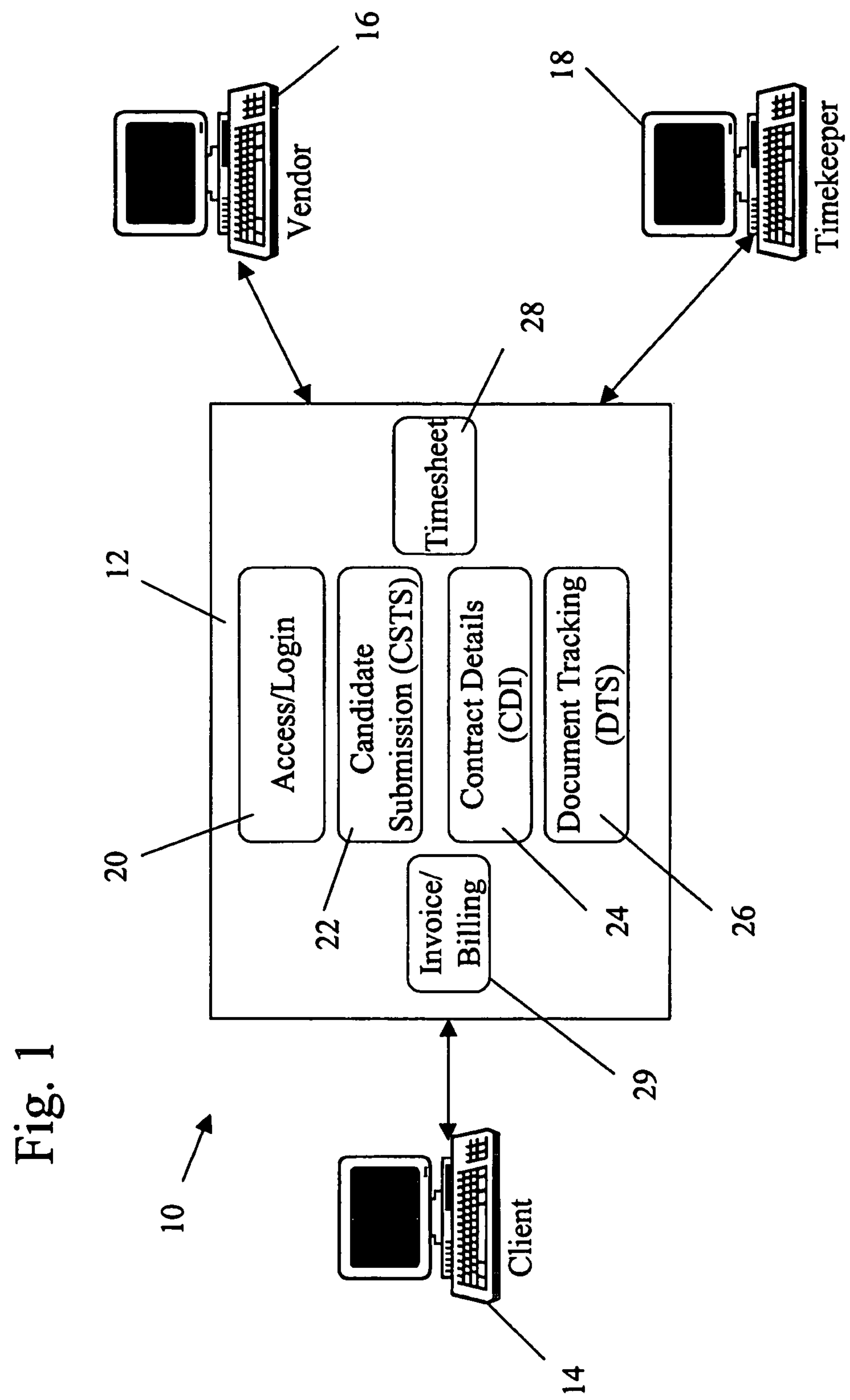
FIG. 1 is a schematic diagram illustrating the interaction of users with various components of the present invention.

As shown in FIG. 1, the system 10 of the present invention includes a management component 12 in two-way communication with at least one client 14, at least one vendor/ supplier 16 and at least one timekeeper 18. The term "client" in this context refers to an entity contracting with one or more workers to receive performance, typically in the form of specified services, from the one or more contractors performing the work. The present invention allows the client 14 to review, approve and monitor the time usage of their contractors. Purchasing and accounting departments, for example, can monitor and evaluate the entire contract performance process at any time. A "client manager" can be a client user of the systems and methods of the present invention. The term "vendor" or "supplier" in this context refers to an entity that supplies contract resources, such as a placement or temporary contracting agency. Such entities typically act as an intermediary between qualified individuals and companies and clients desiring their employ. The terms "timekeeper", "contractor" and "consultant" can be used interchangeably in this context to refer to individuals who are employed by the client to provide performance of a contract, typically in the form of services. A "managing consultant" can be an individual associated with one or more contractors, either as part of the contractor entity or the vendor entity, who might use the systems and methods of the present invention for coordinating placement and billing activities of individual contractors. In one embodiment, management component 12 is provided in the form of a secure web site accessible via a public network such as the Internet, for example.

Figure 2:
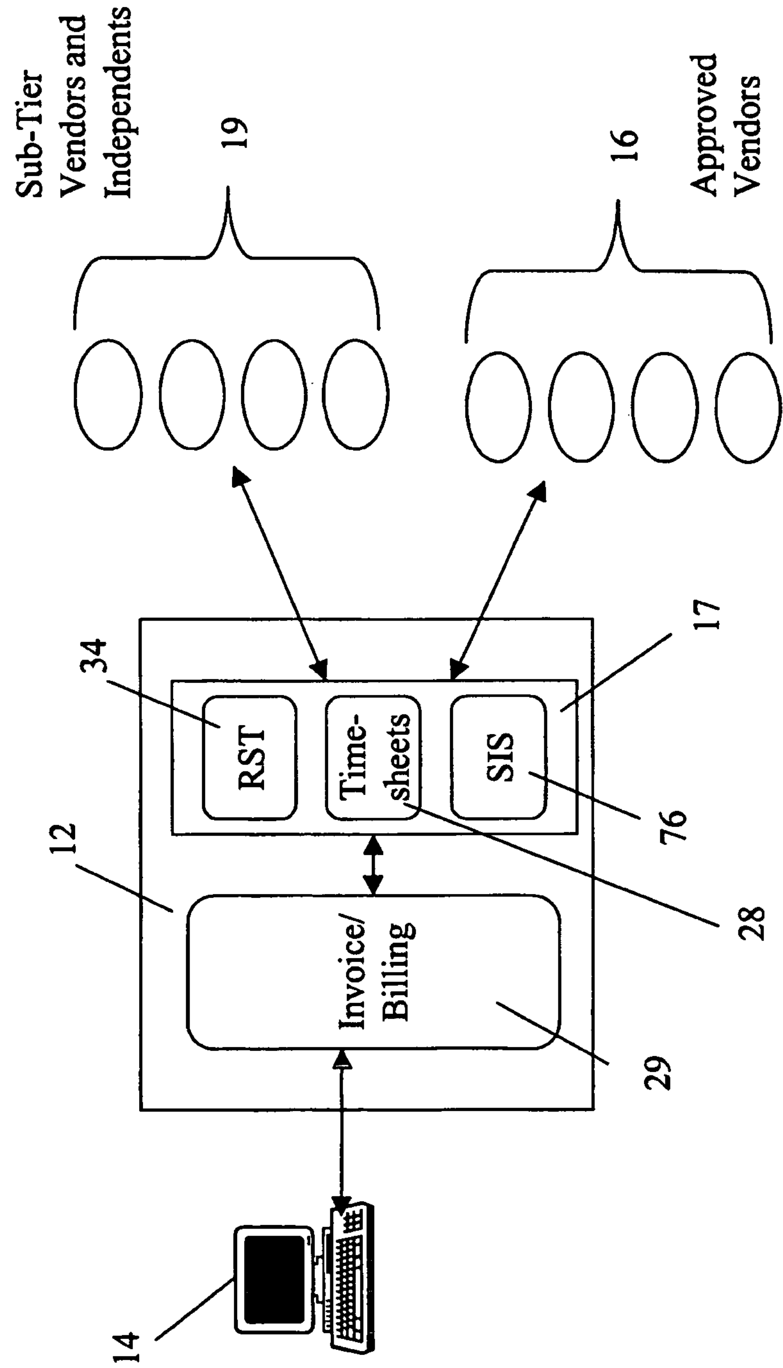
FIGS. 2 and 3 are block diagrams showing sample interactions among users of the present invention in a thin client embodiment.

As shown in FIG. 1, management component 12 includes sub-components such as access/login component 20, candidate submission and tracking system (CSTS) component 22, contract data/details input (CDI) component 24, document tracking system (DTS) component 26 and timesheet component 28. In one embodiment of the invention, components 24, 26 and 28 can be referred to as the back office services system (BOSS) of the present invention. A billing component 29 can also be part of management component 12, as shown in FIGS. 1 and 2, or can be a separate component interacting with management component 12.

Access/login component 20 provides a level of security to the present invention, by requiring any entity accessing the management component to be appropriately authorized and provided with at least one element of security (e.g., password, spoken input, fingerprint scan). CSTS component 22 allows client 14 to present requisition information to the system so as to receive qualified candidates for a particular job, and also allows vendors 16 and even individual contractors 18 to submit one or more candidates (which may be themselves, in the case of a contractor submission) in response to the requisition notice from the client. In short, CSTS component manages the candidate submission workflow from requisition to hire, tracks job status and candidate information, and reports on hiring process and other metrics.

CDI component 24 allows for the creation, editing, extension, reporting, storage and integration of contract details associated with a contracted-for job, which can trigger certain business rules affecting the timesheet and billing system of the present invention as will be described more completely hereinafter. DTS component 26 provides for the management, reporting, storage and tracking of documents and communications affecting components 22, 24, 28 and 29, including invoicing and payment, as will be described more completely hereinafter. Timesheet component 28 provides interfaces and communications necessary to input, transmit and report timesheets for a particular contractor on a particular project, receive feedback and/or approval of the transmitted timesheet from the client, and process the timesheet for billing once approved. Timesheet component is the primary interface for the contractor. Billing component 29 interacts with timesheet component to automate processing of invoices and payment in connection with approved timesheets, as will be described more completely hereinafter.

As described herein, certain exemplary embodiments of the invention can be implemented using a plurality of computers which, depending on circumstances, may communicate over one or more networks of computers such as, e.g., a local area network (LAN), a wide area network (WAN), a public network, such as the Internet, for example and/or another network. In various embodiments, as described herein, one or more servers, client computers, application computers and/or other computers can be used to implement one or more aspects of the invention. As an example, management component can be a single computer having memory and programming sufficient to accommodate the requirements of sub-components 20, 22, 24, 26 and 28. Alternatively, individual dedicated computers can be provided with memory and programming to accommodate the requirements of a respective component or sub-component. In one embodiment, the invention can be deployed in an application service provider (ASP) format, with users accessing the invention using a public network, such as the Internet, for example.

Illustrative computers for use with the present invention can include, for example, a central processing unit, memory (ROM, RAM, etc.), digital data storage (e.g., hard drives, etc.), input/output ports (e.g., parallel and/or serial ports, etc.) and data entry devices (e.g., keyboards). User computers may contain, in some embodiments, browser software for interacting with the server such as, for example, using hypertext transfer protocol (HTTP) to make requests of the servers via the Internet or the like. In addition, various computers can include other protocols as needed to effectuate communications described therein, such as, for example, file transfer protocol (FTP) for transferring, uploading and/or downloading files and/or the like.

Additionally, in some exemplary embodiments, the system can use relational databases, such as, for example, employing a relational database management system (RDBMS) program to create, update and/or administer a relational database. The RDBMS can be adapted to take Structured Query Language (SQL) statements entered by a user or contained in an application program and create, update and/or provide access to database(s). Some illustrative RDBMS's include Oracle™ databases, and IBM DB2™ databases. In some illustrative embodiments, one or more user computers can be provided, such as, for example, as a LAN-based system. The user computers can include an appropriate operating system, such as, for example, Windows NT™ or other systems known in the art. The system can also provide an object based graphical user interface (GUI) on one or more user computers.

In some illustrative embodiments, process steps can be carried out via computers by way of their central processing unit (CPU), which can communicate with a set of input/output (I/O) devices over a bus. The I/O devices can include, for example, a keyboard, mouse, video monitor, printer and/or other devices. The CPU can communicate with a computer readable medium (e.g., conventional volatile or non-volatile data storage devices) and/or memory over the bus. The interaction between a CPU, I/O devices, a bus and a memory will be appreciated by those of ordinary skill in the art. Memory can include, for example, data and can also store software. The software can include a number of modules for implementing the steps of processes, such as computer implemented steps of the processes described herein. Conventional programming techniques can be used to implement these modules.

In at least one embodiment of the present invention, the various methods described herein can be implemented in computer program products for use with a computer system. This implementation may, for example, include a series of computer instructions fixed on a computer readable medium (e.g., a diskette, CD-ROM, ROM or the like) or transmittable to a computer system via an interface device, such as a modem or the like. The medium may be substantially tangible (e.g., communication lines) and/or substantially intangible (e.g., wireless media, infrared, etc.). The computer instructions can be written in various programming languages and/or can be stored in one or more memory devices, such as semiconductor devices (i.e., chips or circuits), magnetic devices, optical devices and/or other memory devices. Transmission can occur using appropriate known communications technology.

As shown in FIG. 2, one embodiment of the present invention allows a client 14 and its vendors 16 and sub-tier vendors 19 to interact with management component 12 such as via a thin client interface. As shown in the embodiment of FIG. 2, invoice/billing component 29 is incorporated to allow the client 14 to view and approve contractor invoices, and to further allow bills to be automatically generated. It will be appreciated, in this embodiment, that both approved vendors 16 and sub-tier vendors and/or independent contractors 19 are in two-way communication with a vendor access component 17 of management component 12. In this embodiment, vendor access component 17 can include timesheet component 28, a supplier inquiry system (SIS) 76 and a retail sales tax component (RST) 34. Vendor access component 17 can be part of management component 12, or can be logically or physically separate from management component.

Figure 3:
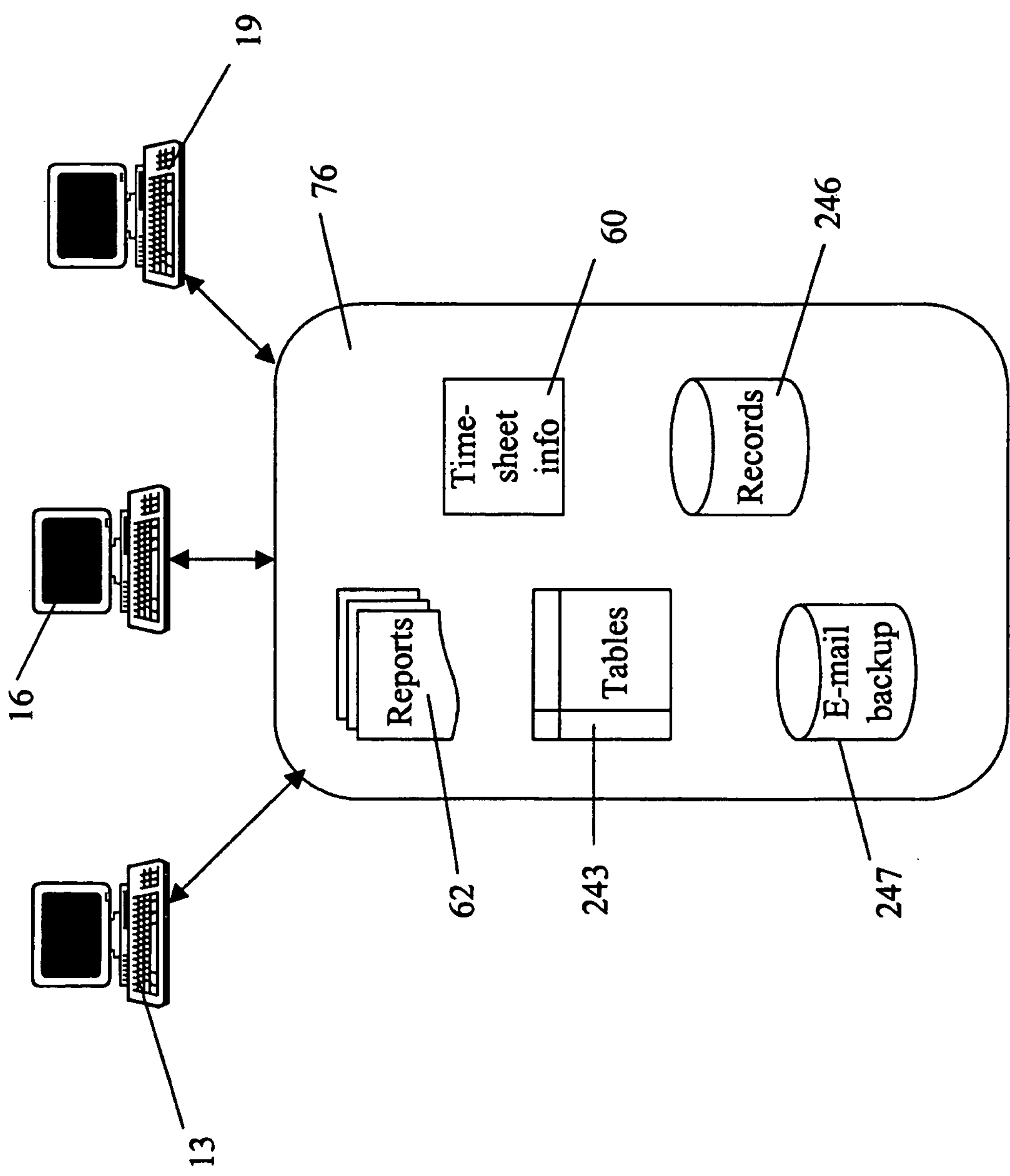

As shown in FIG. 3, SIS 76 allows administrative personnel 13 as well as suppliers, such as approved vendors 16 and sub-tier vendors and independents 19, to access timesheet information 60, reports 62, tables 243, records 246 and e-mails 247 formed in the operation of the present invention. Also, while FIG. 2 shows an embodiment of the invention with a billing option, it will be appreciated that the present invention can also operate in a thin client environment with no billing option. In such an embodiment, approved vendors can view vendor-specific information directly through a separate vendor access component 17.

RST component 34 facilitates accounting and reporting of retail sales tax, which may or may not be attributed depending upon the jurisdictions involved in a particular client's employment of a particular contractor. In one embodiment, if the client is not exempt from sales tax, the tax would be added to the invoice at the time of presentment to the client for payment. If the client is not subject to retail sales tax, the present invention can facilitate completion of a purchase exemption certificate (PEC), as described below.

Regarding sub-tier suppliers, when a new sub-tier supplier is registered, the supplier must provide all required documentation, whereupon a central administrative authority will activate access for the sub-tier supplier. Each new supplier representative to be added must also go through a registration process. In one embodiment, both a central administrator and the primary contact for the sub-tier supplier need to approve access.

During the contract setup process, the sub-tier supplier must define a contract relationship. The first step is to describe the client details if they are not already available in the system and accessible to the sub-tier supplier. The second step is to describe the contractors details if they are not already available in the system and accessible to the sub-tier supplier. The third step is to describe the contract relationship and provide details of the options and parameters relative to the contract. Such details can include, for example, payment cycle, billing rate, contract expiry date and provisions, purchase order terms, notification parameters, timesheet recording parameters, invoice and payment specifications, language designation and currency designation. The sub-tier supplier can also add, change or terminate the contract via this process.

In one embodiment, in addition to approved suppliers, sub-tier suppliers are provided with online real time access to details of their contracts at any time of day, week, month or year via SIS 76. The communications component of the present invention, which can be part of DTS in one embodiment, can issue alerts to the sub-tier suppliers and any managing consultants according to business rules which identify matters of concern, such as purchase order (PO) exhaustion, contract expiry, time sheet rejection, and/or missing time sheets. It will be appreciated that the sub-tier suppliers can use the present invention to track the processing of any invoice for their contractor from initiation up to completion, including receiving an indication of where the invoice stands in the process, as well as date and time stamps indicating when every relevant event was completed.

In order to invoke the timesheet and billing management features of the preset invention, certain factors should be in place or certain preliminary events should occur. For example, there should be a client and a contractor to use the present invention. FIG. 4 illustrates example process steps involved in requisitioning labor for performance for the client. As at 40, the vendor and/or supplier of contractor assistance is inputted, and access to the vendor is granted via password or the like as at 42. Available jobs are then loaded as at 44 and presented for viewing by the vendor as at 46. Upon finding appropriate job matches for candidates affiliated with the vendor, the vendor can submit such candidates as at 48. Client can then select candidates for interview and make offers as deemed appropriate as at 49. Example user interfaces associated with the above steps will be described in connection with accompanying figures hereinafter.

FIG. 5 illustrates sample process steps involved with contracting with a contractor, receiving timesheets from the contractor and providing payment from the client. As at 50 in FIG. 5, the selected candidate can accept the client's offer of work and the candidate's information can be inputted into the system. A contract can then be sent to the vendor for the candidate as at 51. Once the candidate is admitted for work as a contractor as at 52, the contractor can be provided with access to the system of the invention as at 53. During course of performance of the work and as agreed by contract, the contractor can then input time into the system as at step 54. This time is then presented to the client for approval in accordance with the details described hereinafter, and if the client is agreeable to the entered time, the client notifies the system of approval of the contractor's time as at 55. The system of the present invention then approves the invoice presented by the contractor/vendor and issues payment as at 56. The vendor then receives payment as at 57. Example user interfaces associated with the above steps will be described in connection with accompanying figures hereinafter.

One aspect of the present invention is the ability to document and manage contract information on an individualized basis. Step 51 in FIG. 5 refers to sending a contract for work to the vendor. Once the contract is approved and executed by the parties, contract details can be input into and/or extracted by contract data input (CDI) component 24. In one embodiment, a client database is provided which stores client details, a contractor database is provided to store contractor details, and a contract database is provided to store details of the contract. In a further embodiment, a separate component such as CDI component 24, for example, can be used to extract details from the client and contractor databases to generate the entry into the contract database, thereby defining the contract relationship to the utmost detail. In one embodiment, this component can be called the "Costanza" component.

In one embodiment, the system specification can support multi-lingual and multi-currency (e.g., bill in one currency, receive payment in another) environments, even within the same contract relationship. By storing contract details, the present invention can customize certain aspects of the user interfaces. For example, with knowledge of the length of a contract (e.g., two months) and expected working hours (Monday-Thursday, 8 hours per day), the timesheet interface for the contractor can be customized. As another example, if the client operates in the Spanish language and deals in Euros for currency, the client interface can be reflected as such. In one embodiment of the invention, access to appropriate currency conversion and language translation databases is provided. In another embodiment, a link to a current currency conversion database on the Internet is provided to ensure the most up-to-the-minute conversion rates. In all such cases, a user profile created and stored using interfaces 14, 16 and/or 18. The language preference of each user dictates the language that the user will work in, and this applies to all screens, e-mails and error messages. One person can send an e-mail in the language of their preference (i.e. Spanish) while another person receives the same e-mail in the language of their preference. With regard to multi-currency, a client can be billed in one currency while the contractor is paid in another currency. In one embodiment, currency conversion rates are set each day, and the rates are reported in the details of the invoice/billing document.

All elements of the system can be brought together at execution time including field/tab labels, warning messages, page text and e-mails, for example. All such data can be stored in tables as at 243 in FIG. 6 and brought together at execution time. As an example, if the user speaks French, then the French data is retrieved, and if the user speaks English, the English data is retrieved. Support for a new language can be provided by loading the data base that contains the data elements. FIG. 7 is a schematic diagram showing how a French-speaking client 14 dealing in Euros as currency can interact with an English-speaking supplier 16 dealing in Canadian dollars using the system of the present invention. As shown in FIG. 7, translation 111 and conversion 112 component can be integrated with management component 12 to provide the translation and currency conversion respectively necessary for seamless operation by client and vendor. It will be appreciated that the invention can operate equally well if only one of the currency conversion or language translation is necessary. For example, where both client and vendor deal in Canadian dollars, but the client's preferred language is French and the vendor's is English, then only the language translation component 111 is invoked. Where the two parties operate in the same language, but deal in different currencies, only the currency converter component 112 is invoked.

Figure 6:
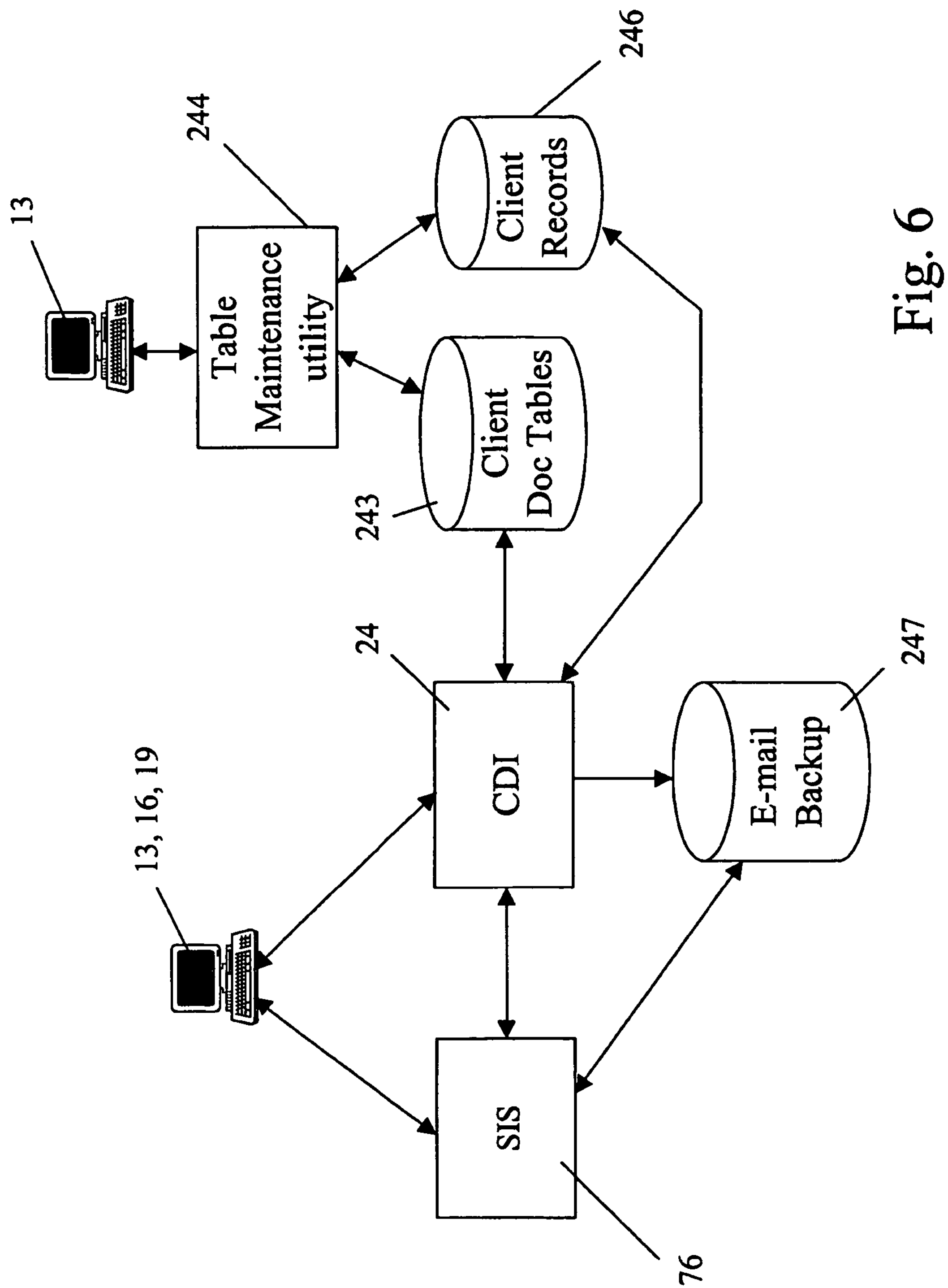
FIG. 6 is a schematic diagram showing various elements of the contract data input functions of the present invention.
Figure 7:
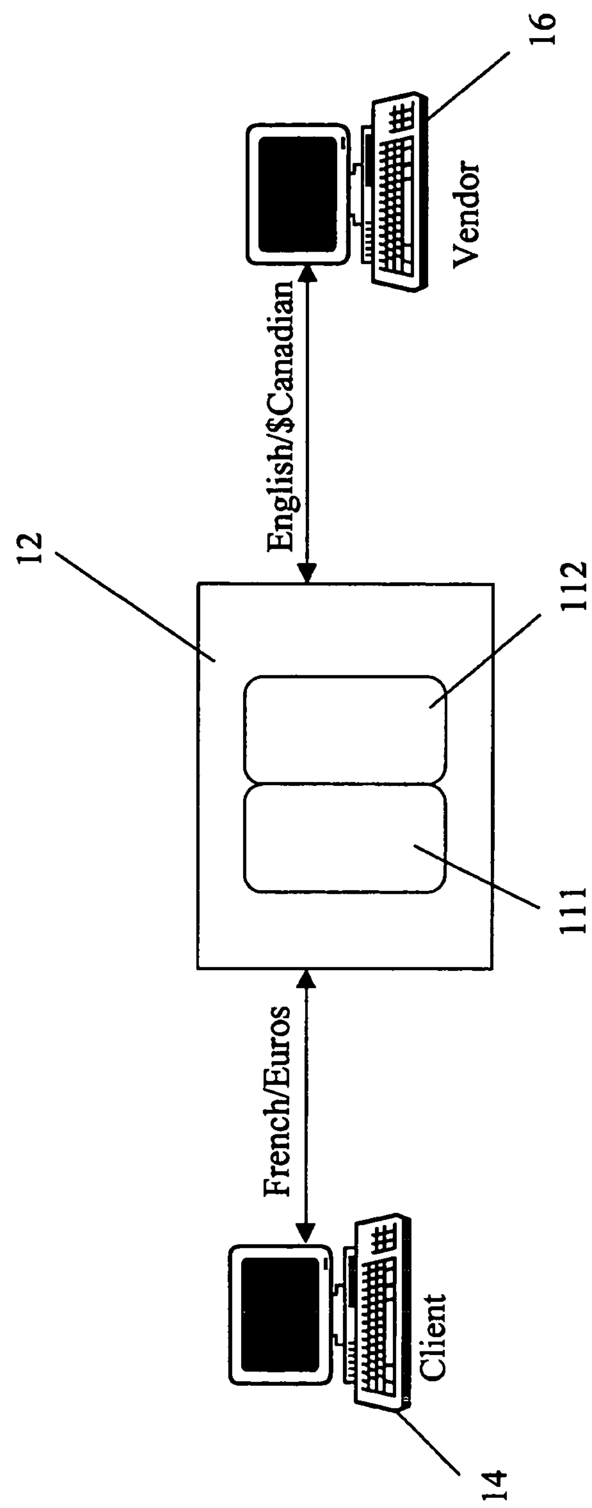
FIG. 7 is a schematic diagram showing various elements of the language translation and currency conversion aspects of the present invention.

As further shown in FIG. 6, CDI component can store client records in a client records database 246, and can store client document tables in a document table database 243. CDI can further store e-mails in an e-mail backup database 247. Administrative personnel 13 can manipulate the set up and contents of client records database 246 and document table database 243 via table maintenance utility 244. Also, administrative personnel 13, approved vendors 16 and sub-tier vendors 19 can access SIS and CDI, which can further communicate with each other. As described earlier, SIS permits access to items such as, for example, timesheet information 60, reports 62, tables 243, records 246 and e-mails 247 formed in the operation of the present invention.

It will be appreciated that the present invention provides an internal security architecture sufficient to ensure that any sub-tier suppliers only have access to their own contractor and client details and to no other supplier's details or to the broader company (client) details. Entries are subject to automated comparison to internal records to ensure that client names and locations are correct and not entered incorrectly, the client parameter defaults which are subject to customization at the contractor level are compatible with the client manager's preferences and the client's preferences, and entries are stamped according to at least the date, time and author to provide a complete audit trail.

Figure 8:
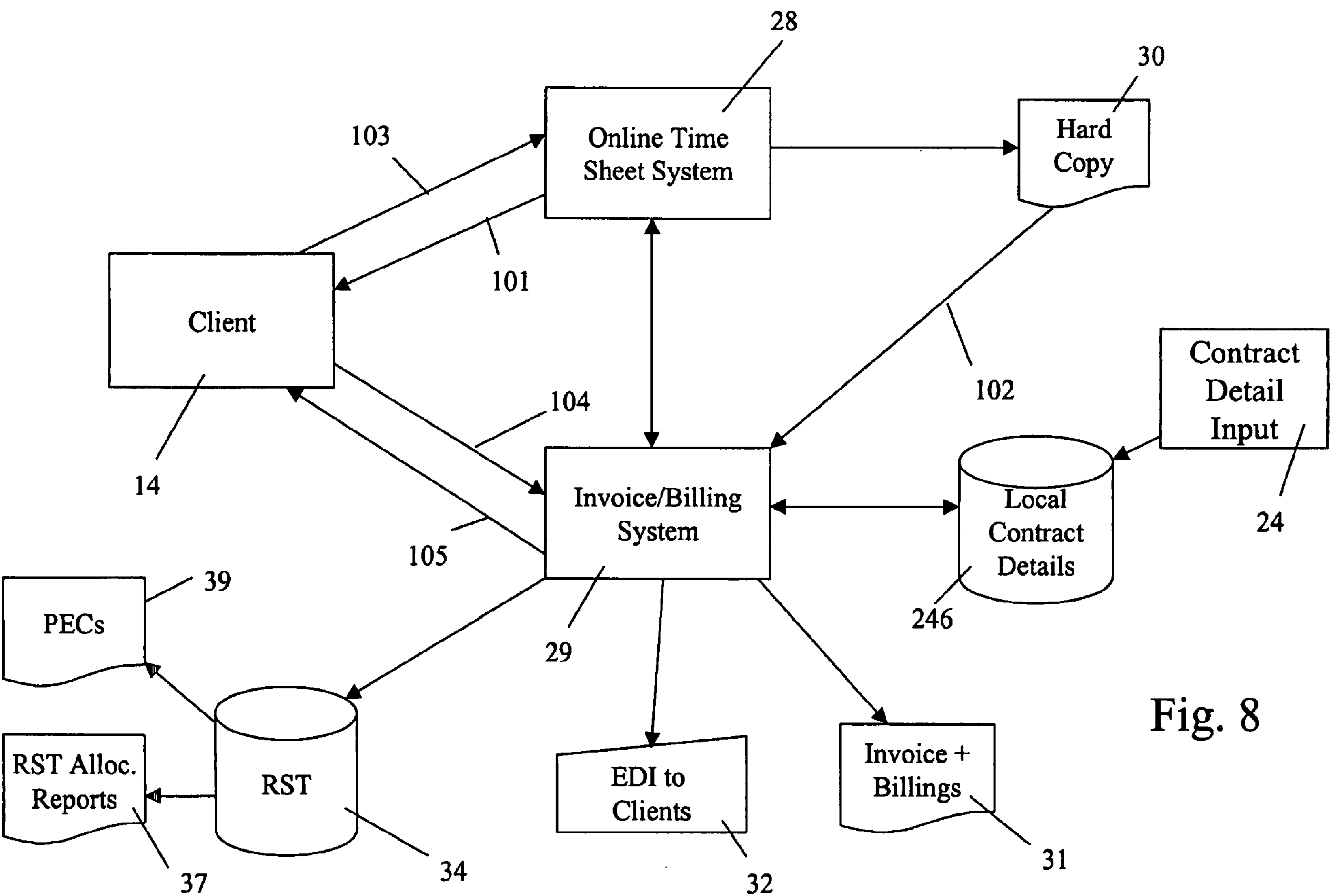
FIG. 8 is a schematic diagram illustrating an example time sheet front-end process in accordance with one embodiment of the present invention.

As shown in FIG. 8, time sheet system 28 and billing system 29 interact to process timesheets as required (e.g., "blue ink" signature, electronic) by the client 14. Timesheet requirements can be indicated by the client at the time contract details are entered into the system of the present invention. In one embodiment, timesheet component 28 includes a contract term implementation component to automatically set timesheet recordation and transmission protocols pursuant to the contract terms and/or the client's preferred format indication. Once a contractor has finalized his or her timesheet, if the timesheet is permitted by the client to be submitted in electronic form, the time sheet system can submit it to client as at 101 for client review. If the timesheet must be submitted with "blue ink" signature, a hard copy 30 can be printed using timesheet component 28, signed and faxed or otherwise transmitted as at 102 to billing system for presenting to the client. In the case where the contractor and client are in close physical proximity to one another, a blue ink signature time sheet can be hand delivered to the client for approval. If the timesheet is not acceptable, the client can provide explanatory feedback as at 103 to the contractor via the timesheet system 28. Such feedback can also be directed by the client to the client's accounting department and/or the contractor's managing consultant. If the timesheet is acceptable, the client can indicate such as at 104 to billing system 29.

As further shown in FIG. 8, the CDI component 24 of the present invention can store contract details in database 246 for use by billing system component 29. Billing component 29 can retrieve items such as the invoice history for the client, or purchase order details, and forward such information to the client 14 as at 105 at the appropriate time. It will be appreciated that billing system component 29 can also present hard copies 31 of invoices and billings, and can transmit information 32 using electronic data interchange (EDI) to clients. As described earlier, RST component 34 facilitates accounting and reporting of retail sales tax, which may or may not be attributed depending upon the jurisdictions involved in a particular client's employment of a particular contractor. In one embodiment, if the client is not exempt from sales tax, the tax would be added to the invoice at the time of presentment to the client for payment. Such information can be presented in an RST allocation report as at 37, for example. If the client is not subject to retail sales tax, the present invention can facilitate completion of a purchase exemption certificate (PEC) 39, as required.

The front-end time sheet component 28 of the present invention complements the billing component. The time sheet component provides the primary interface to the contractor. Business rules can be employed to minimize input errors, such as, for example: (1) automatically cross footing all calculations; (2) identifying federal, state holidays according to the work location with cautions being made when data is entered to ask the worker to be sure that they worked on a holiday; (3) comparisons of hours worked to individual client policies; (4) formatting of all screens and communications (i.e. e-mails) in the recipient's language of choice; and (5) implementation of complete purchase order (PO) management and control. In managing purchase orders and in performing other functions, the present invention can provide messaging to various parties via communications component. For example, communications component can note cautions to contractors when budgeted funds are not sufficient to pay for reported hours, can note cautions to client managers with forecast of when budgeted funds will be (i.e. have been) depleted, and can further note cautions to contractors and clients alike when contracts are going to expire or be exhausted of funds, etc. The present invention further provides for rejection of contractor data entry according to client specific business rules. Communications component can store default triggers or triggers specially indicated at the time the contract details are input, so as to know when to inform the appropriate parties.

With regard to purchase order management and control, it will be understood that contracts are commonly for a fixed elapse time and/or for a maximum dollar amount. In one embodiment of the present invention, the time sheet system obtains information from CDI to track the contract expiry date. Also, the time sheet system can be implemented so as not to allow the contractor to enter time past the contract end date, which can be the last day on the timesheet. Further, the system of the present invention can provide a warning if the PO amounts are nearly exhausted, depending on client requirements. In one embodiment, e-mails are not automatically sent to the client, and the client is informed of purchase order status when the timesheet is approved online, again depending on client requirements.

In one embodiment, the time sheet may allow the contractor to enter time past the contract end date (if an option parameter for the client permits doing so). In this embodiment, the system can caution the contractor with a warning that the contract has been completed and there may be no payment made on that basis, and an e-mail or other communication can be sent to the managing consultant alerting to the attempted entry after contract completion. In both instances, prior to the schedule completion date, the system sends an e-mail to the managing consultant, if any, reminding of the expiry.

In one embodiment, the time sheet system of the present invention tracks the remaining approved funds, and the balance remaining is reduced with each issued invoice. When each invoice is submitted for electronic approval the client receives an indication of the funds remaining in the PO, the working days until the PO is exhausted, and the projected completion date for PO exhaustion at a normal consumption rate. When the PO is close to exhaustion (the number of remaining days for the warning is a parameter in the billing system), e-mails or other communications can be sent to the managing consultant, informing of the PO exhaustion. The managing consultant can intercept these e-mails and modify/terminate in his/her sole discretion. When the PO funds have been exhausted, the time sheet system will caution the contractor that time entered does not have funds in the PO to pay and he/she may not be paid.

With regard to the billing component, once the invoice details have been determined, the resulting invoice can be presented to the client in a variety of ways. For example, a single hard copy invoice with time sheet can be provided for each contractor. Alternatively, a consolidated invoice can be provided, with consolidation being by client, client department, line manager, or project. It will be appreciated that invoices can be presented in hard copy format or electronically as in portable document format (PDF) or using electronic data interchange (EDI).

The time sheet and billing components can also interact with DTS and/or communications component to integrate system-generated communications via e-mail in support of the automation of the overall invoicing and billing process. For example, when a new contract is set up, the contractor can be contacted by e-mail and provided both a welcome and an introduction to the time sheet system with instructions on its usage and related process. Also, when a contract is nearing expire, the contractor can initiate the sending of requests to the system manager requesting information on the status of the contract and its possible extension. Further, when a contract is completed, the system can send post contract surveys to client managers to solicit their report on the performance of the contractor. Where a client contract requires written notification, the system can ensure that such notification is sent according to the terms and conditions of the contract. In one embodiment, the client can specify not only the format of time report submissions (e.g., blue ink, electronic, etc.), but also the preferred notifications to be sent to the client and/or the contractor (e.g., contract is nearing expiry, PO maximum has been exceeded, reasons for denying approval to timesheets). The client can further specify business rules and/or automated controls for system operation with regard to one or more vendors and/or contractors, as described more completely below.

Figure 9:
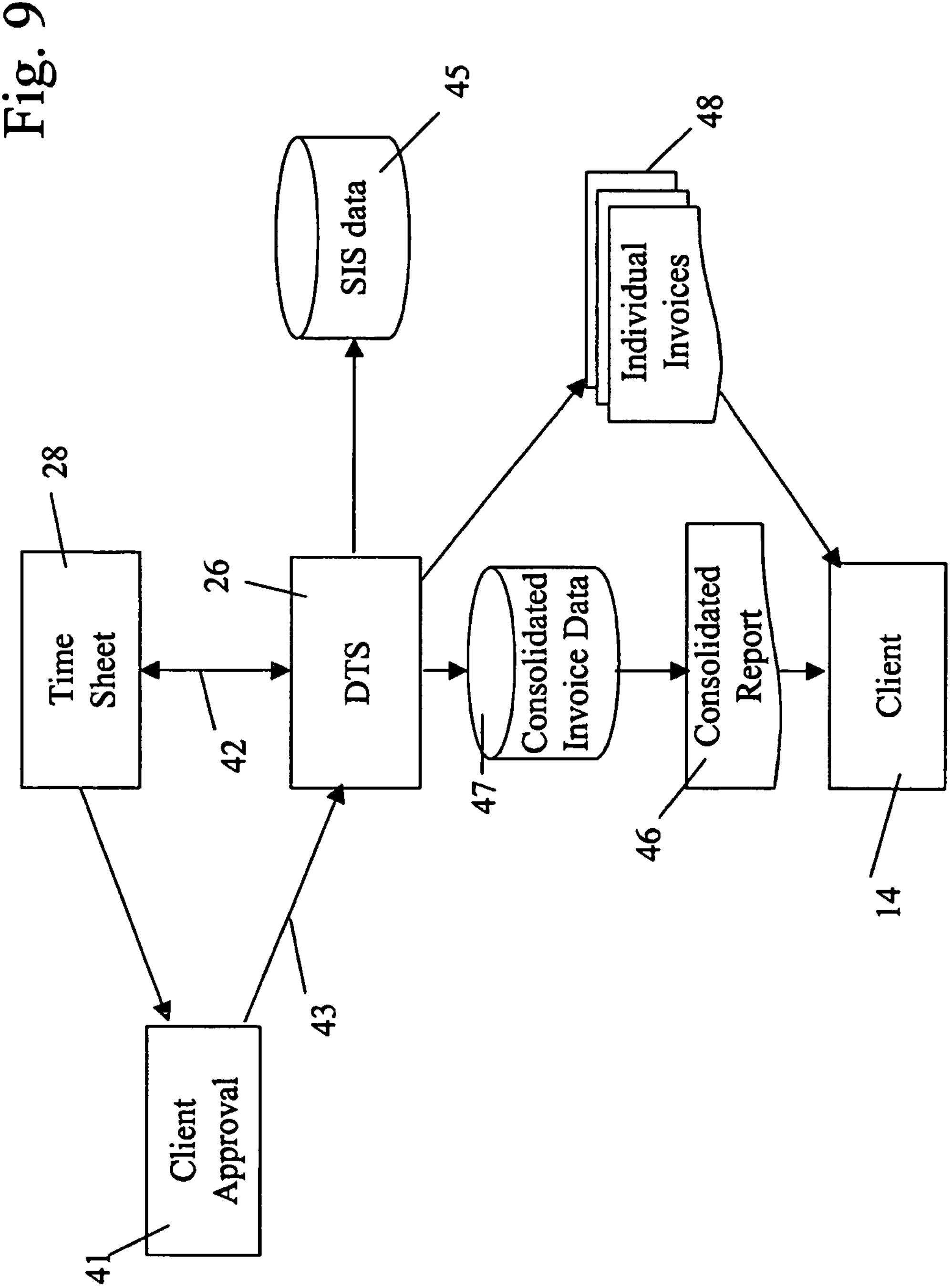
FIG. 9 is a schematic diagram illustrating an example time sheet approval and bill presentment process in accordance with the present invention.

FIG. 9 illustrates an example electronic time sheet approval and bill presentment process in accordance with one aspect of the present invention. As shown in FIG. 9, completed time sheet 40 can be forwarded for client approval 41 electronically (with a copy to DTS component 26 as indicated at 42), which approval can then be sent electronically as at 43 to DTS component 26. DTS component can notify the time sheet submitter that the time sheet has been approved, and can also store timesheet approval information in SIS database 45, so as to be available to SIS and thereby allowing vendors to track approvals accordingly. Upon receipt of individual approvals for each contractor, DTS can submit a consolidated report 46 supported by individual invoices 48 for each project to the client for payment. The consolidated invoice data can be stored in database 47.

Regarding time sheet approval, during the billing cycle, the contractors record the time that they worked. The details are entered at a level as specified by the client (e.g., by project, by day, or by other agreed upon unit). During the time sheet completion process, the process of entering time is subject to one or more automated controls. For example, a maximum purchase order (PO) amount can be entered to control time input. In such a process, the billing system of the present invention maintains a running record of the funds accrued under a PO and ensures that the contractor does not enter time which when multiplied by a "per unit" rate would exceed the maximum funds allotted under the assigned PO. A series of integrated warnings and calculations of projected days to PO exhaustion can be reported to the client manager, vendors and sub-tier vendors during the life of the contract as a means of facilitating cost management. Such notices or warnings can be pre-established for all contracts as default attributes, or can be actively managed, added and/or changed by the client. In one embodiment, notifications and warnings can be actively established by a vendor, sub-tier vendor and or contractor with or without the approval of the client.

Another example control measure is the expiry date. Using this control, the billing system knows the last day of the contract and will not permit the contractor to input hours for any day after that contract end date. Another example control measure is statutory holidays. The billing system knows the work location and the statutory holidays which apply to that jurisdiction. The system will provide the contractor with cautions if the contractor enters hours worked in a statutory holiday.

With regard to submission reminders, timely submission of time sheets is enhanced by automated reminders. Each billing period the system monitors those contractors who have not submitted a time sheet for the billing period. A parameter in the system tells it the number of days before or after the end of the billing period that a time sheet should have been received by. The system uses this detail in combination with its knowledge of the billing period end date to determine if a reminder e-mail should be sent to the contractor asking for them to complete and submit the time sheet. For example, if a company wants the time sheet in within 2 business days after the end of the billing period, then the parameter would indicate +2 (2 days after) and if the time sheet were not submitted 2 days after the end of the billing period the e-mail would be sent.

Upon receipt of the complete invoice and supporting time sheet, which can be in secure Adobe™ PDF format, for example, the client 14 can e-mail an approval 43 to be sent to DTS and/or billing component, or the client can print out the time sheet and sign the time sheet, thereby providing a "blue ink" signature, which can then be returned to and processed by the billing component 29 for eventual payment. Depending on communication times, the entire process of time sheet approval through to the return of the complete invoice can occur substantially in real-time.

With regard to "blue ink" signature requirements, the present invention appreciates that many corporate entities or clients require an original signature for timesheet and invoice processing. Such signatures are provided the name "blue ink" and can be required of the contractor, the client, or both. The challenge in such situations is one of obtaining electronic approval so that the invoice billing can proceed while also providing a hard copy time sheet for signature. One embodiment of the present system requires that the contractor print off a time sheet and present it for signature. At the time the contractor indicates that the time sheet is submitted, the electronic time sheet can be locked, whereby no further changes are allowed to it. Then, the billing system is informed of the hours on the time sheet and an invoice is created and put into a pending file. When the contractor sends in the signed time sheet (blue ink), an operator tells the system that a time sheet has been received and indicates the hours on it. If the hours on the blue ink time sheet match the hours on the invoice, then the invoice is released. The time sheet and invoice are matched up and sent to the client.

In another embodiment of the present invention, electronic presentation is used. In this embodiment, when the contractor has completed the time sheet, it is submitted for approval, and the time sheet is transmitted to the client manager who can review and approve or reject it as previously described. Upon approval, the billing system is notified of the approval. In one embodiment, for blue ink clients, the timesheet can be converted into a PDF or similar attachment, the invoice can be prepared as a PDF attachment, and both can be e-mailed back to the client manager. The completed time sheet can include an indication that it has been approved, along with the date and time of approval. The client manager can then print them off and apply a "blue ink" signature.

Regarding the electronic approval process, it will be appreciated that the time sheet system of the present invention records time data as provided by the contractor, and time is entered within the selected billing cycle. In one embodiment, the time sheet supports at least fifty-two (52) standard billing cycles, with the ability to introduce an unlimited number of other billing cycles. Further, within one line manager, there can be multiple billing cycles depending upon need. The billing cycle is unique by contract at the contractor level, and at the end of the billing cycle, the contractor can submit the time sheet for approval. Upon submission by the contractor, the billing system is notified of the submission and provided details of the hours. At this point, generation of the invoice can occur and generated invoices are kept in a print pending file. In one embodiment, the client is then notified of the submission by e-mail and provided a hot link to the time sheet for review. Upon approval by the client, the billing system is notified of the client's actions, and if the time sheet is rejected the invoice in print pending is highlighted.

Figure 10:
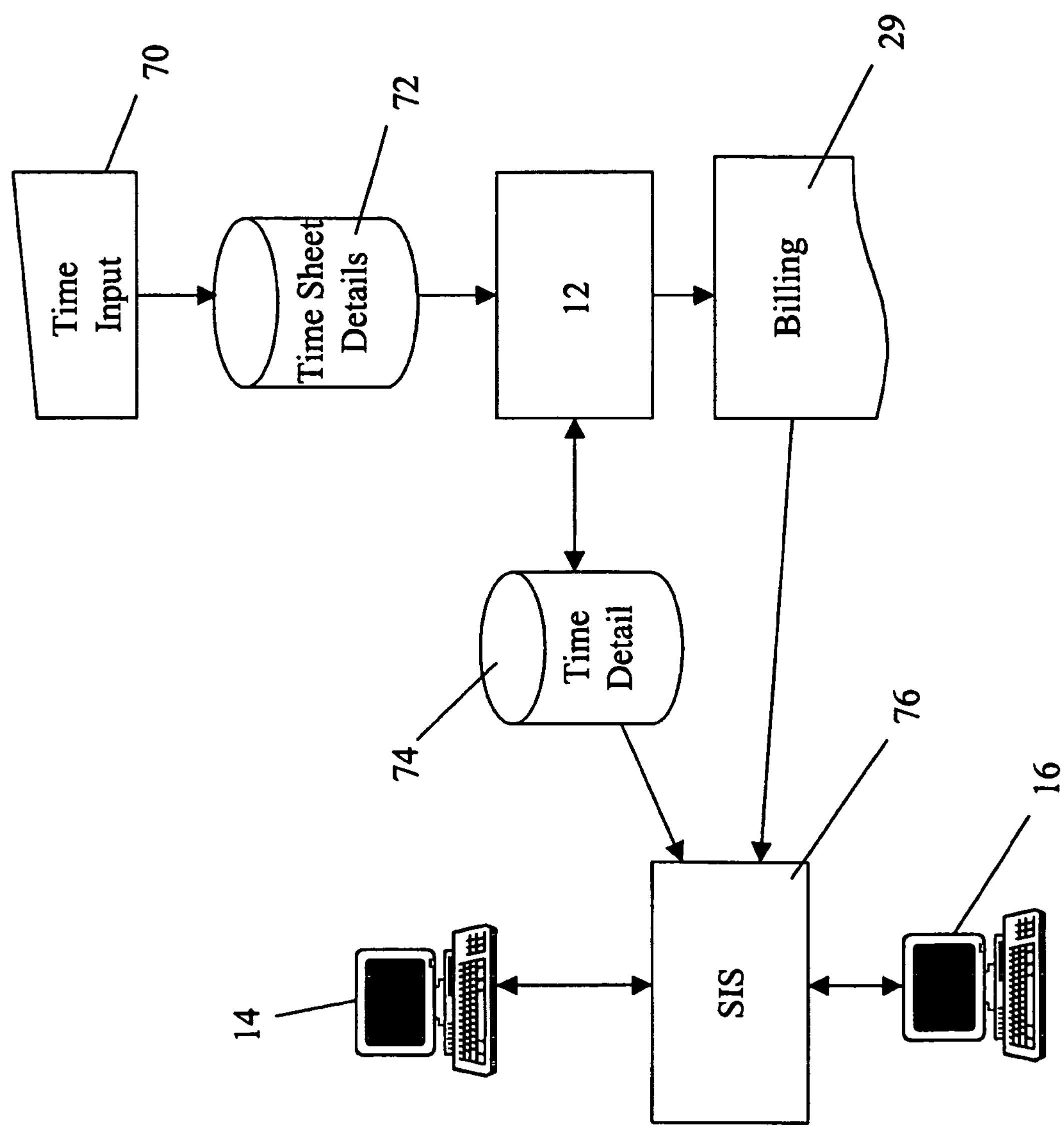
FIGS. 10 through 14 show flow diagrams illustrating example time input and billing procedures associated with various embodiments of the present invention.

It will be appreciated that management component 12 can include software to facilitate certain business processes as part of a comprehensive contract management service (e.g., the Procom SoftLanding™ program, commercially available from Professional Computer Consultants, Ltd. of Toronto, Canada) in connection with the present invention. Such business processes can include, for example, corporate governance, document management, contractor performance reviews, project budget control and reporting, rate analysis, "psuedo-employment", retail sales tax information and cost projection. It will also be appreciated that the present invention can be used in stand-alone mode as shown in FIG. 10, as well as alongside a vendor or client's own timesheet and/or billing software. As shown in stand-alone mode in FIG. 10, contractor time input 70 is stored in a database of time sheet details 72, and processed by management component 12 and billing component 29. In processing, management component 12 can store time details in a separate database 74 which can be accessed by manager 14 and vendor 16 through SIS 76. SIS can show details stored in database 74, and can further provide other information such as contract expiry or contract termination information, time sheet deadline information, and accounts receivable and invoice information.

With regard to invoice format, the manner in which details can be presented to the client can vary. They can be project based, whereby the contractor can report details by a project code. They can be presented at the end of the billing period. One report can go to the line manager which lists the work of that contractor for the manager. This report may reflect one or many contractors on the same project. The line manager must indicate his/her approval. A second report is subsequently sent to administration for each contractor. It lists the individual projects that the contractor worked on. It is supported by the sign offs received from the line managers. Alternatively, it can be handled in a straight forward manner, where the contractors hours are reported for each day, totaled for the month, and/or one invoice is submitted for each approved time sheet. Invoices can also be consolidated, where multiple contractors work for the same client or same client manager. All invoice details for each contractor can be consolidated onto one invoice to the client or client manager.

With regard to invoice submission, standard submission (e.g., hardcopy) is where the invoice is printed onto paper and submitted. Electronic submission is where the invoice is submitted electronically using the client specified electronic presentation method. Some options are: EDI, PDF, Ariba, E-mail, and Excel.

The information required by the various systems varies according to the client's preferences as they pertain to time reporting, time submission, invoicing, etc. Some of the required data elements are: (i) PO number and maximum dollars, (ii) Department number, (iii) Job name, description, type, (iv) applications worked on, technology description.

Figure 11:
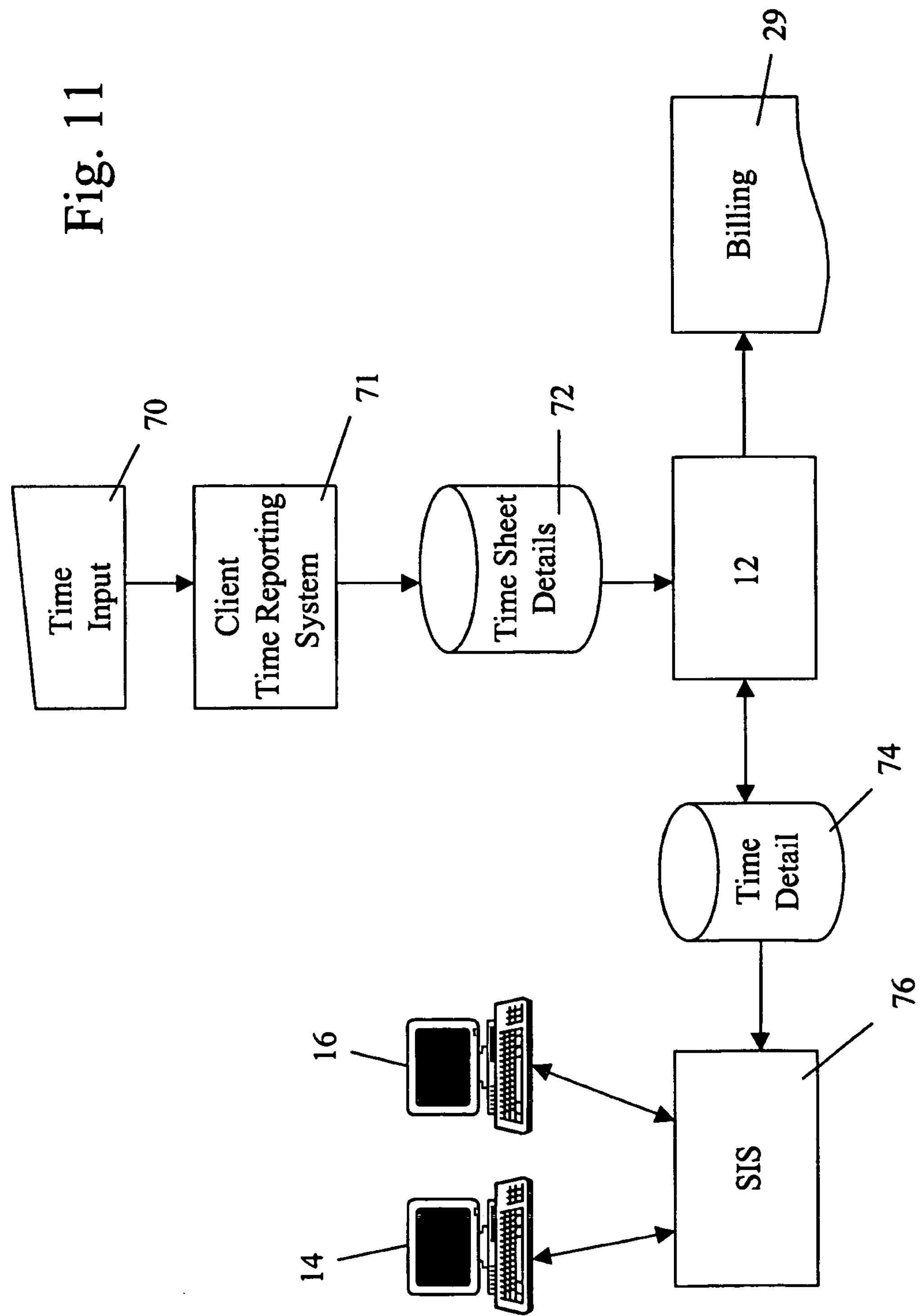

FIG. 11 shows the processing of information in sequence in both the system of the present invention and the outside system, where time is input as at 70 and processed through the outside client time reporting system 71, with details subsequently stored in database 72. The remaining processing takes place much as in FIG. 10, giving reference to the same reference numbers as above described in connection with FIG. 10.

Figure 12:
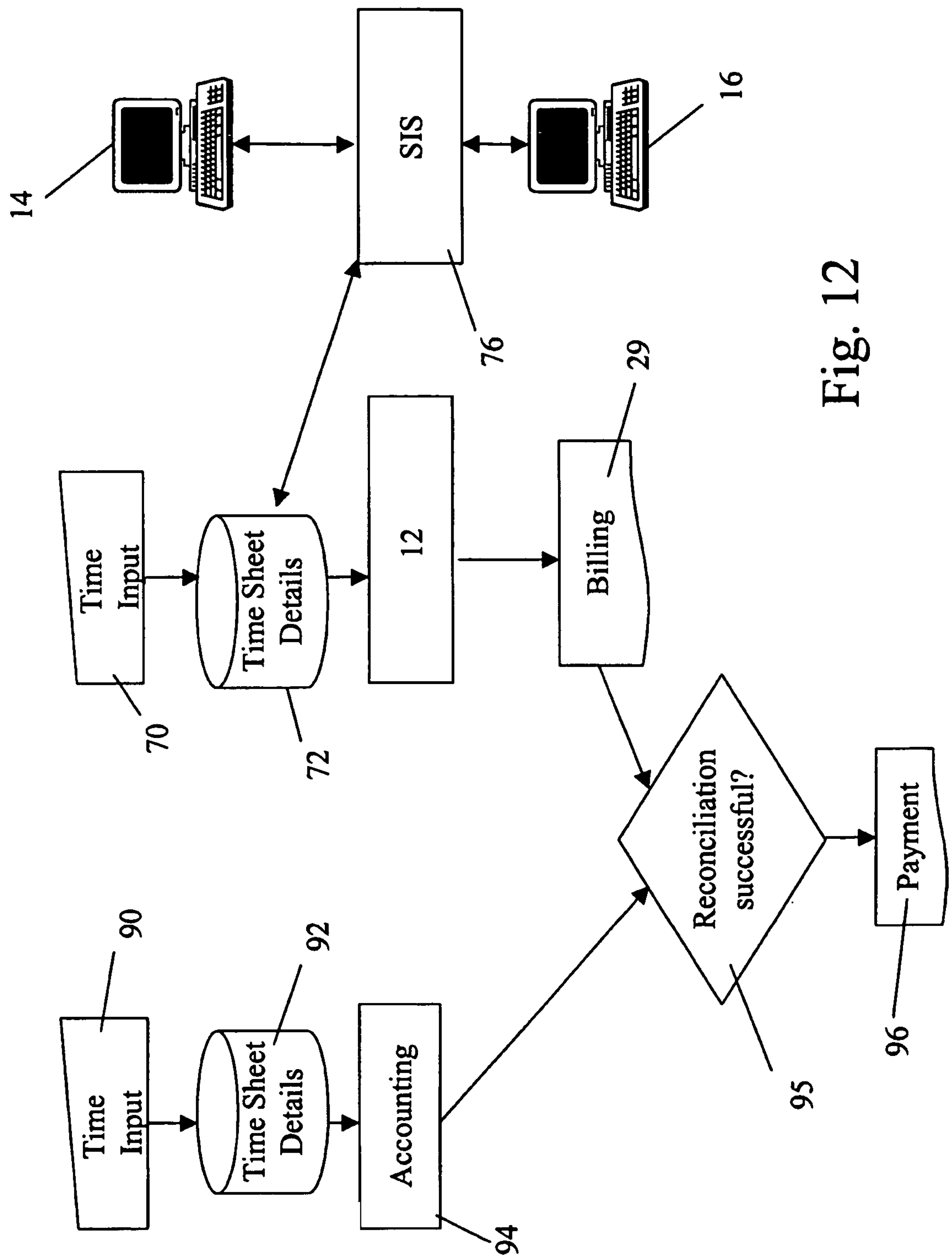
Figure 13:
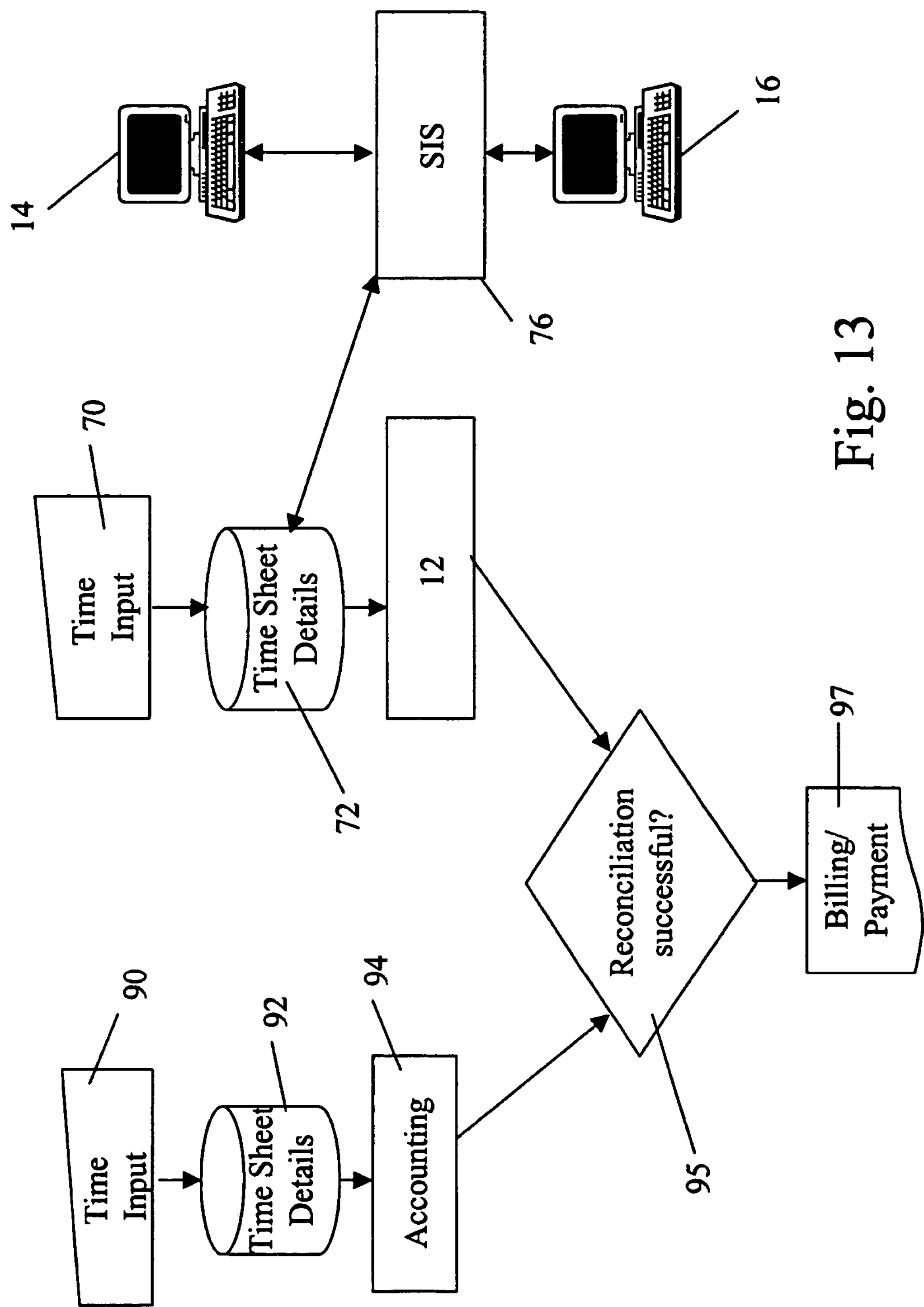

FIGS. 12 and 13 show the invention and the outside system operating in parallel at the beginning of the accounting period, wherein time is input as at 70 and 90, respectively, and time sheet details are stored as at 72 and 92, respectively. The outside accounting system 94 then processes the information in parallel with management component 12 and billing component 29 (in the example in FIG. 13, billing occurs after reconciliation), and reconciliation occurs as at 95. If reconciliation is successful, the invoice is processed for payment as at 96. SIS 76 is also shown in communication with database 72 to enable reporting and communications as described above in connection with FIG. 11.

Figure 14:
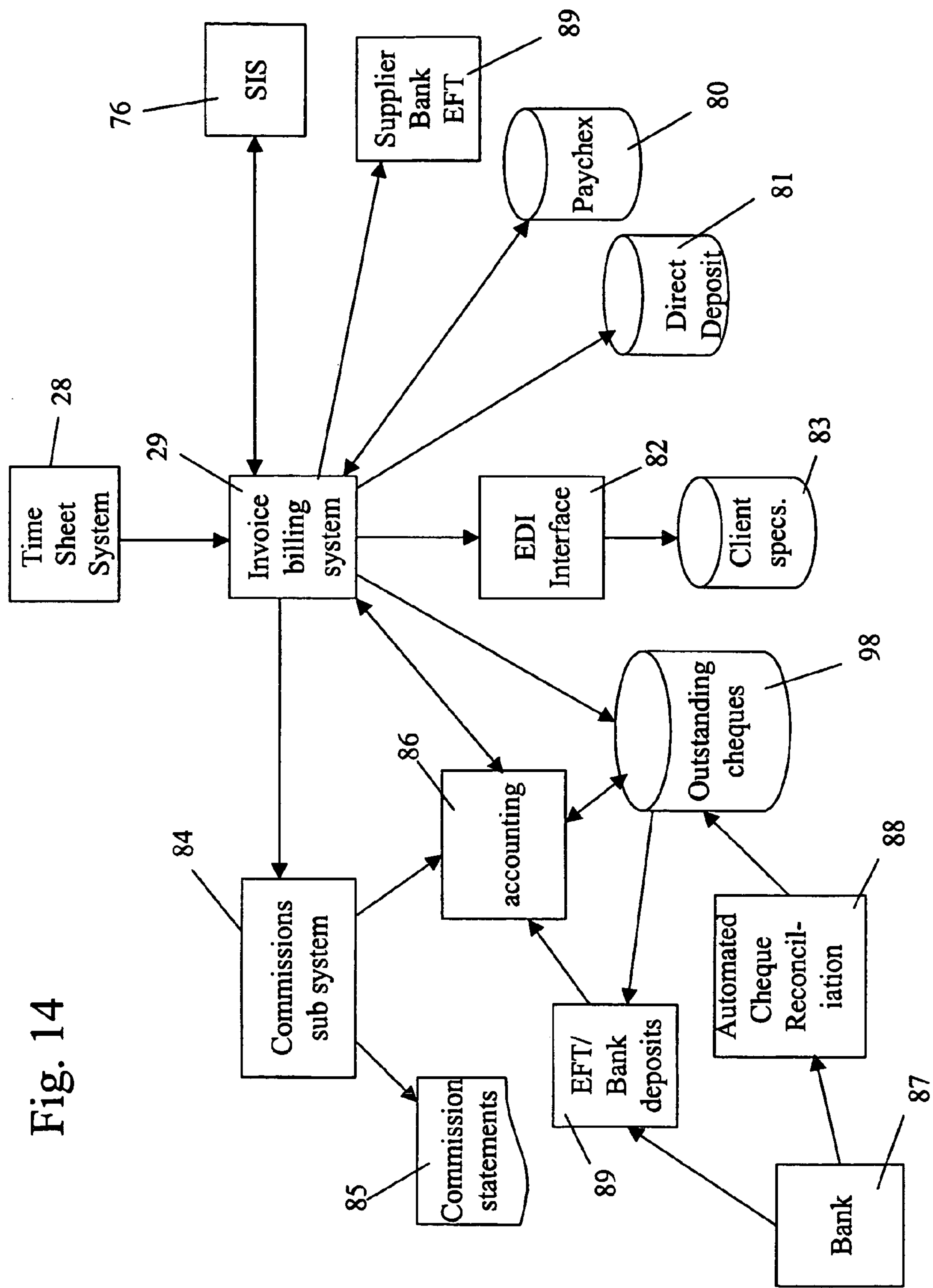

FIG. 14 shows a sample schematic of accounting and payment processing in connection with the present invention. As shown in FIG. 14, invoice/billing system 29 interacts with time sheet system 28 and SIS 76 as previously described. Invoice/billing system can issue payments via commercially accepted systems such as through electronic funds transfer (EFT) 89, Paychex™ 80, direct deposit 81, electronic data interface (EDI interface) 82 based on client particulars as at 83 and via cheque 98. Invoice/billing system can also track payments due as commissions, through communicating with commissions sub-system 84, which can issue commission statements 85. Commissions sub-system 84 and invoice/billing system 29 can also forward appropriate invoice, billing, payment and accounting details to an internal accounting component 86. Accounting component 86 and invoice/billing system 29 can record and track all issued and outstanding cheques 98. The issuing bank 87 can reconcile cheques as at 88 and can track EFT transfers and bank deposits as at 89, which can then be communicated to accounting component 86.

One aspect of the present invention is the "paid when paid" element. The payment option chosen determines when the payment is made. Payment can be upon the completion of the billing period, payment can be a predetermined number of days later (i.e. 30 days) or payment can be made, only when the client has paid for the provided services ("paid when paid"). As for the billing period, the units of work can vary as an option. Some of the more common units are hourly, daily, professional day, weekly, monthly, fixed price.

It will be appreciated that in each step described, the present invention can record and time stamp every system and user action, to provide full information to any inquirer as to what events happened and when.

The present invention incorporates various portals to enable clients, managers, suppliers and sub-suppliers to inquire into the status of their personal matters or responsibilities within the system process. In one embodiment, all parties have secure access with an integrated internal profile controlling the extent and level of detail that they can have access to. Sub-tier suppliers can provide links between individual invoices which the main supplier has processed on their behalf, and can also provide the sub-tier supplier's internal reference numbers to facilitate communication. At every step of the time reporting and invoicing and accounting processes, each action is recorded and time stamped as a means of fully informing any inquirer as to what happened and when.

Figure 15:
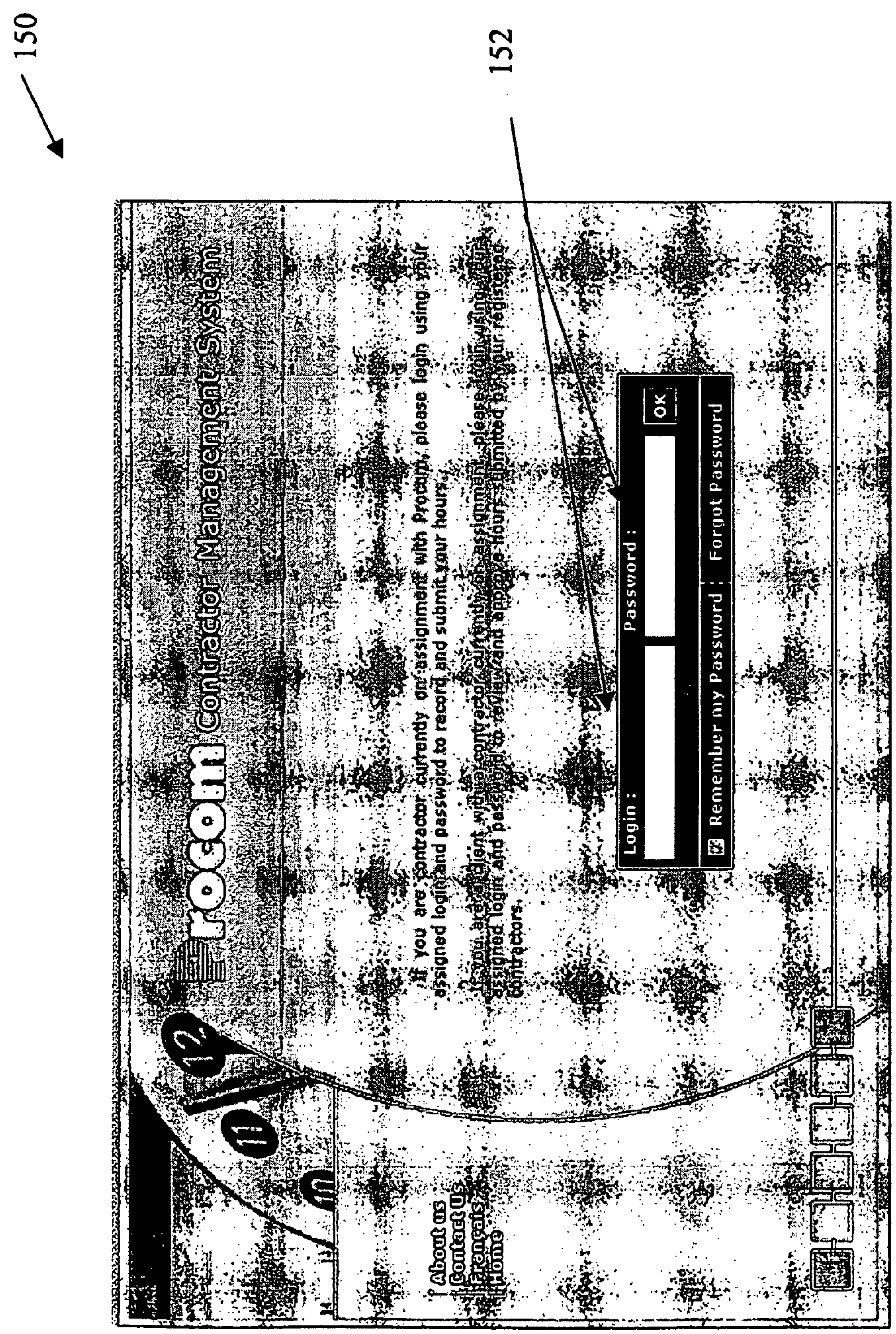

Sample client manager user interfaces are shown in FIGS. 15 through 44. It will be appreciated that a "manager" for purposes of the present application can be a client manager or a project manager for a particular client who has contracted to have timekeepers provide work. A "managing consultant", on the other hand, can be associated with vendor and/or consultant as described above. As shown in the interface 150 in FIG. 15, the manager can access management aspects of the present invention by logging in as at 152 using login procedures as known in the art. As shown in FIG. 16, once logged in, the manager can view and manage timesheets for an individual consultant/timekeeper on a particular contract. In the interface display 160 shown in FIG. 16, the consultant and or timekeeper is identified as at 162 for each timesheet, along with the source and/or supplier as at 164, and the pay period 165, time worked 166, contract end 167, and timesheet status 168. Navigation and selection windows and icons as are known in the art can also be provided to enable the manager to view, print, approve or reject particular timesheets for the given consultant.

Figure 17:
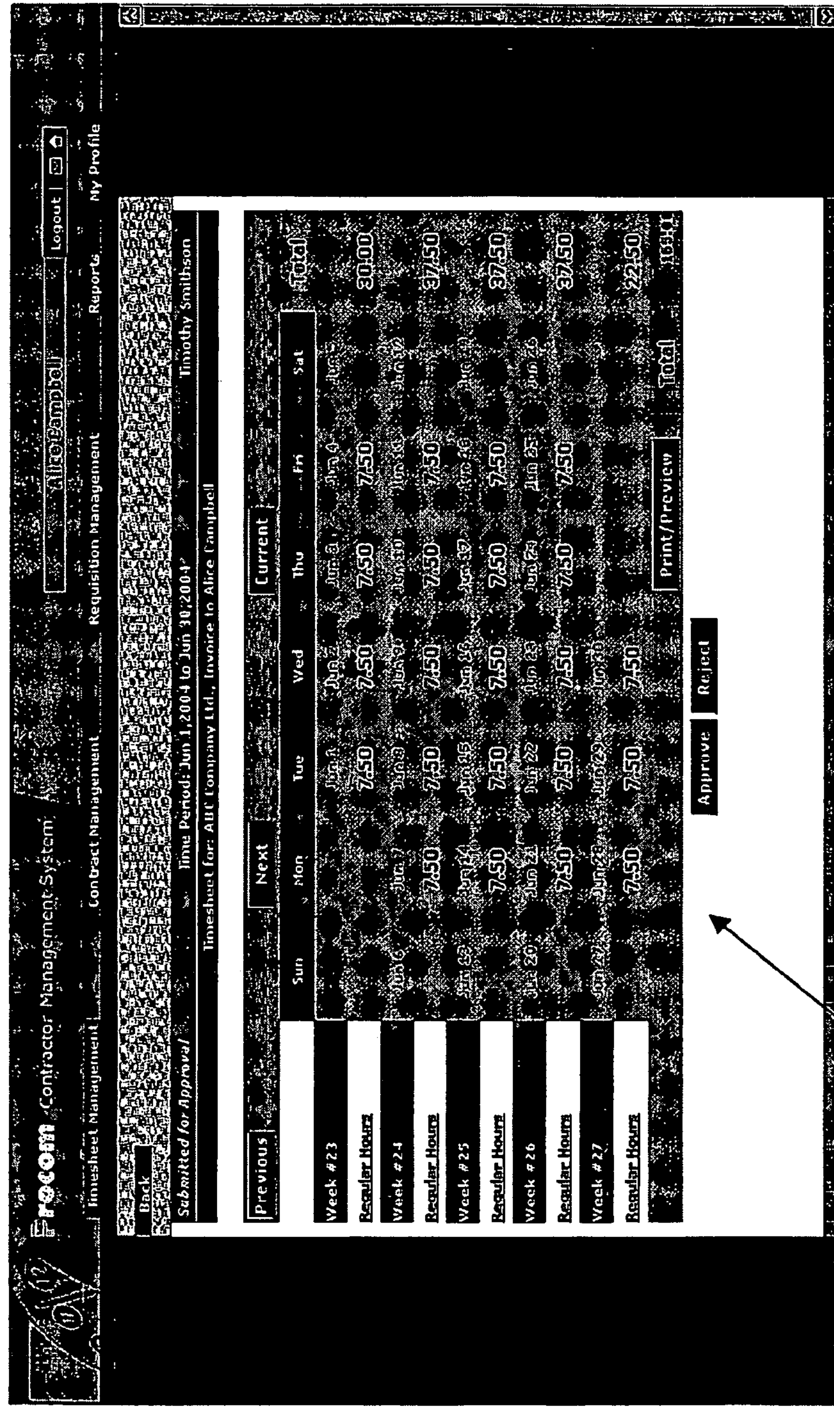
Figure 18:
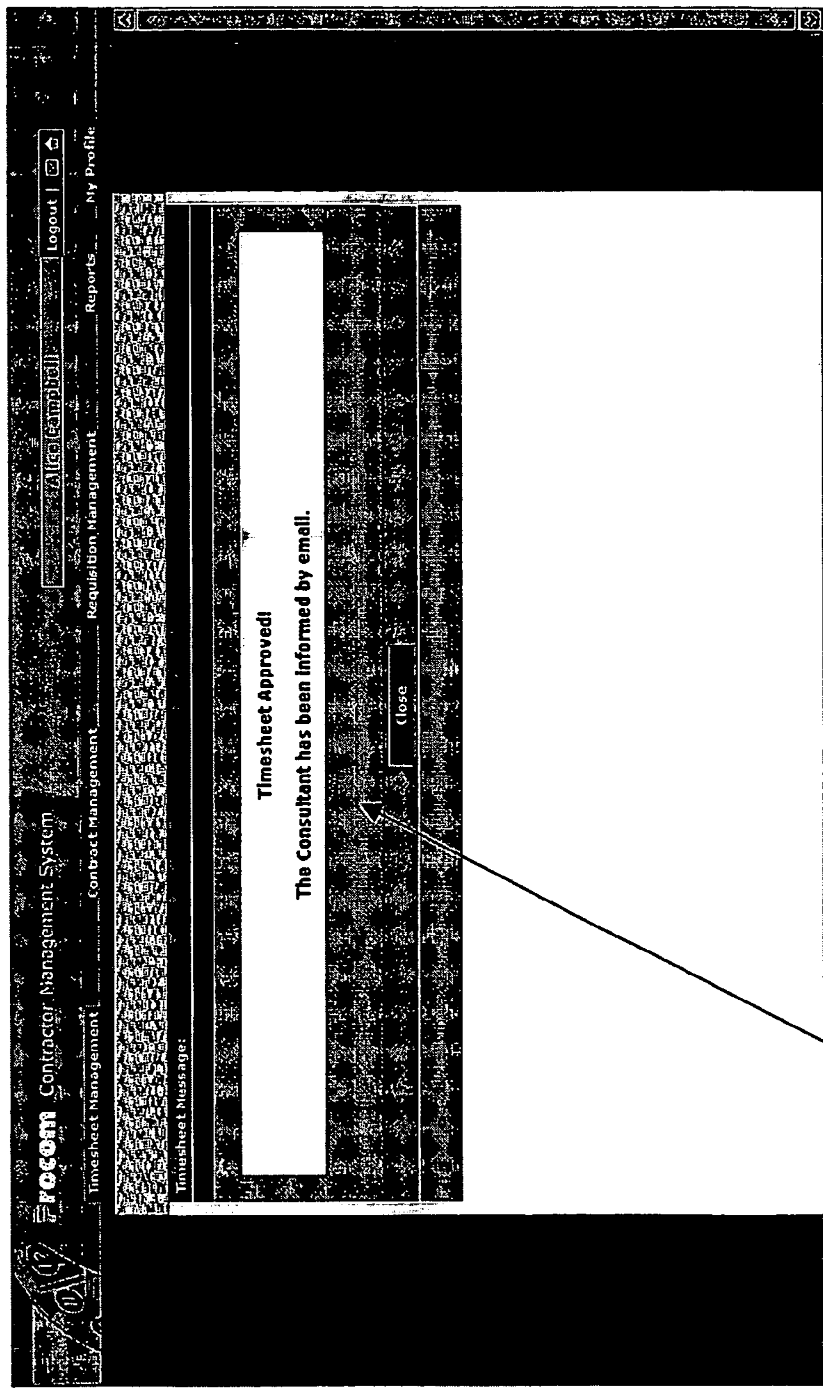
Figure 19:
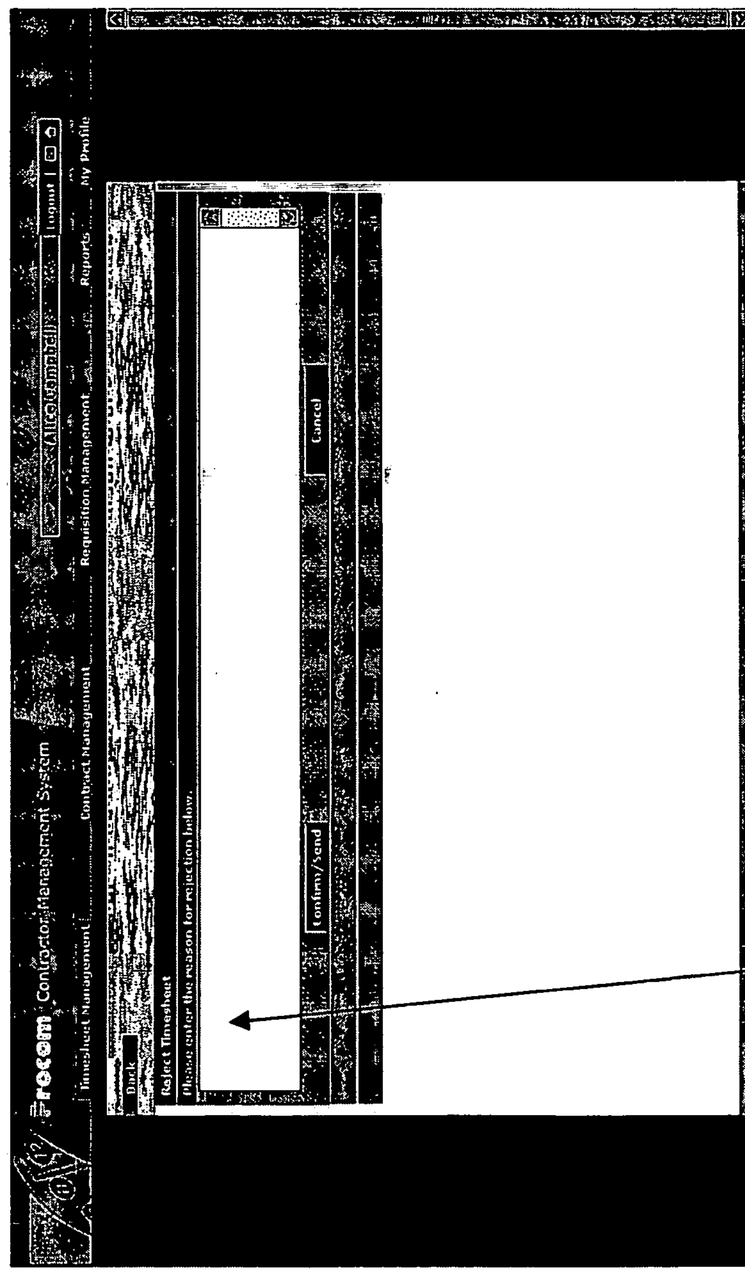
Figure 21:
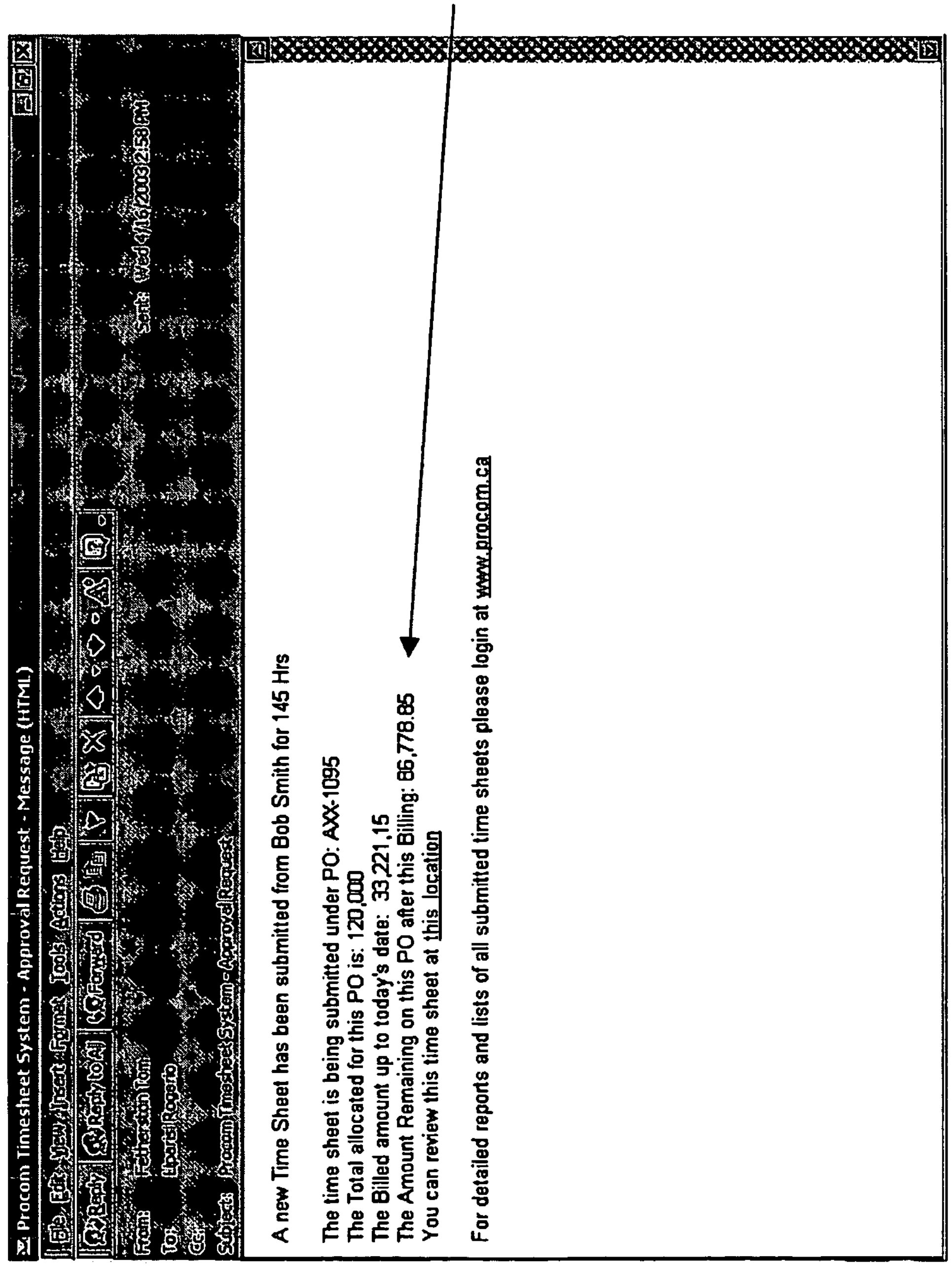
Figure 24:
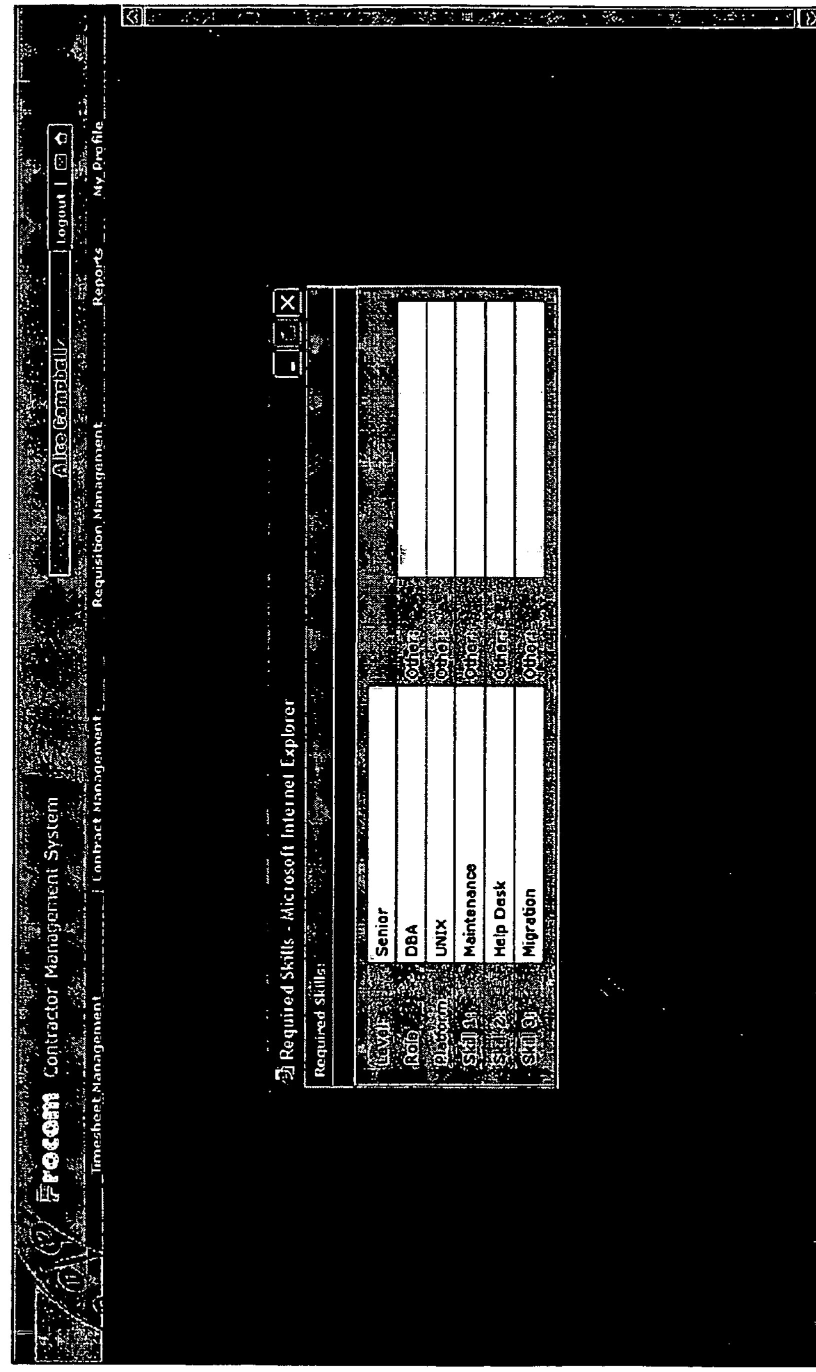
Figure 25:
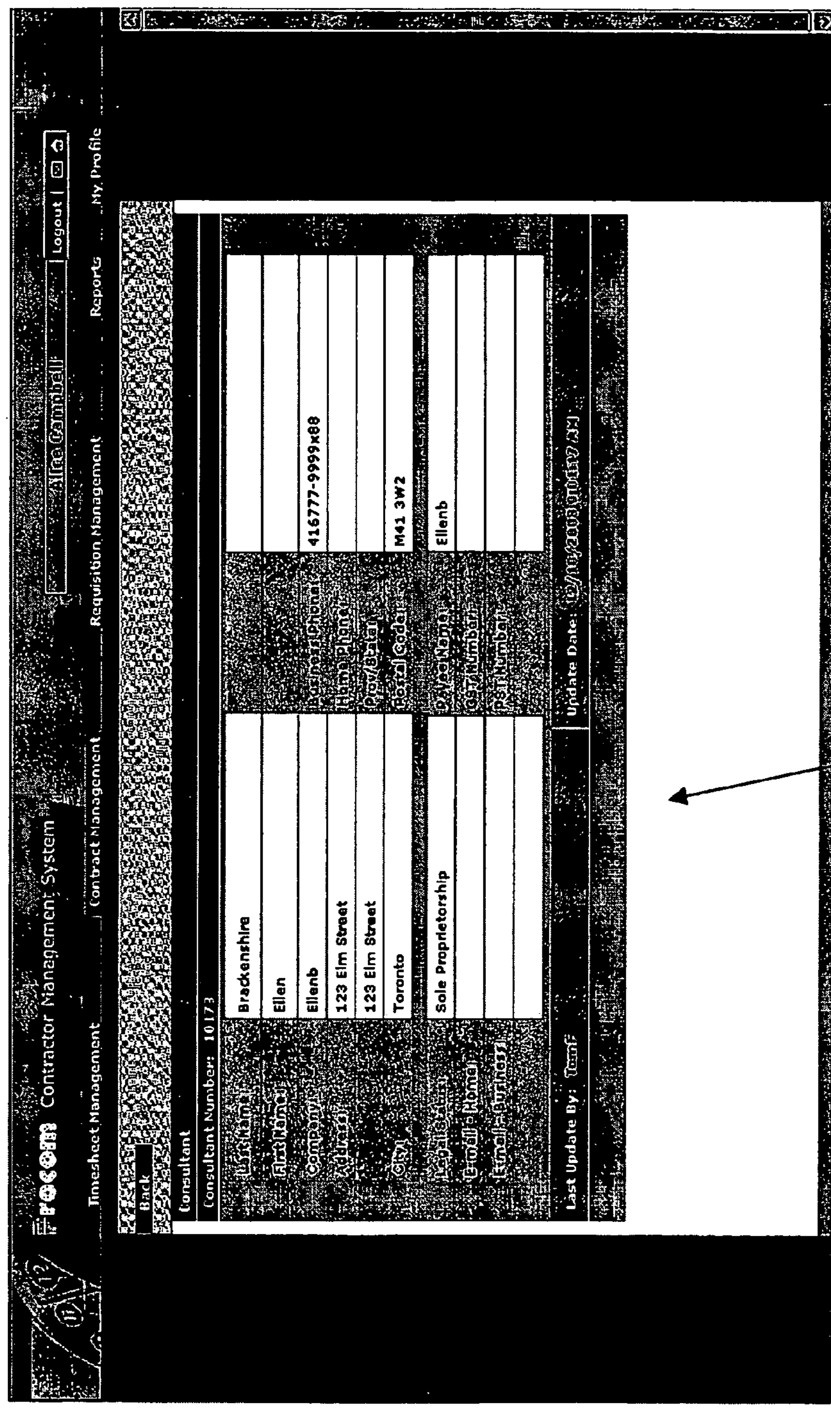
Figure 26:
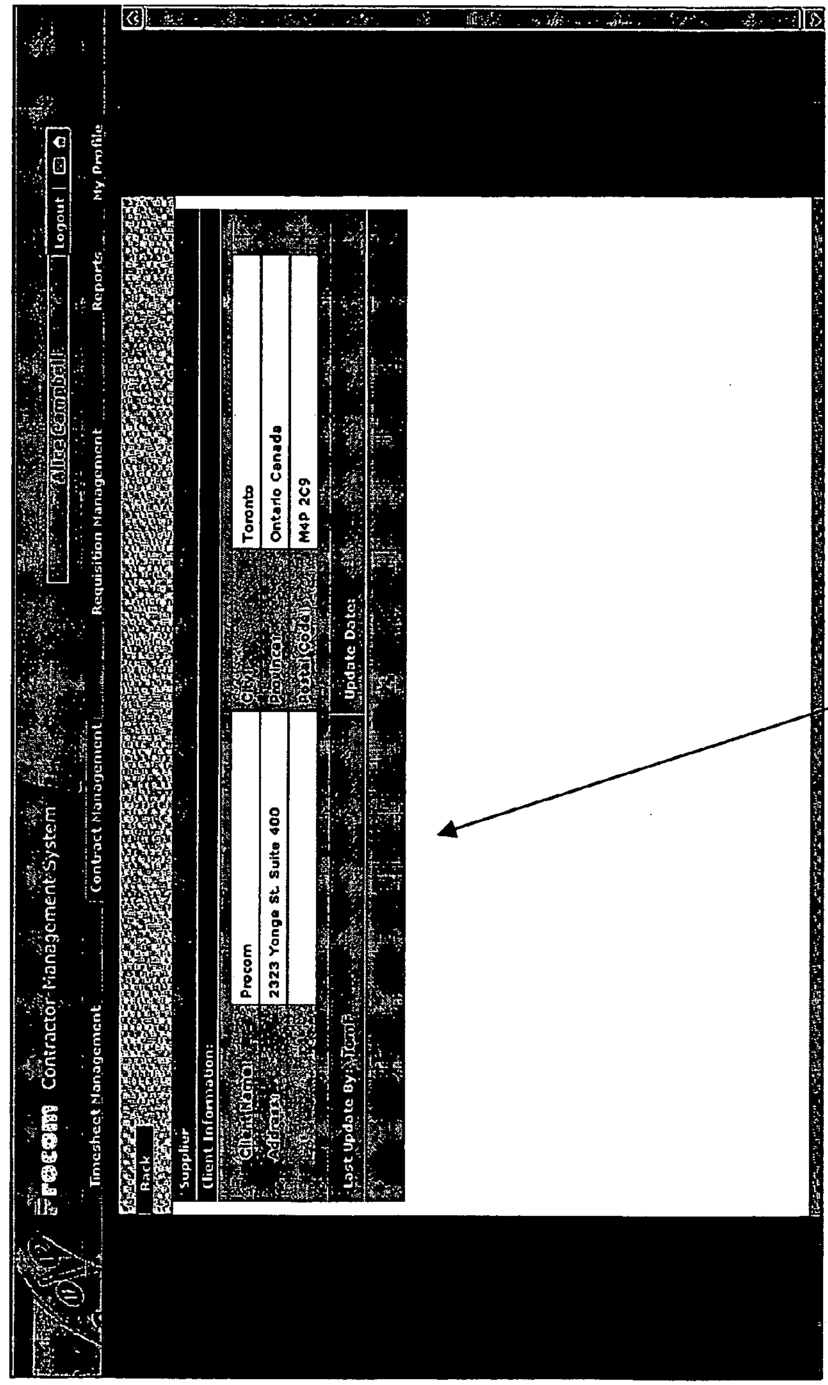
Figure 27:
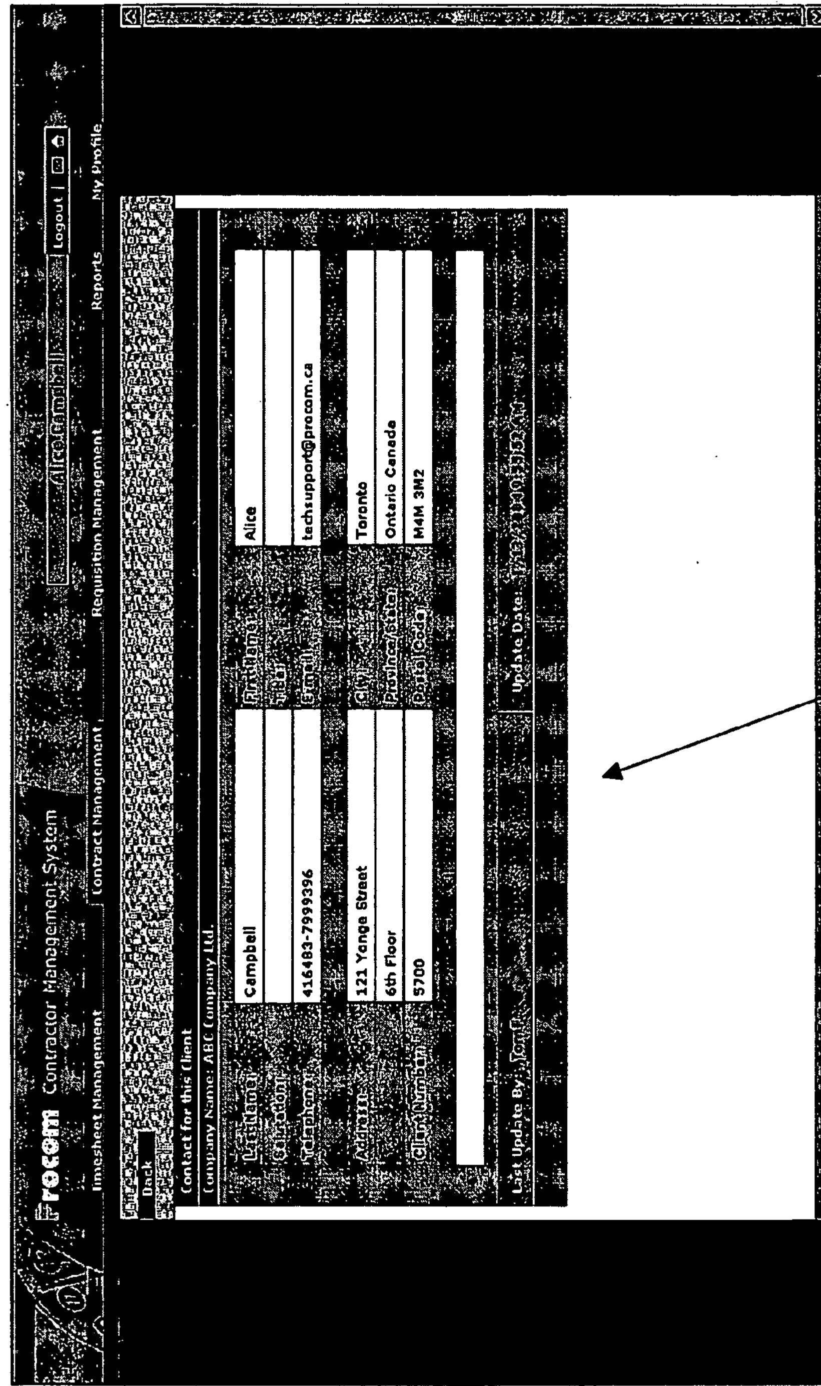

As shown in the interface 170 in FIG. 17, particular time period details 172 can be displayed for a given consultant in calendar format, for example. As shown in the interface 180 in FIG. 18, upon approval of a given submitted timesheet, the manager can receive a confirmation message as shown at 182, indicating that the system of the present invention has proceeded to notify the consultant. If the manager elects to reject the timesheet, a window can be provided as at 192 in interface 190 of FIG. 19, and the manager can enter the reason for rejecting the timesheet. As shown in interface 200 in FIG. 20, once the consultant's time sheet has been completed, the consultant can sign and send the timesheet electronically for approval, or if required, the consultant can print out the timesheet and subsequently sign the hard copy of the timesheet for transmittal to the client by fax or other means, as described above. Such traditional signature method can be called a "blue ink" signature method. As shown in the interface 210 in FIG. 21, notification of a time sheet submission can be by email, and appropriate details can be provided in the body of the email as at 212.

Figure 22:
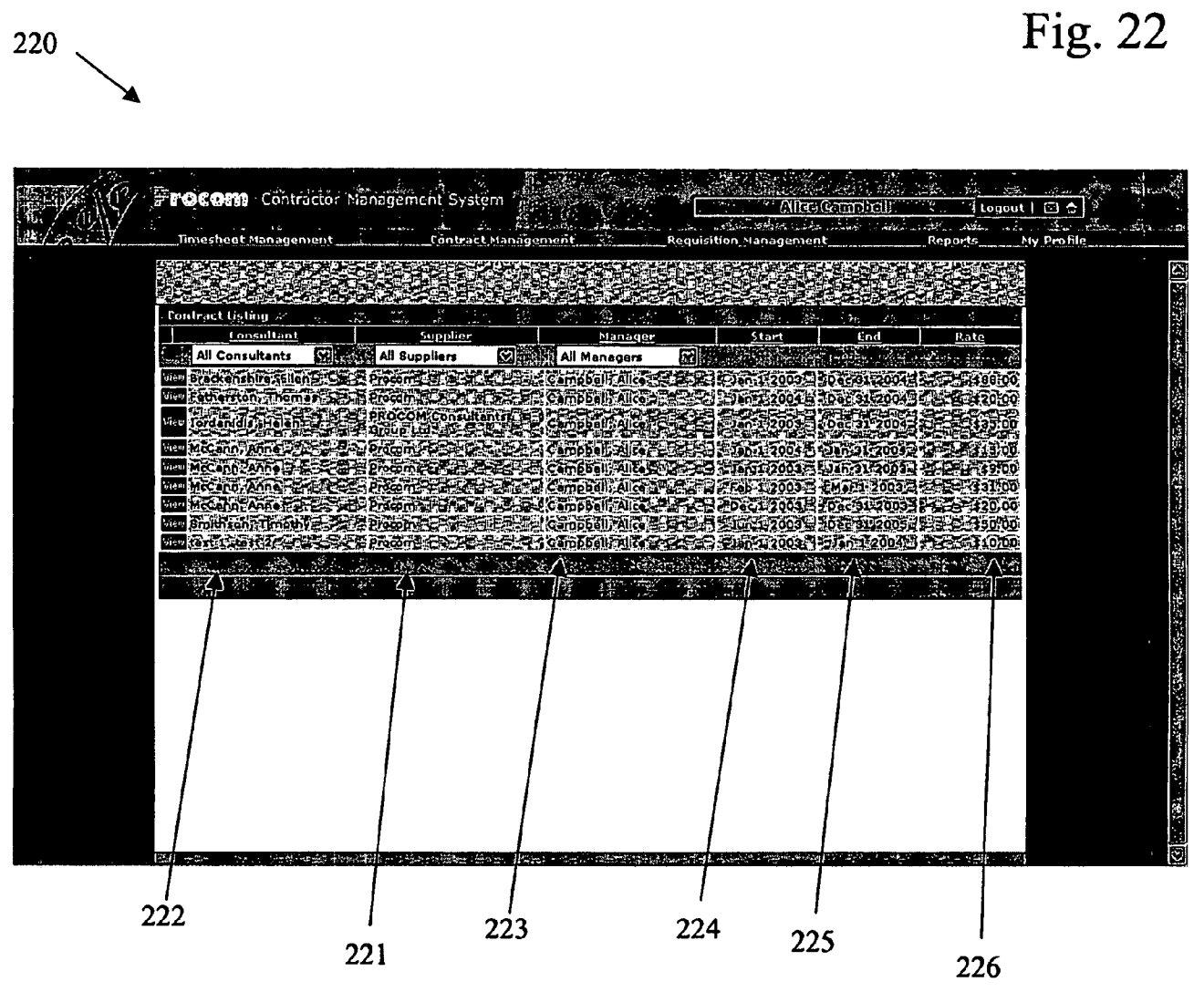
Figure 23:
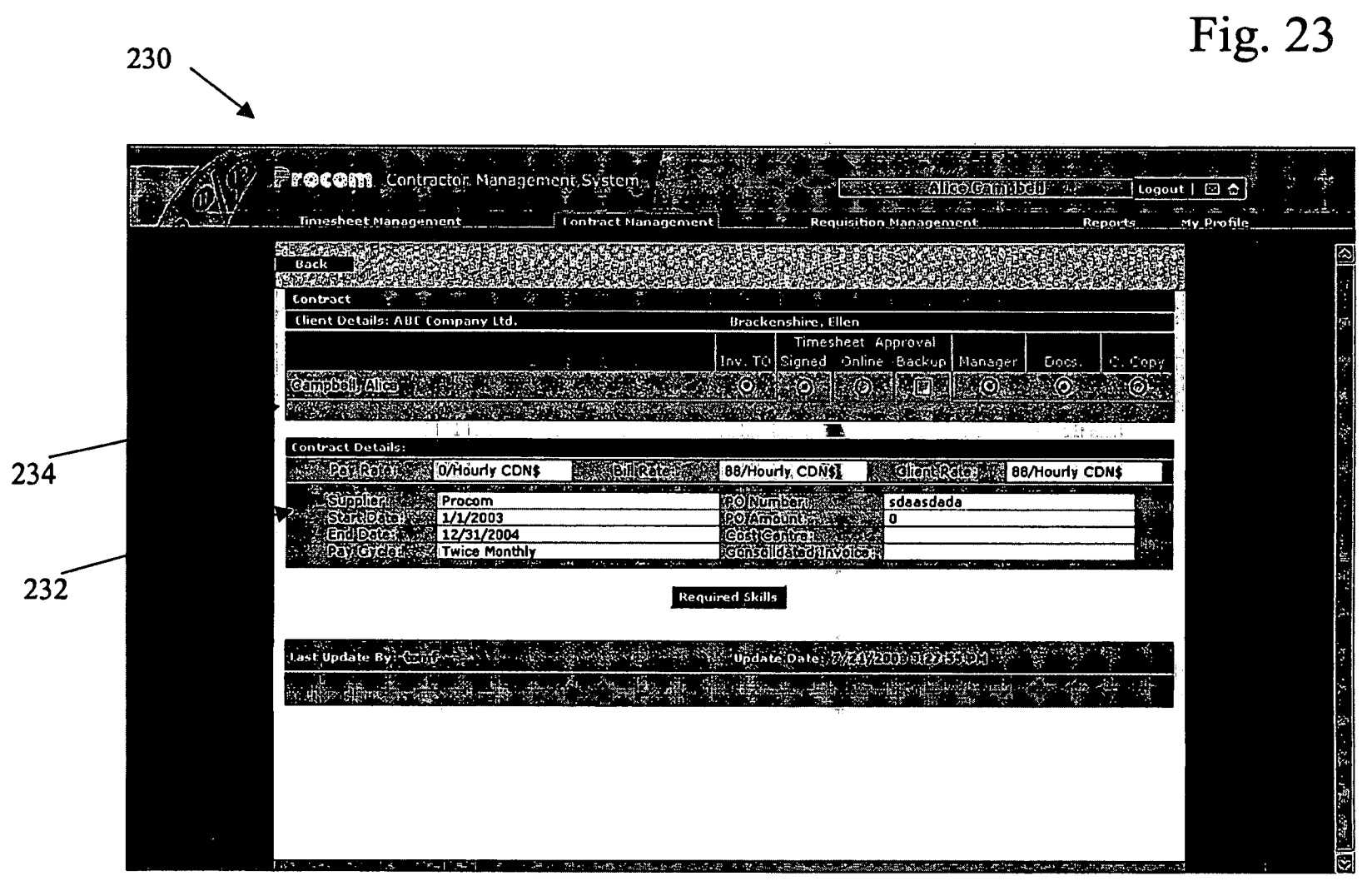

As shown in interface 220 of FIG. 22, the manager can view all contracts under management, including the supplier 221 of the timekeeper, the timekeeper's name 222, manager's name 223, start date 224, end date 225, and rate 226, for example. As shown in interface 230 of FIG. 23, contract 232 and client 234 details can be entered and/or displayed for editing. As shown in interface 240 of FIG. 24, required skills 242 can be entered and/or displayed for editing, such as might occur in creating a requisition for contracted labor, for example. As shown in interface 250 of FIG. 25, consultant details can be entered and/or displayed for editing as at 252. As shown in interface 260 of FIG. 26, supplier details 262 can be entered and/or displayed for editing. As shown in interface 270 of FIG. 27, client contact information 272 can be entered and/or displayed for editing.

Figure 28:
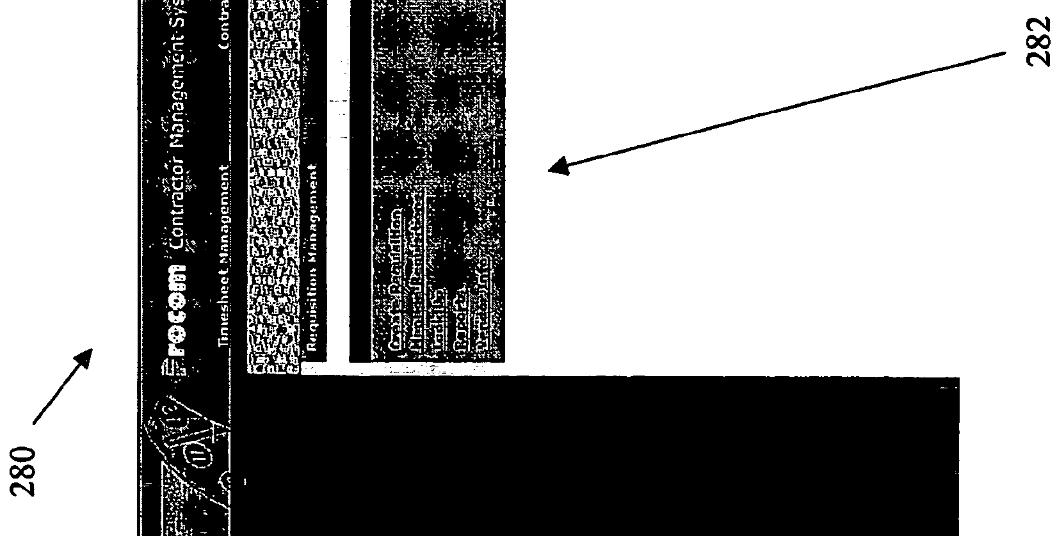
Figure 29:
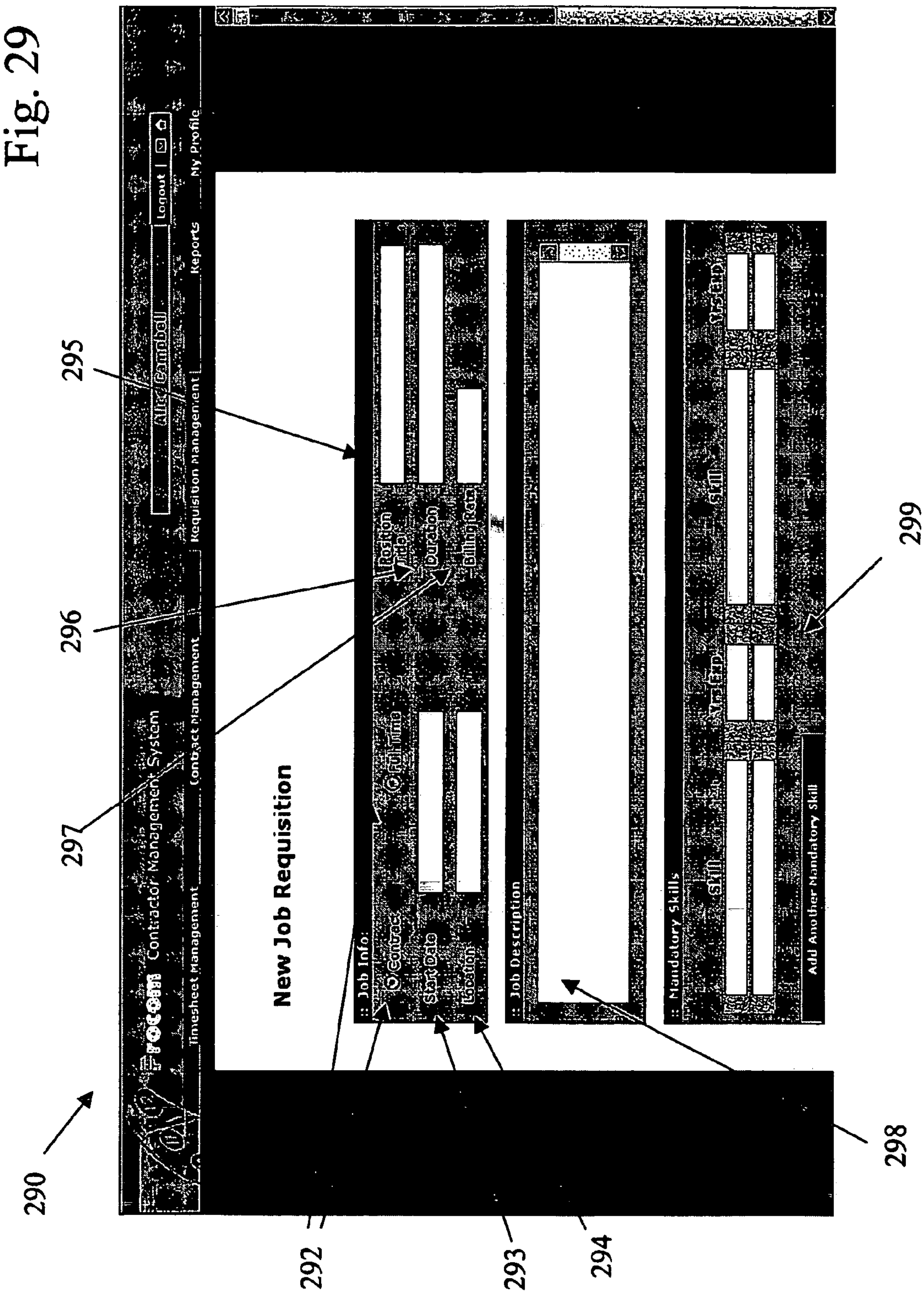
Figure 30:
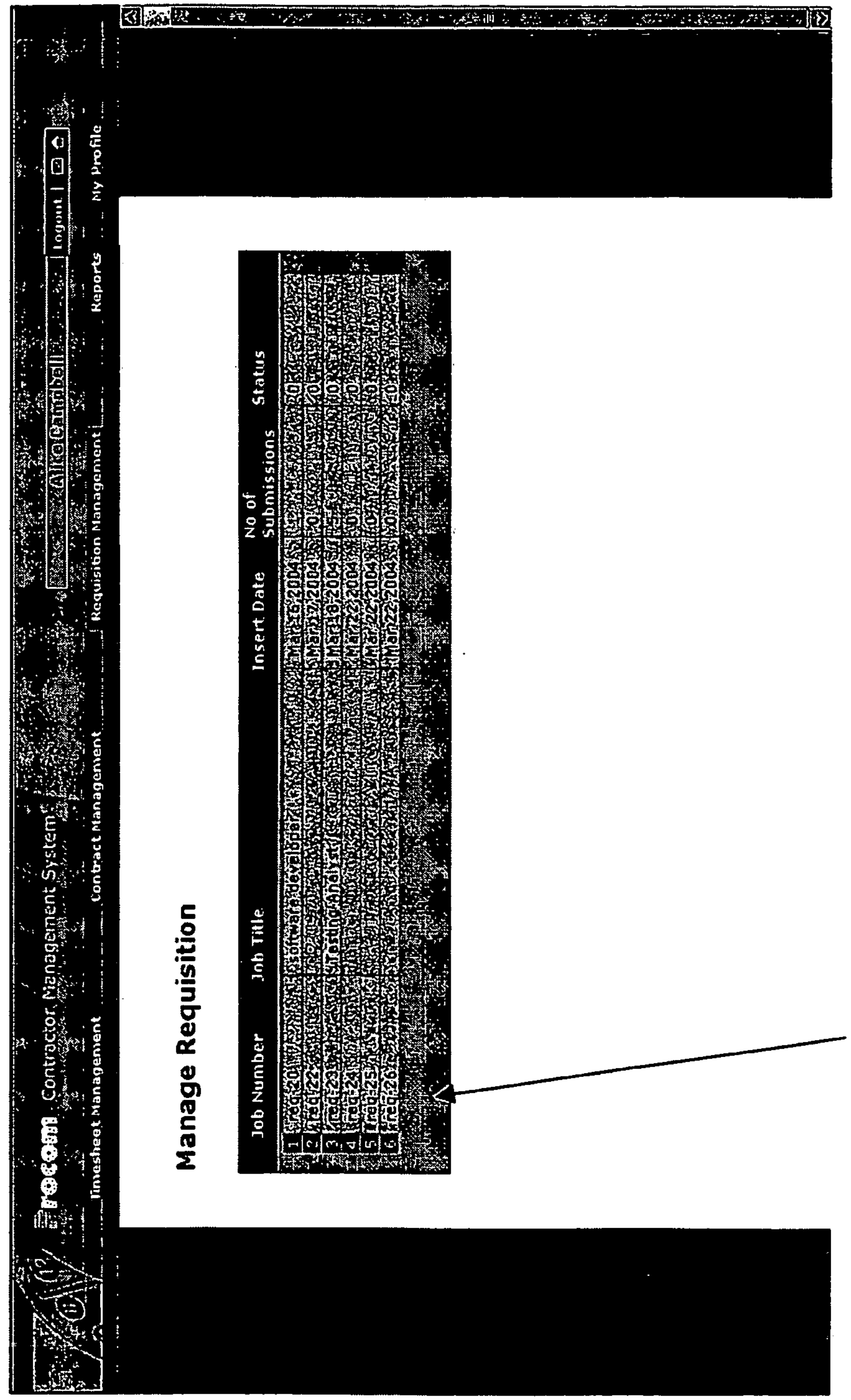
Figure 31:
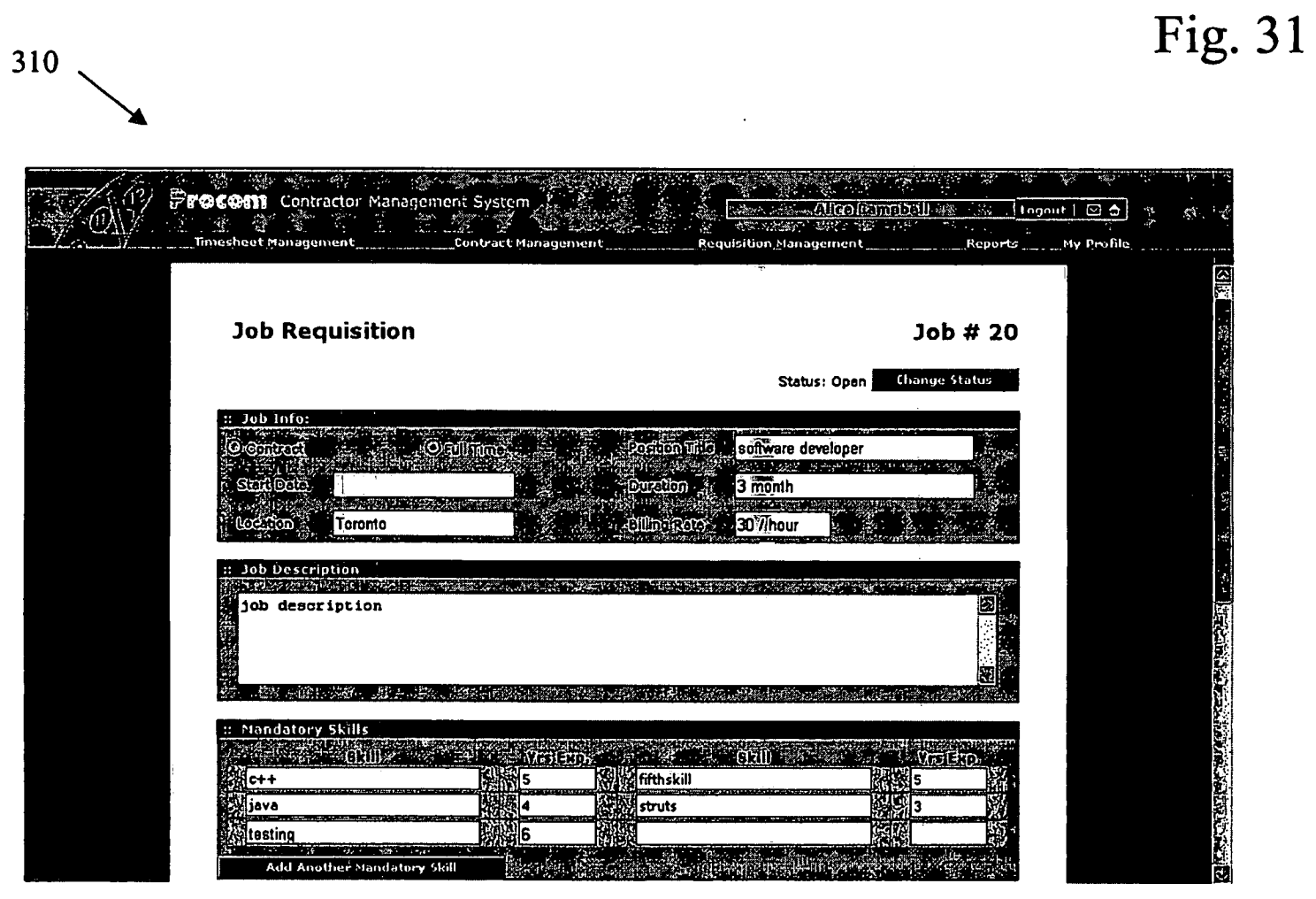
Figure 32:
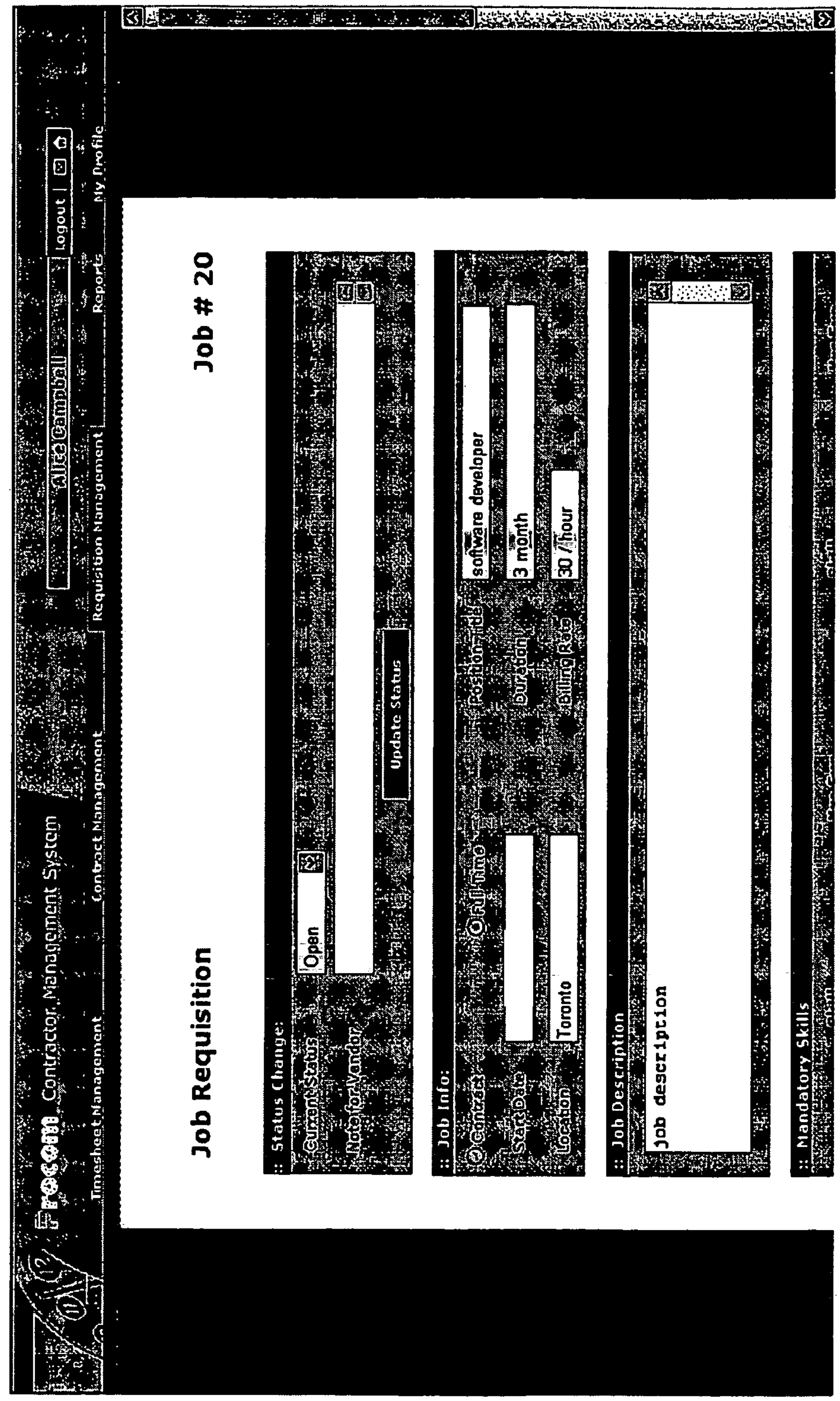
Figure 33:
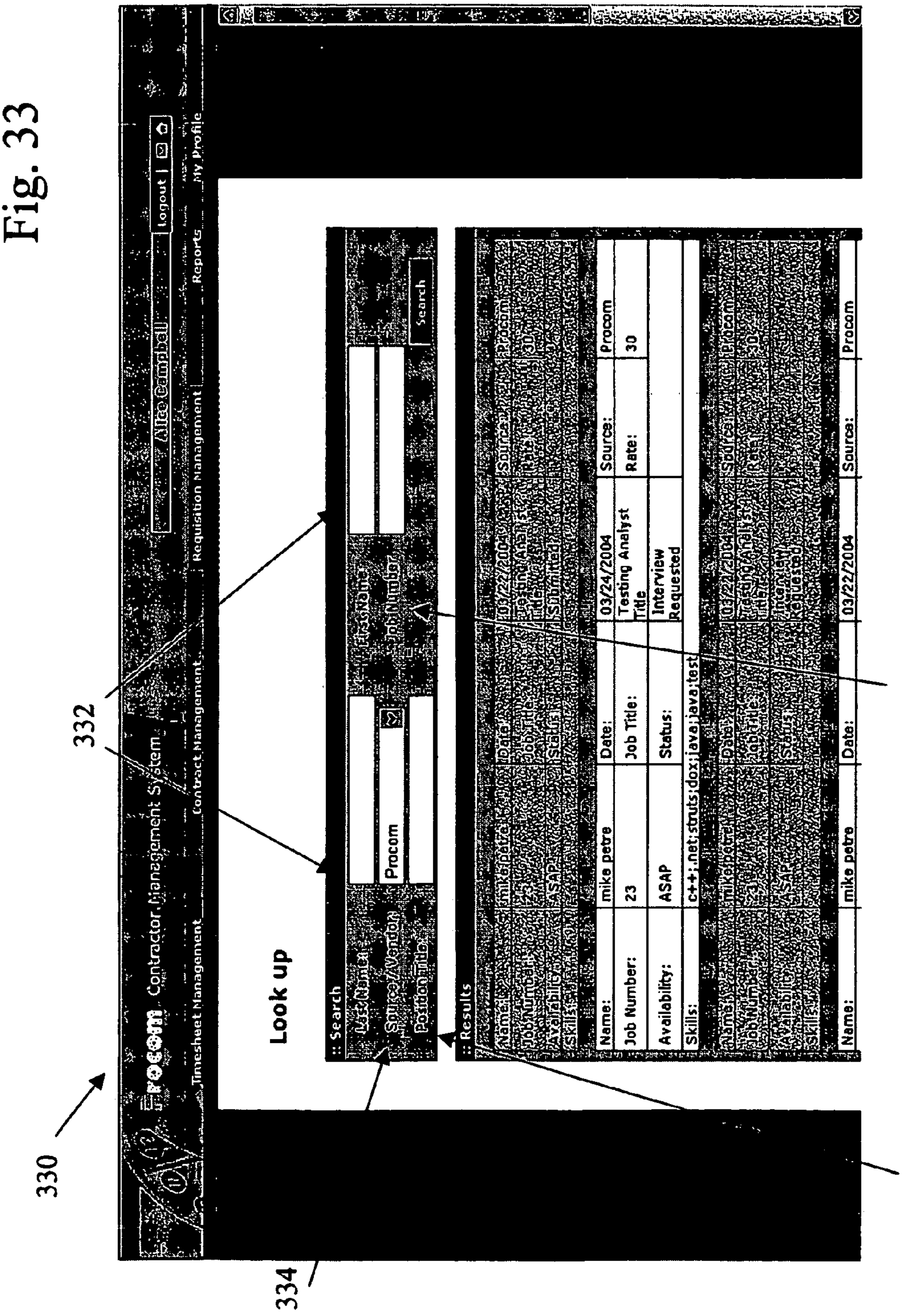
Figure 34:
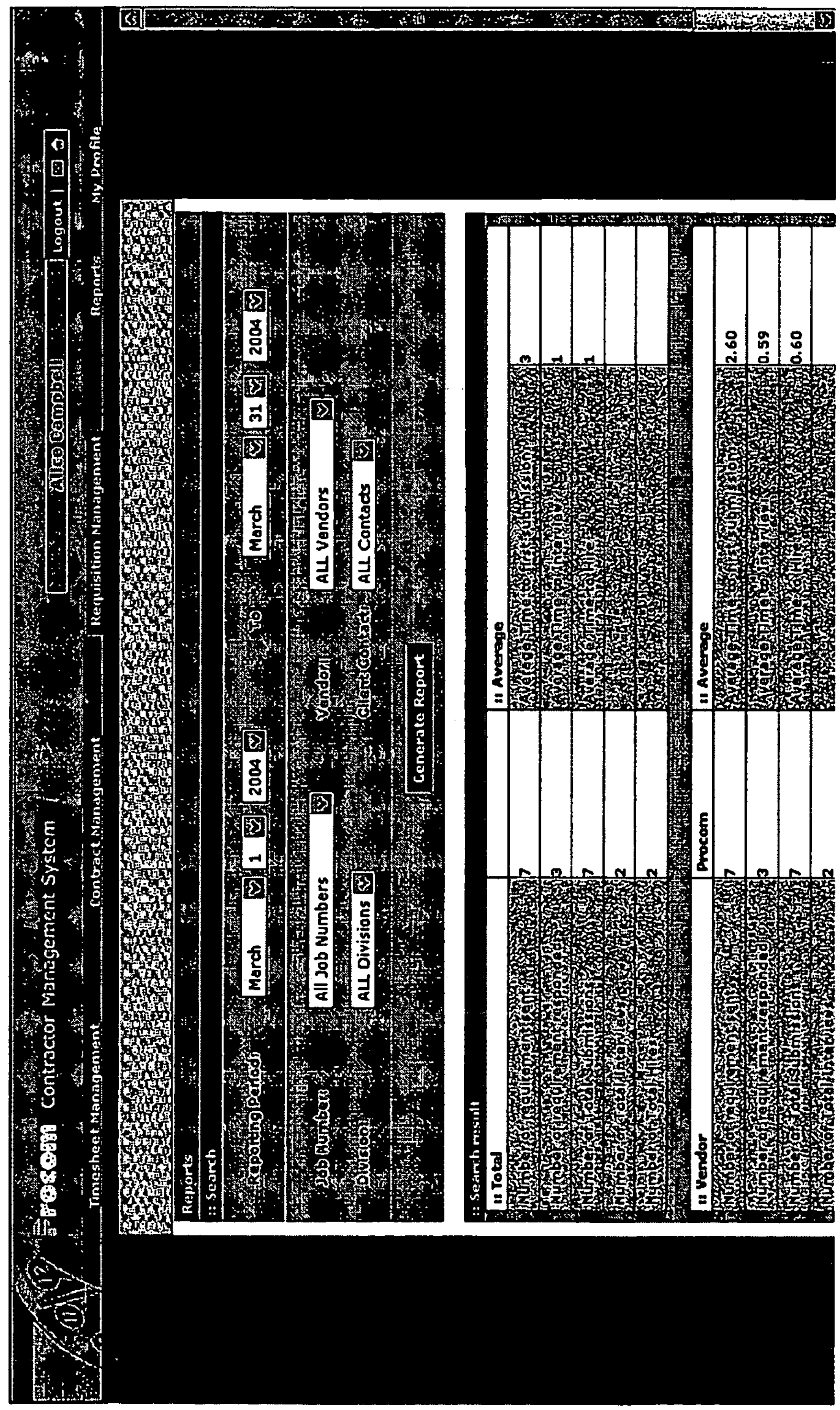
Figure 35:
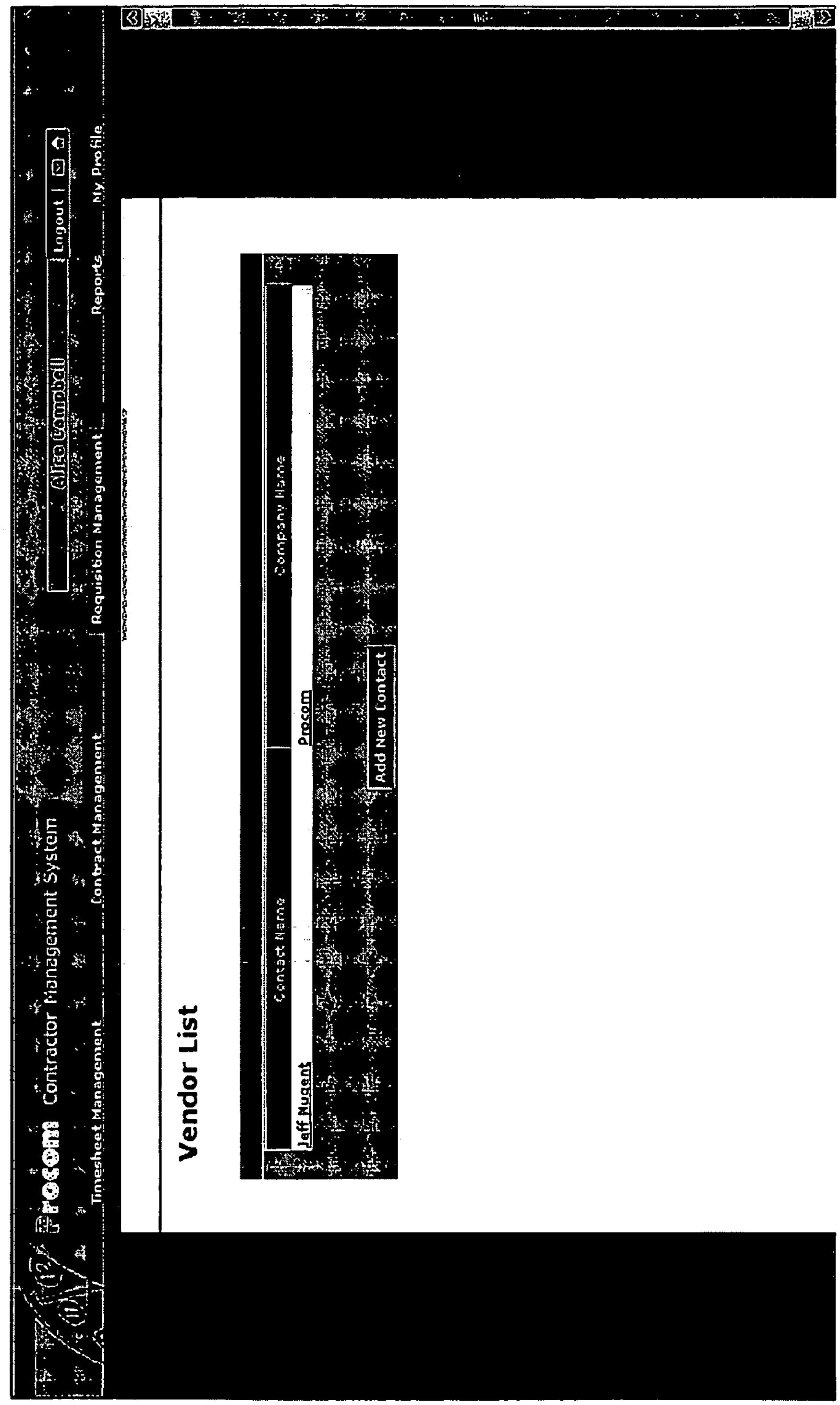
Figure 36:
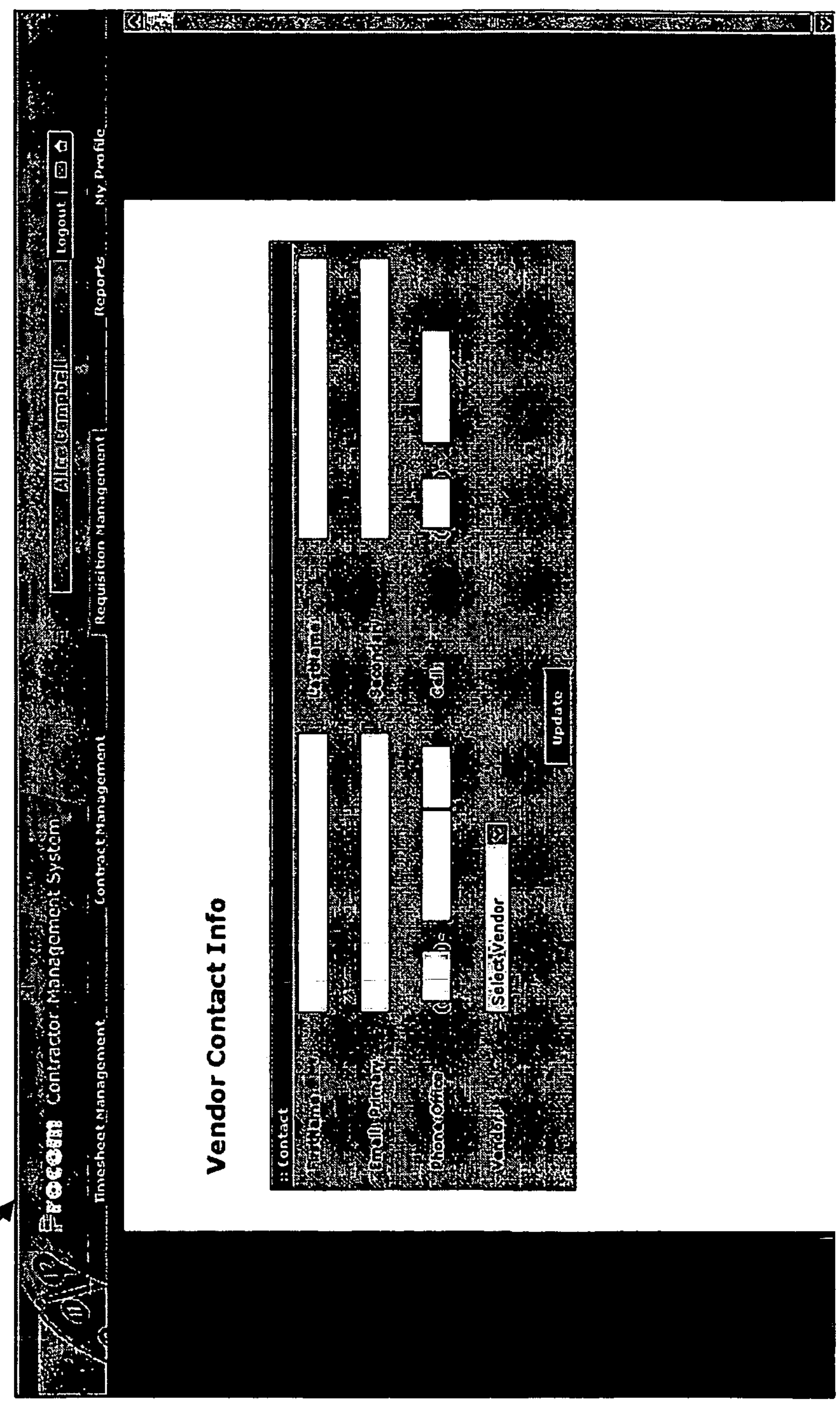

As shown in interface 280 of FIG. 28, the manager can also manage requisitions using the system of the present invention, with a requisition management window shown at 282. As shown in FIG. 29, a new job requisition interface 290 can have input areas for various elements such as type of job (contract or full time) 292, start date 293, location 294, position title 295, duration 296, billing rate 297, job description 298, and mandatory skills 299, for example. As shown in interface 300 of FIG. 30, the manager can view and manage requisitions according to job number 302, for example. FIGS. 31 and 32 show sample user interfaces 310 and 320, respectively, for changing the status of a particular job requisition already entered into the system of the present invention. FIG. 33 shows a sample interface 330 for searching for job requisitions by such example criteria as contractor name 332, supplier/source 334, position title 336 and job number 338. FIG. 34 is a sample interface 340 for creating and generating relevant reports related to managed requisitions. FIGS. 35 and 36 show interfaces 350 and 360 which allow vendor/supplier information to be entered and/or edited.

Figure 37:
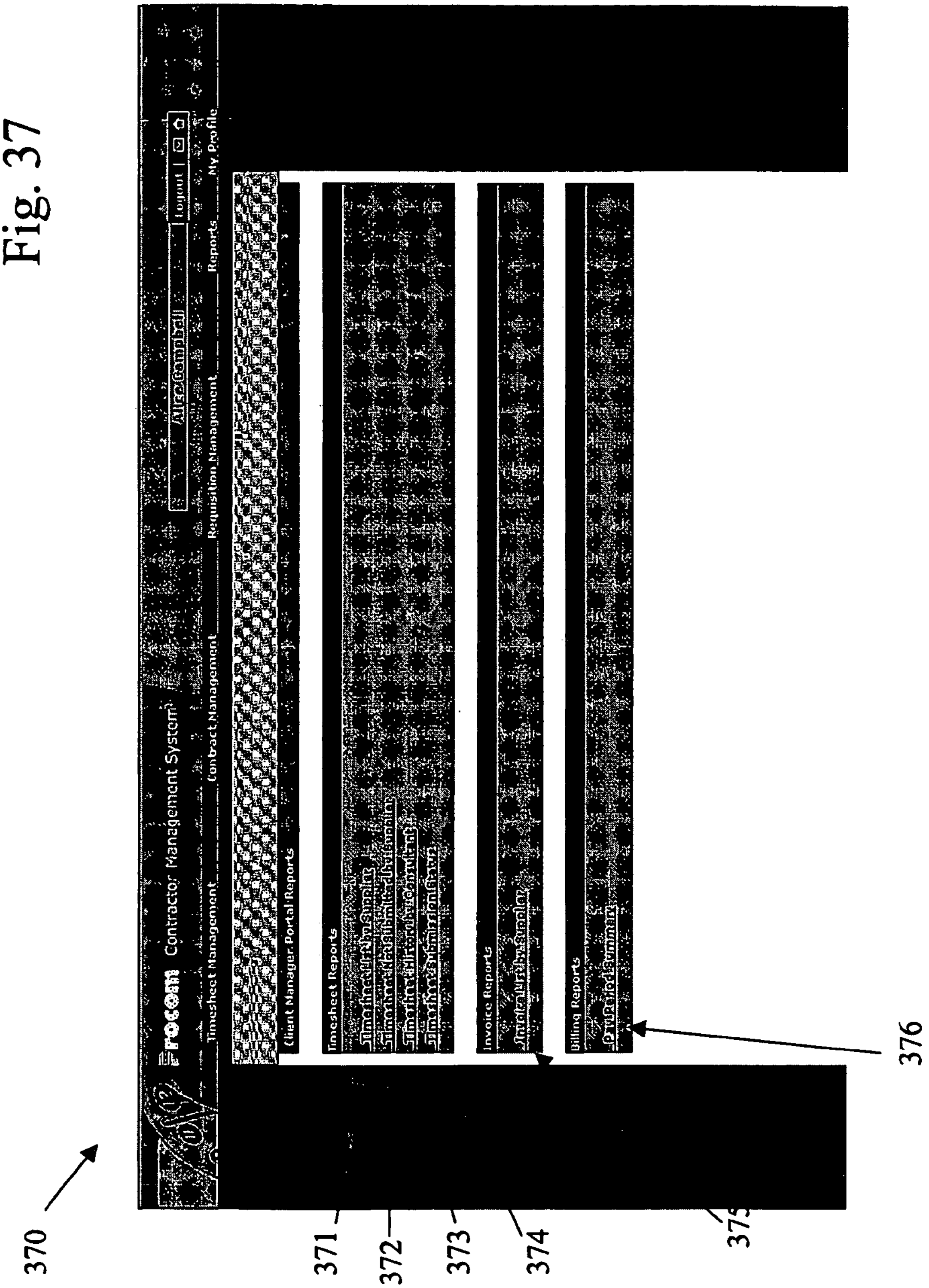
Figure 38:
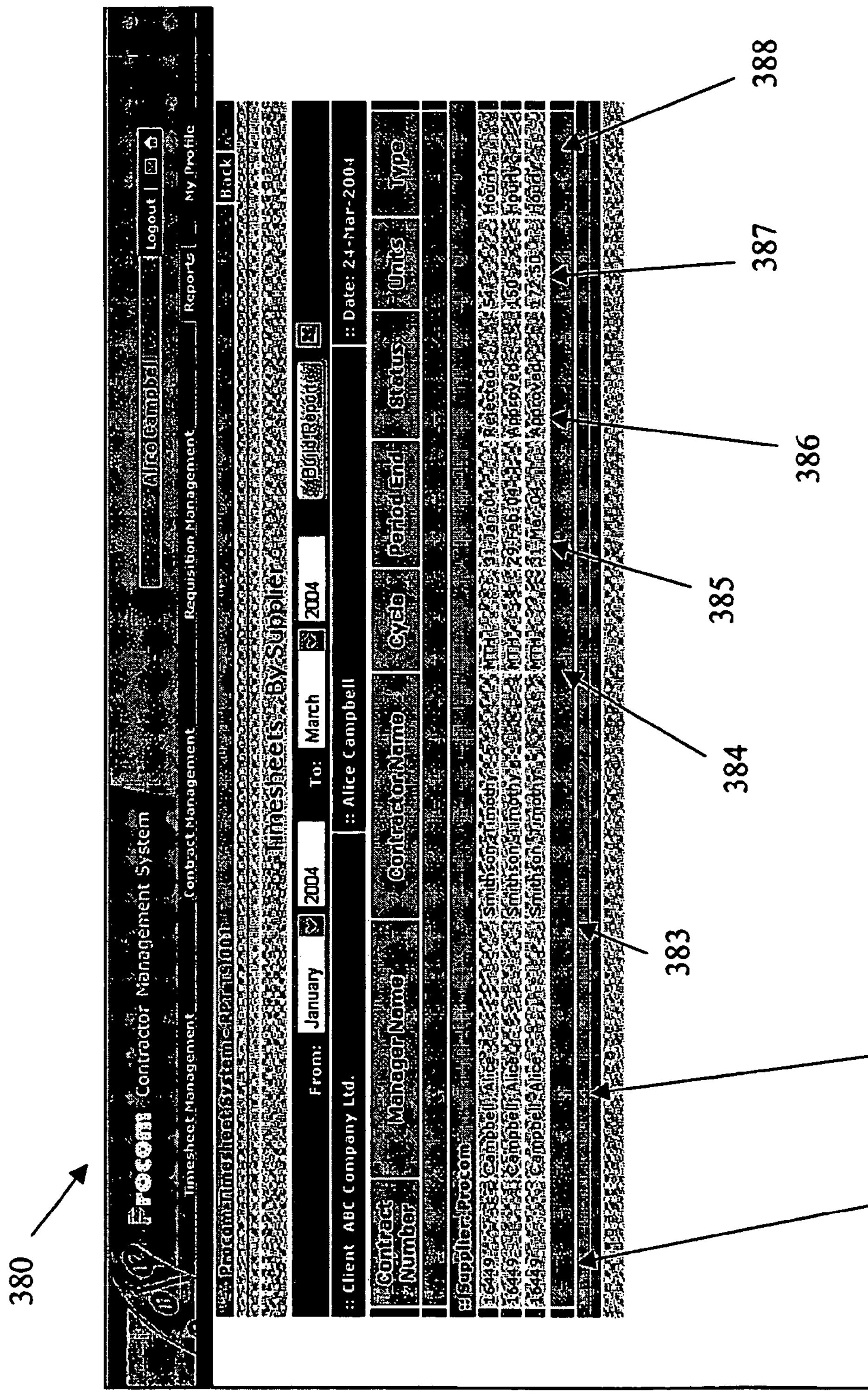
Figure 39:
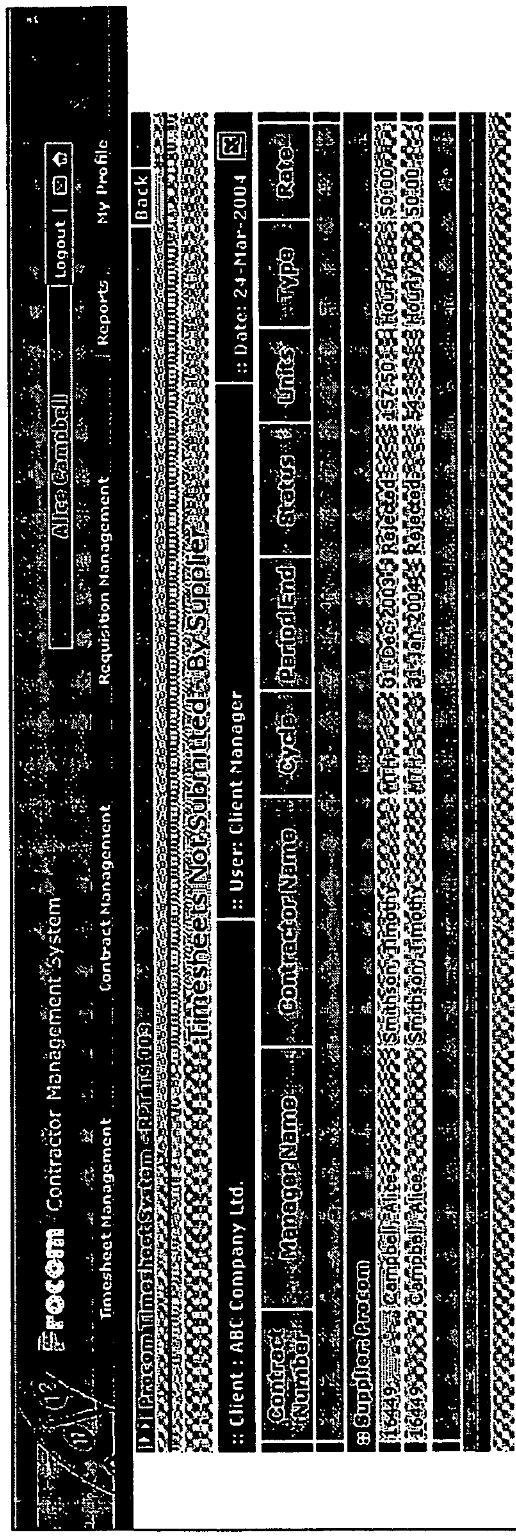
Figure 41:
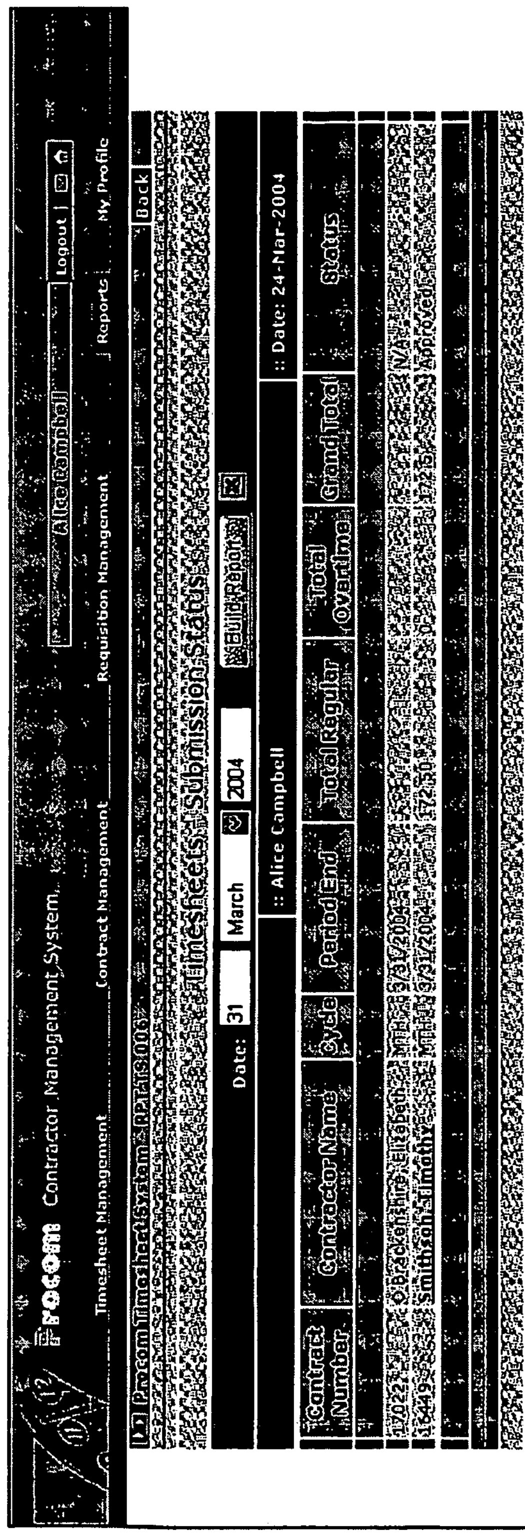
Figure 43:
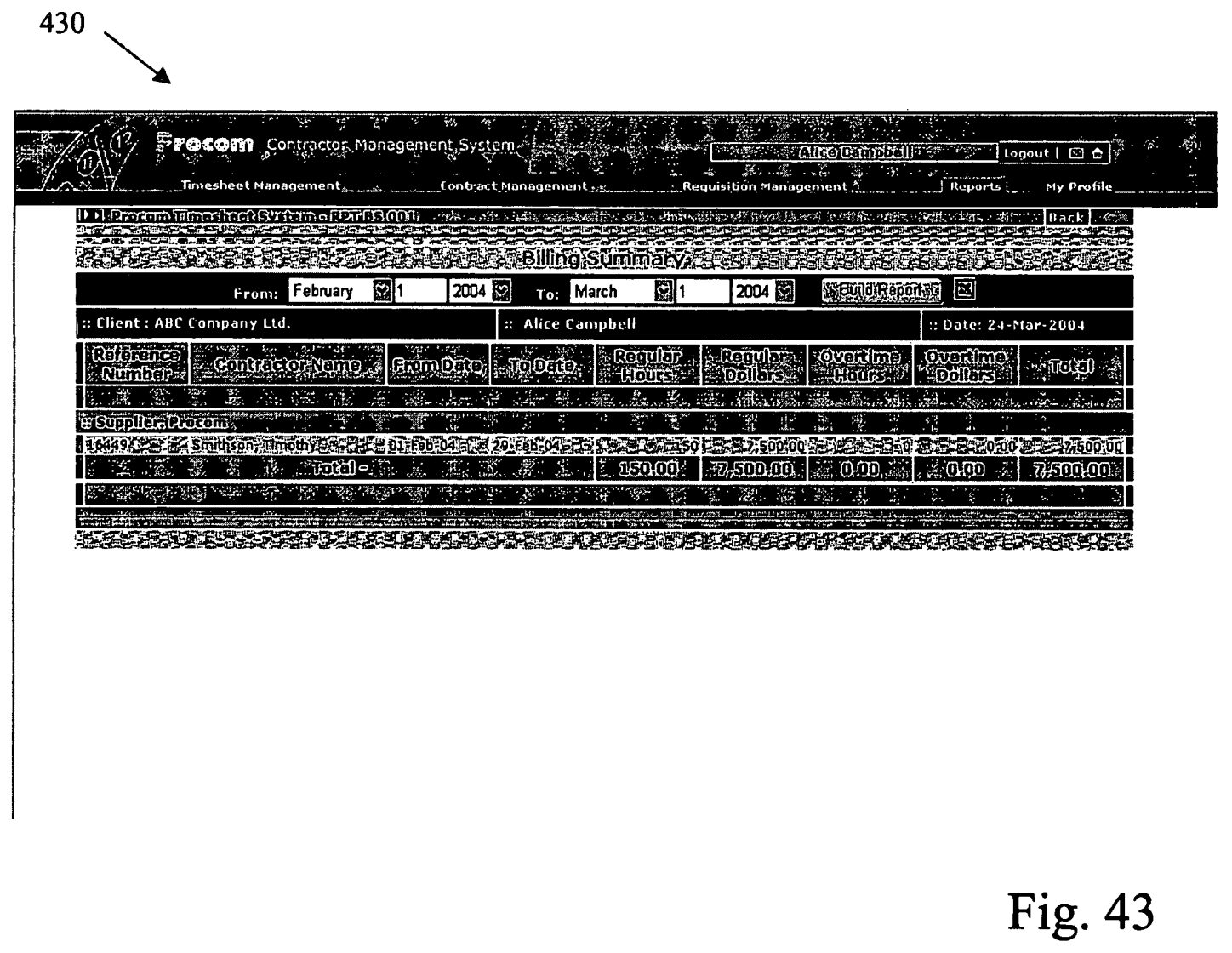
Figure 44:
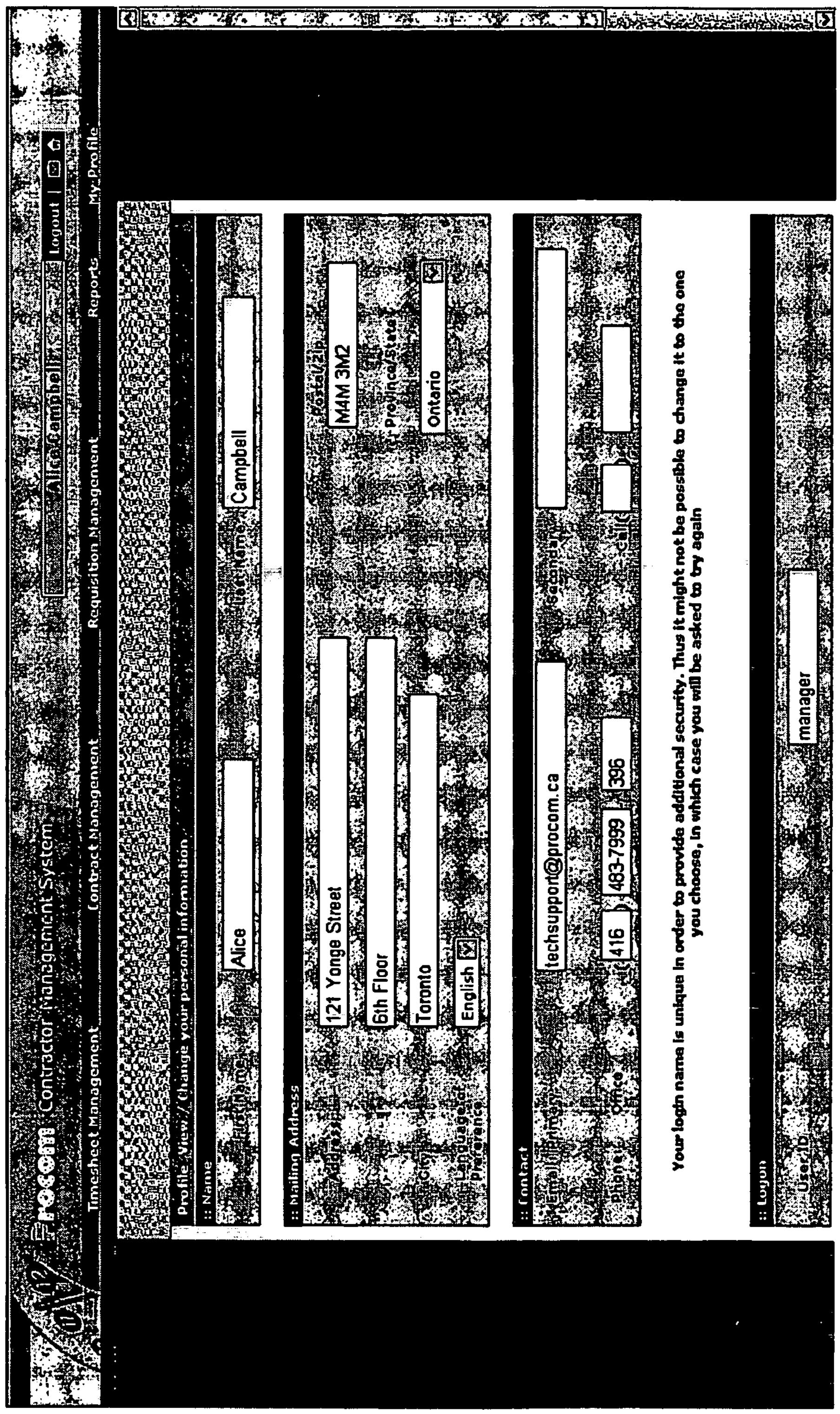

FIG. 37 shows a user interface 370 identifying various report types which might be prepared for the manager, including for example, timesheet list by supplier 371, timesheet not submitted by supplier 372, timesheet history by consultant 373, timesheet submission status 374, invoice list by supplier 375, and pay period summary 376. FIG. 38 shows a sample report 380 of timesheets by supplier, including contract number 381, manager name 382, contractor name 383, cycle 384, period end 385, status 386, units 387, and type 388, for example. FIG. 39 shows a sample report 390 of timesheets not submitted for a given supplier using the same delimiters as shown in FIG. 38. FIG. 40 shows a sample report 400 for timesheet history by consultant. FIG. 41 shows a sample report 410 for timesheets submission status. FIG. 42 shows a sample report 420 for invoice lists for a given supplier. FIG. 43 shows a sample billing summary 430. FIG. 44 shows a sample profile view 440 for the manager interacting with this subset of functionality associated with the present invention.

Figure 45:
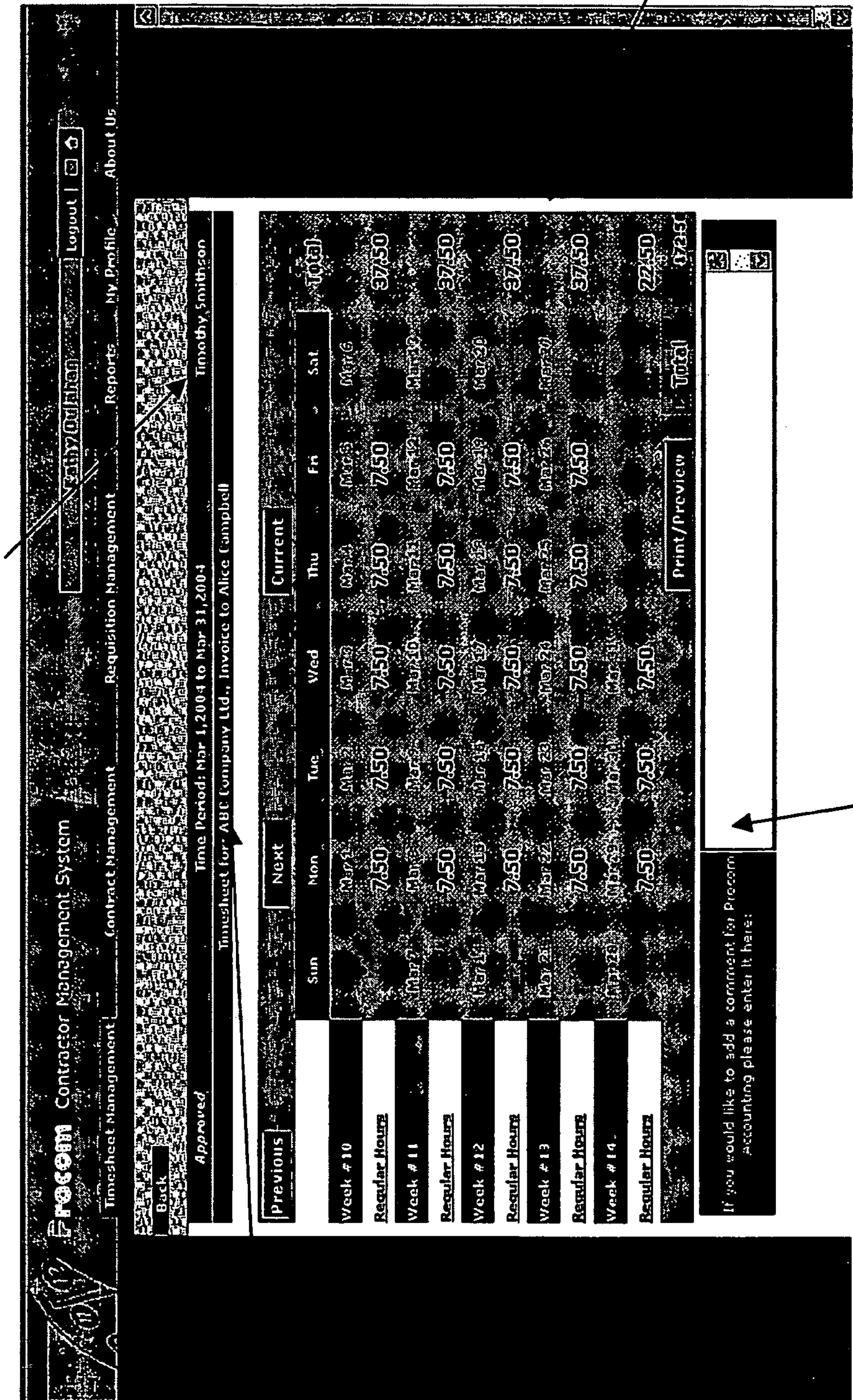
Figure 46:
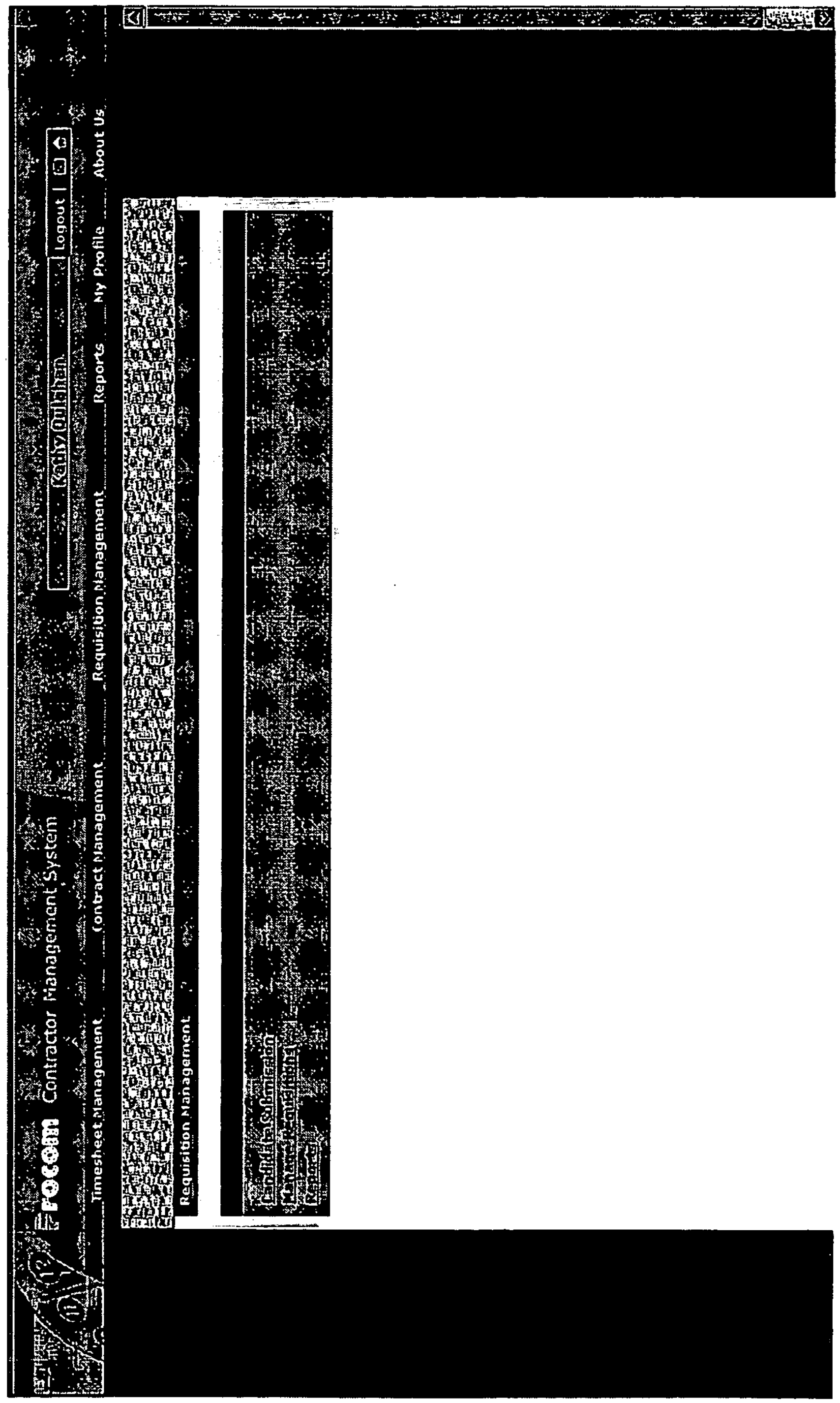
Figure 47:
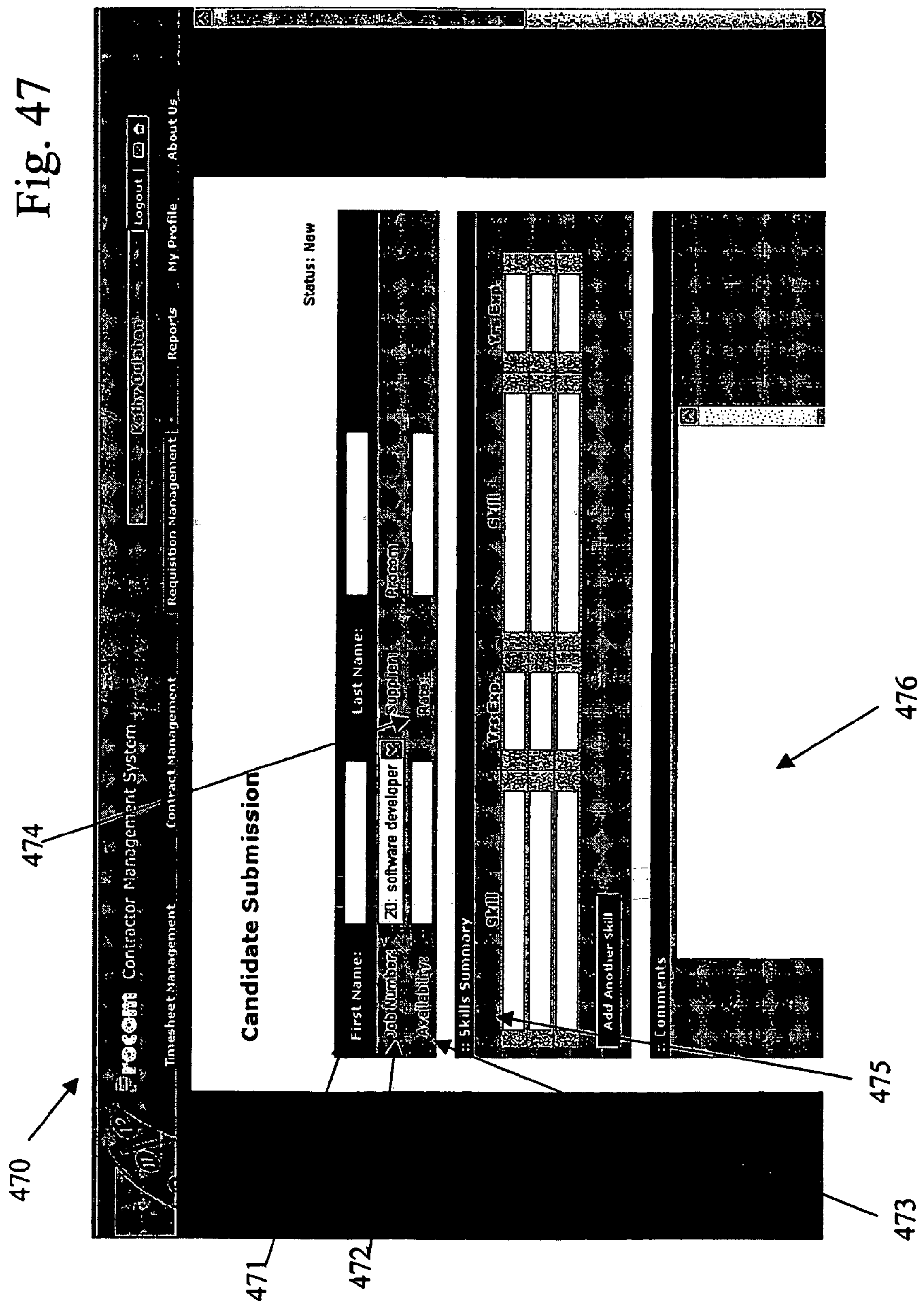
Figure 48:
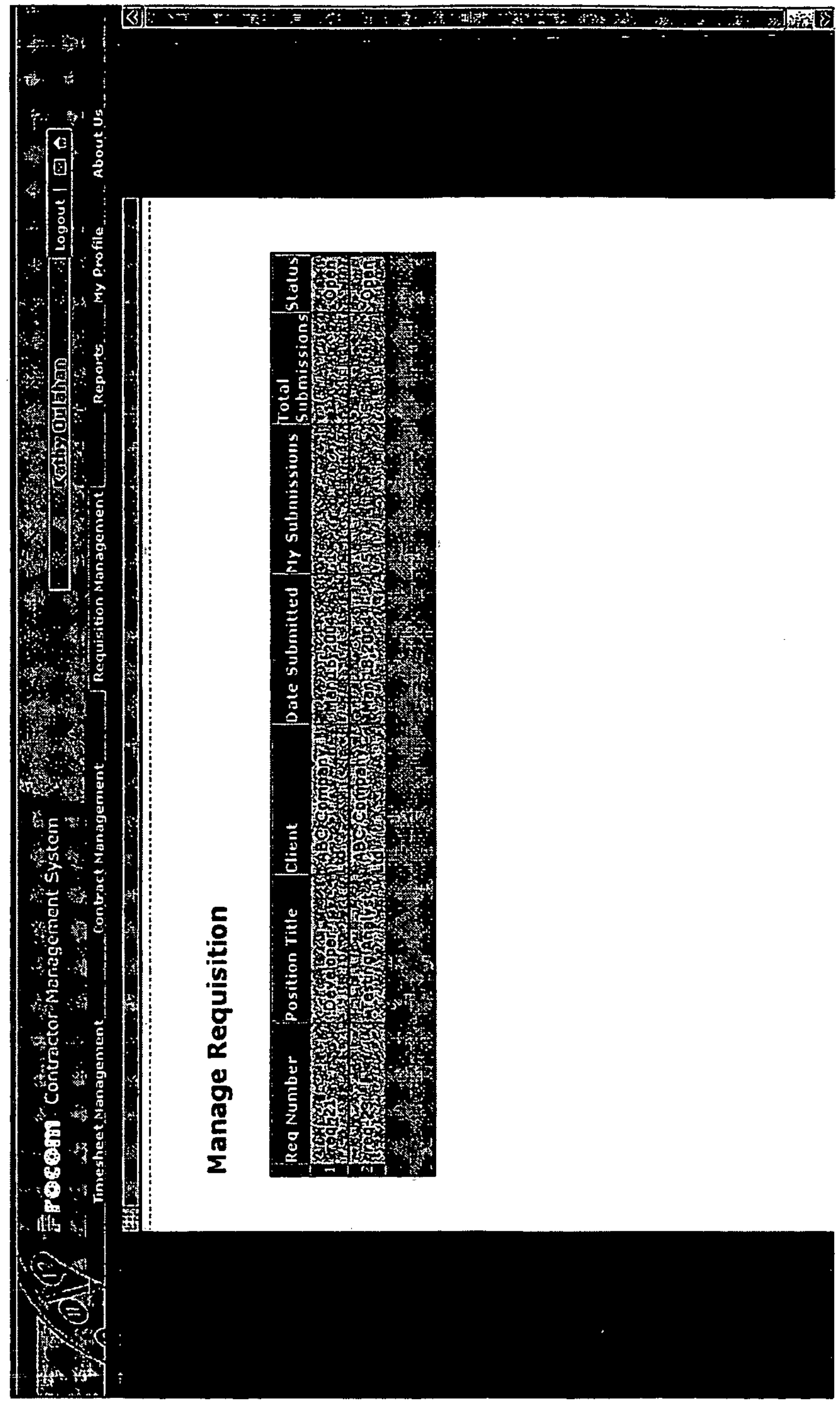
Figure 49:
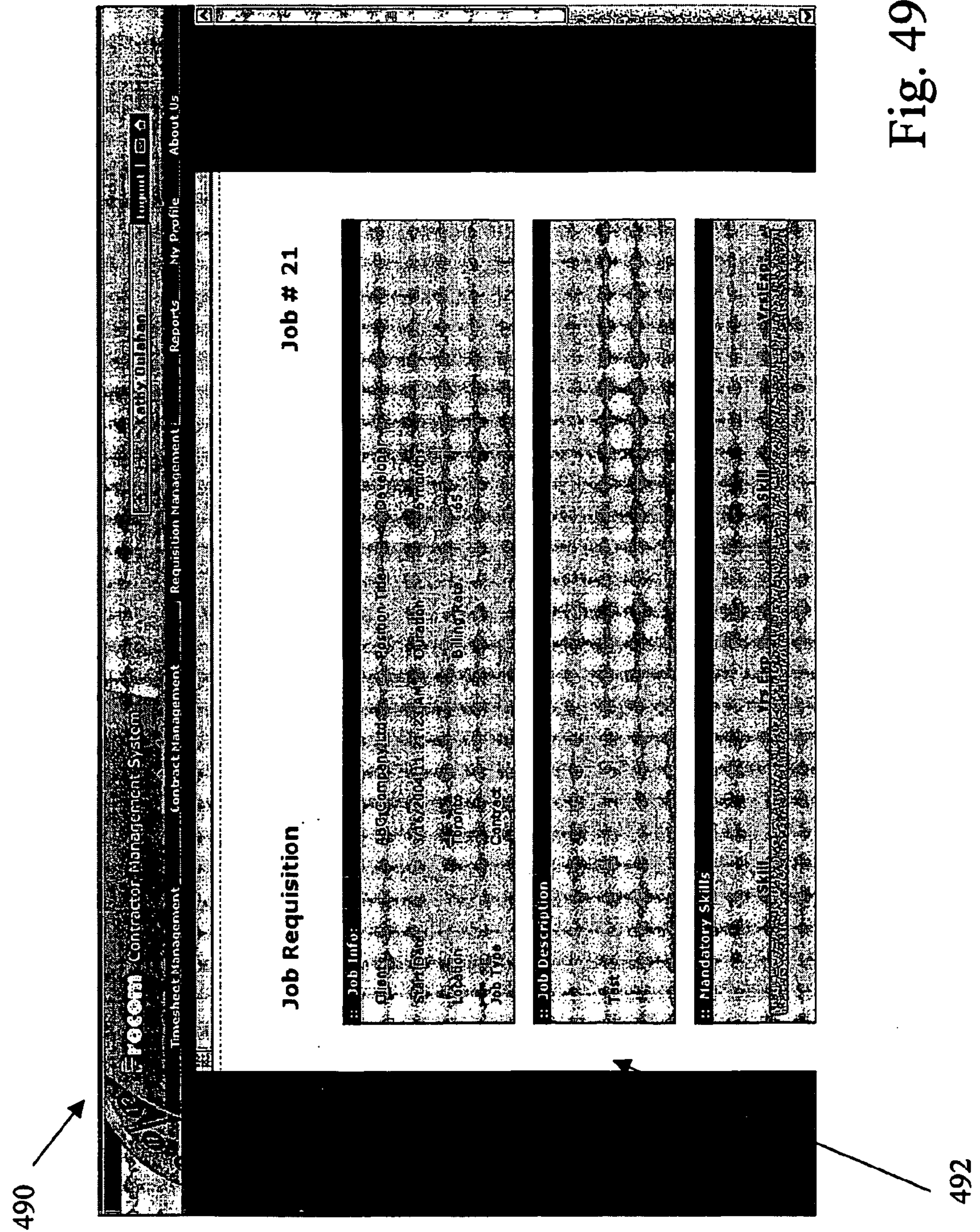

FIGS. 45 through 64 show sample user interfaces as might be viewed and interacted with by a supplier using the system of the present invention. FIG. 45 shows a sample timesheet 450 as approved by a client, including the contractor's name 452, client name 454, timesheet details 456 and various navigational tools as is known in the art. FIG. 45 also shows a text field 458 in which a supplier can submit comments for consideration by other system users, such as a supplier's accounting department, for example. FIG. 46 is a sample interface 460 indicating a supplier's ability to manage requisitions using the present invention. In FIG. 47, a sample interface 470 is shown which allows a supplier to submit candidate information for a particular requisition answer. Such information can include, for example, name 471, job number 472, availability 473, rate 474, skills summary 475, and comments 476. FIG. 48 shows a sample supplier interface 480 for selecting a particular requisition to manage, and FIG. 49 shows the detail 490 of a selected requisition 492.

Figure 50:
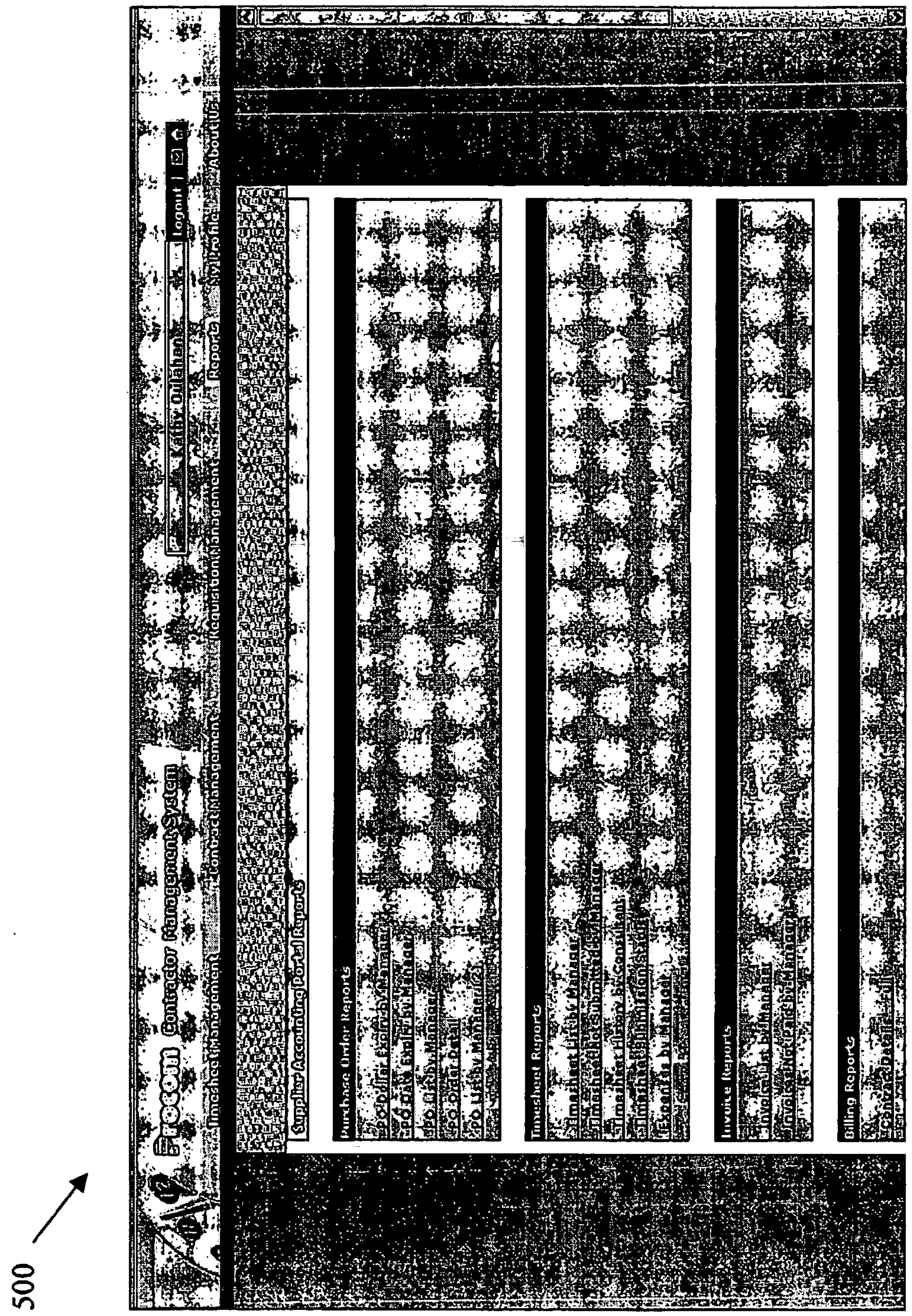
Figure 51:
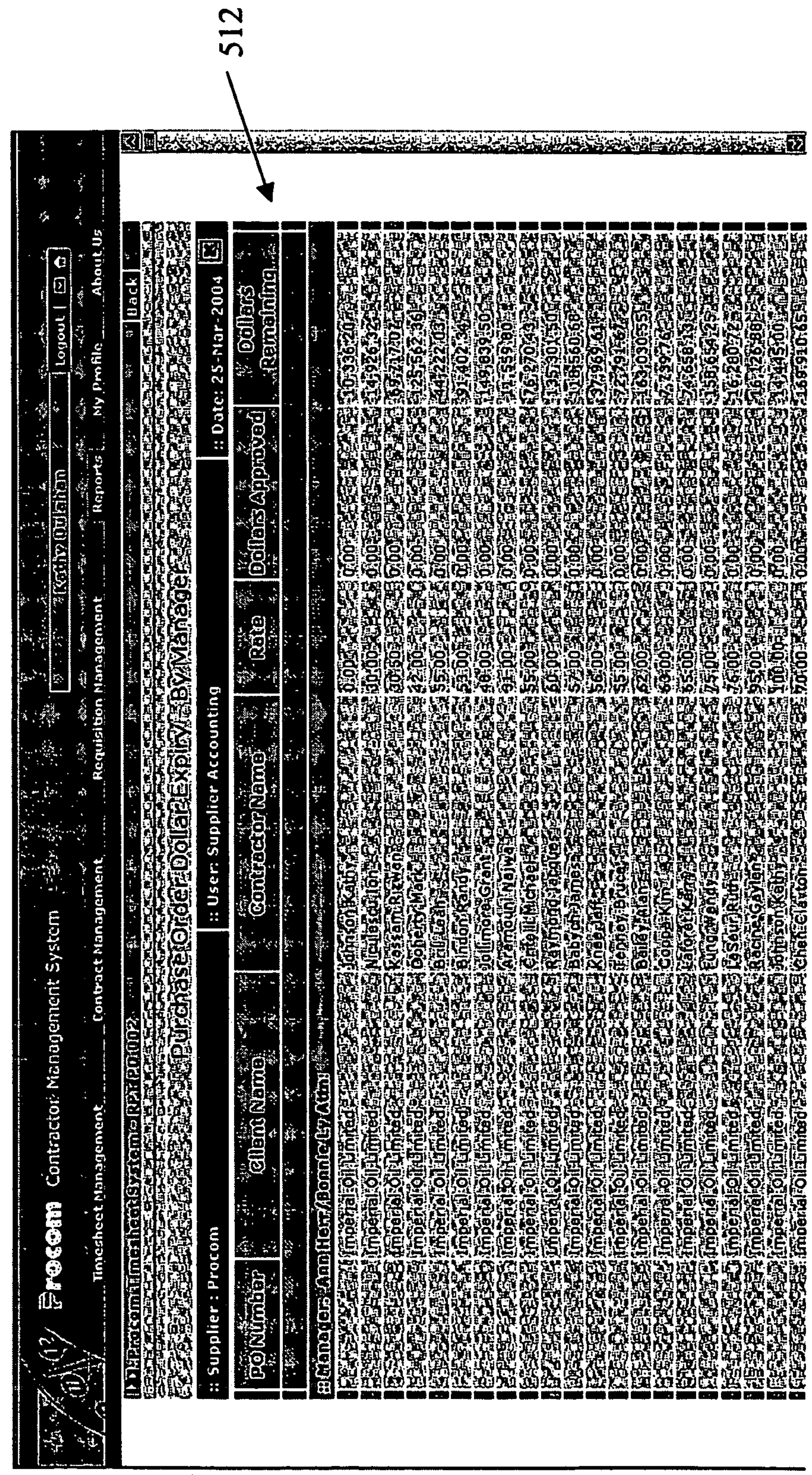
Figure 52:
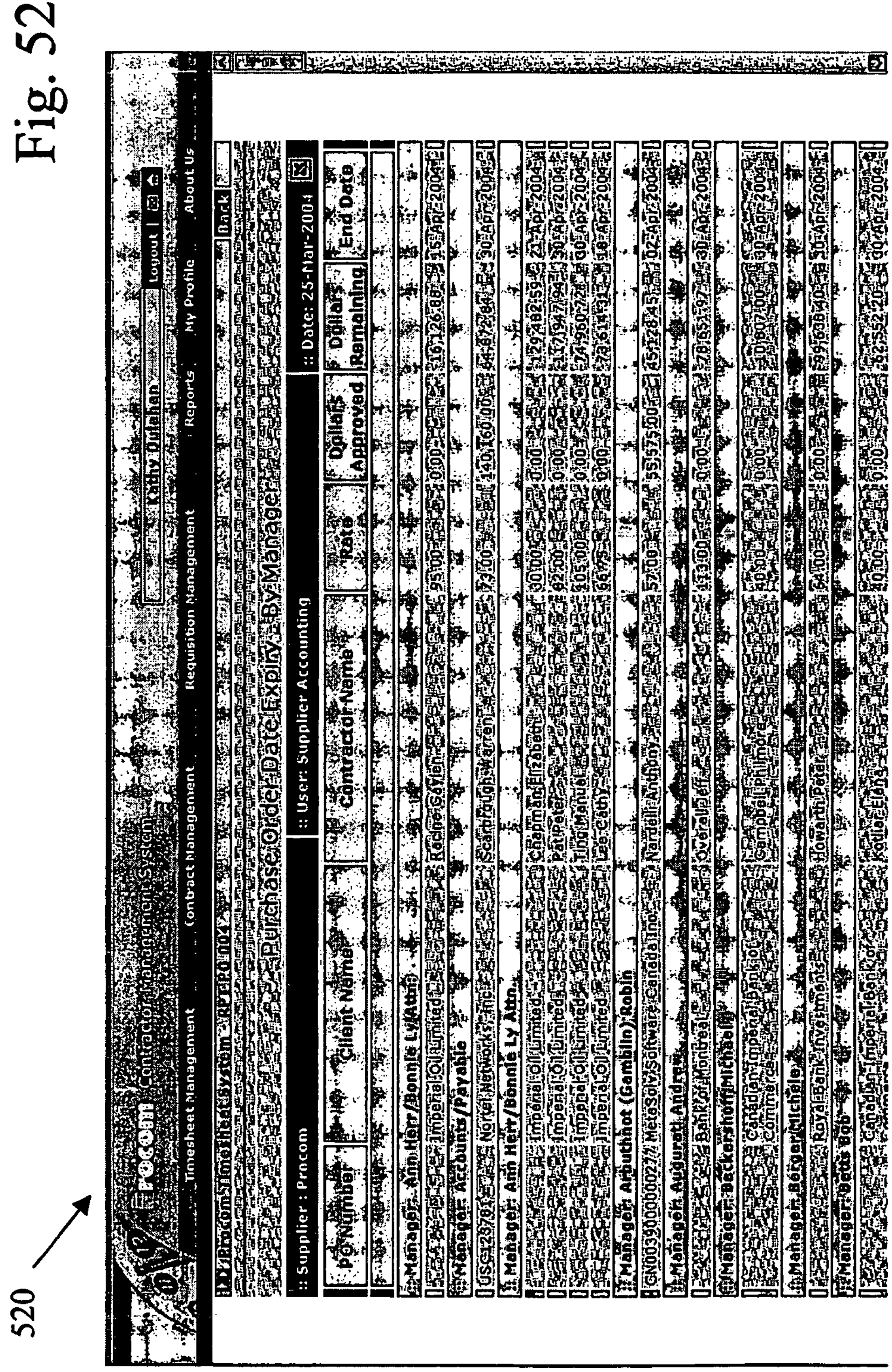
Figure 53:
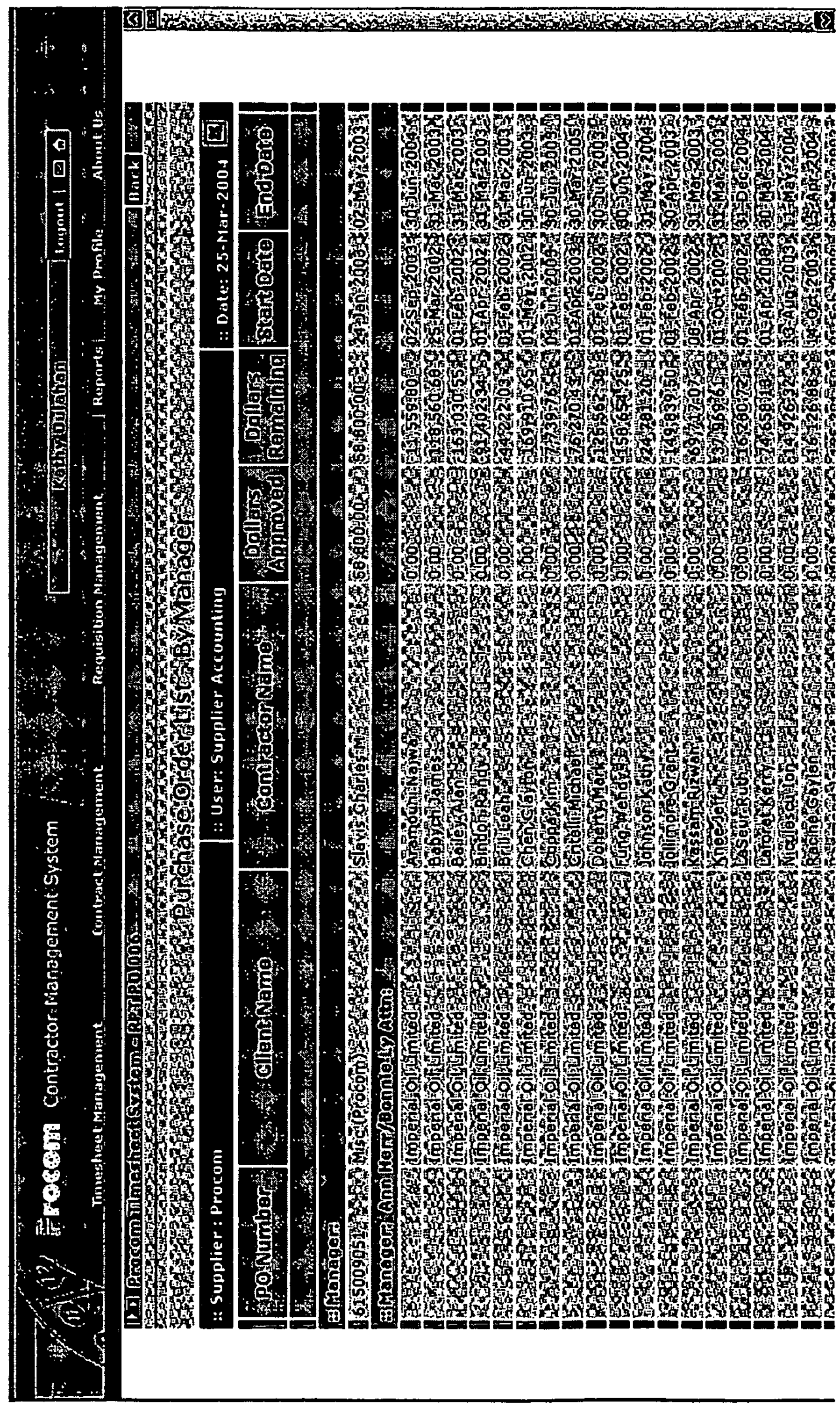
Figure 54:
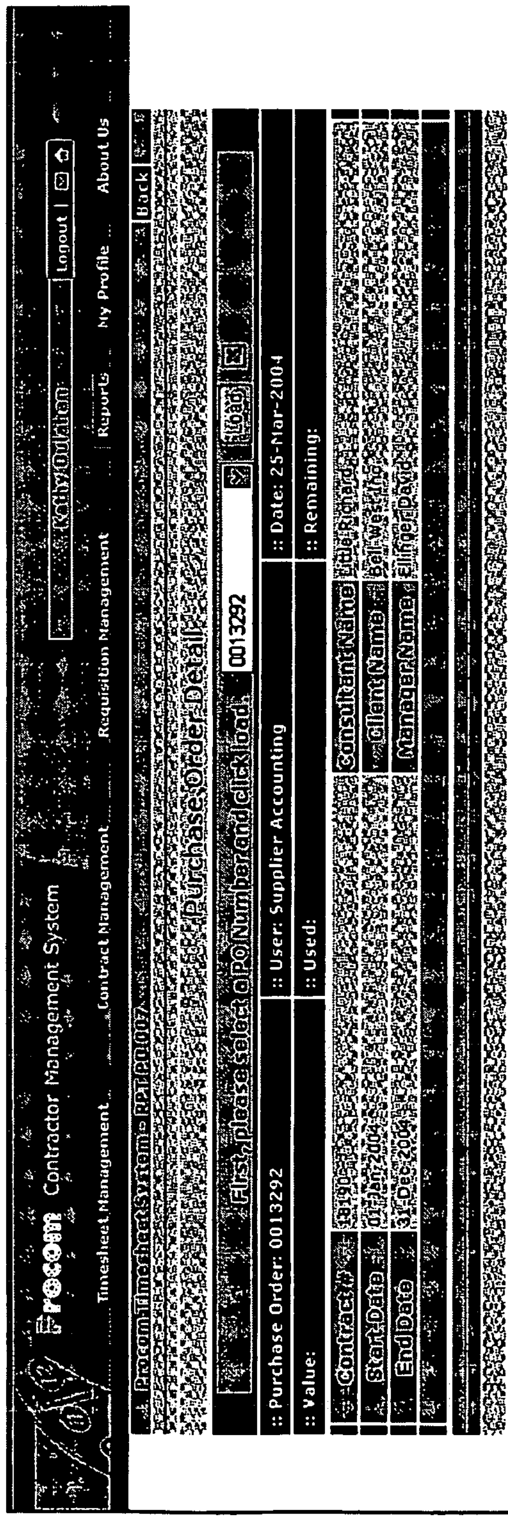
Figure 56:
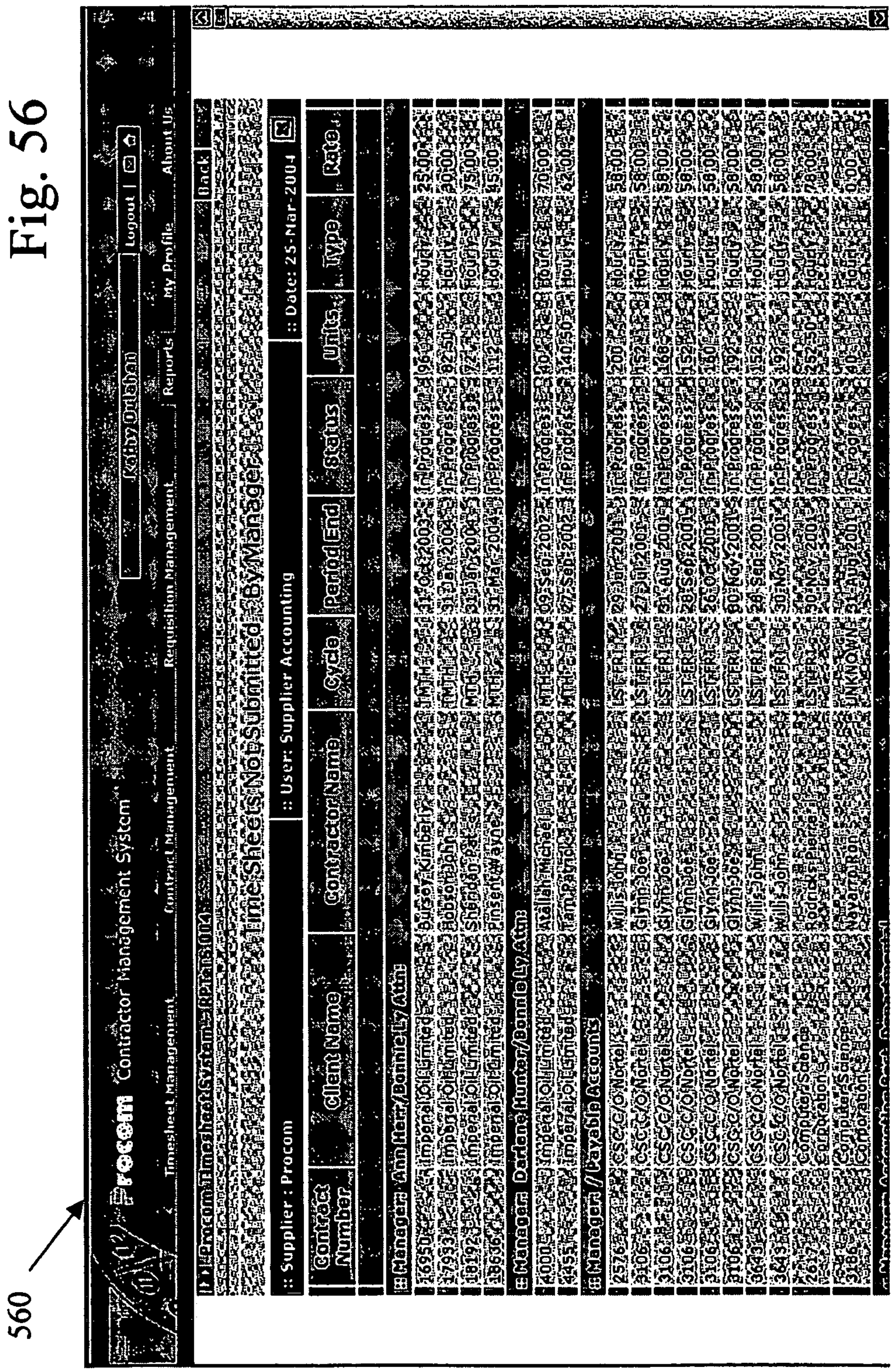
Figure 58:
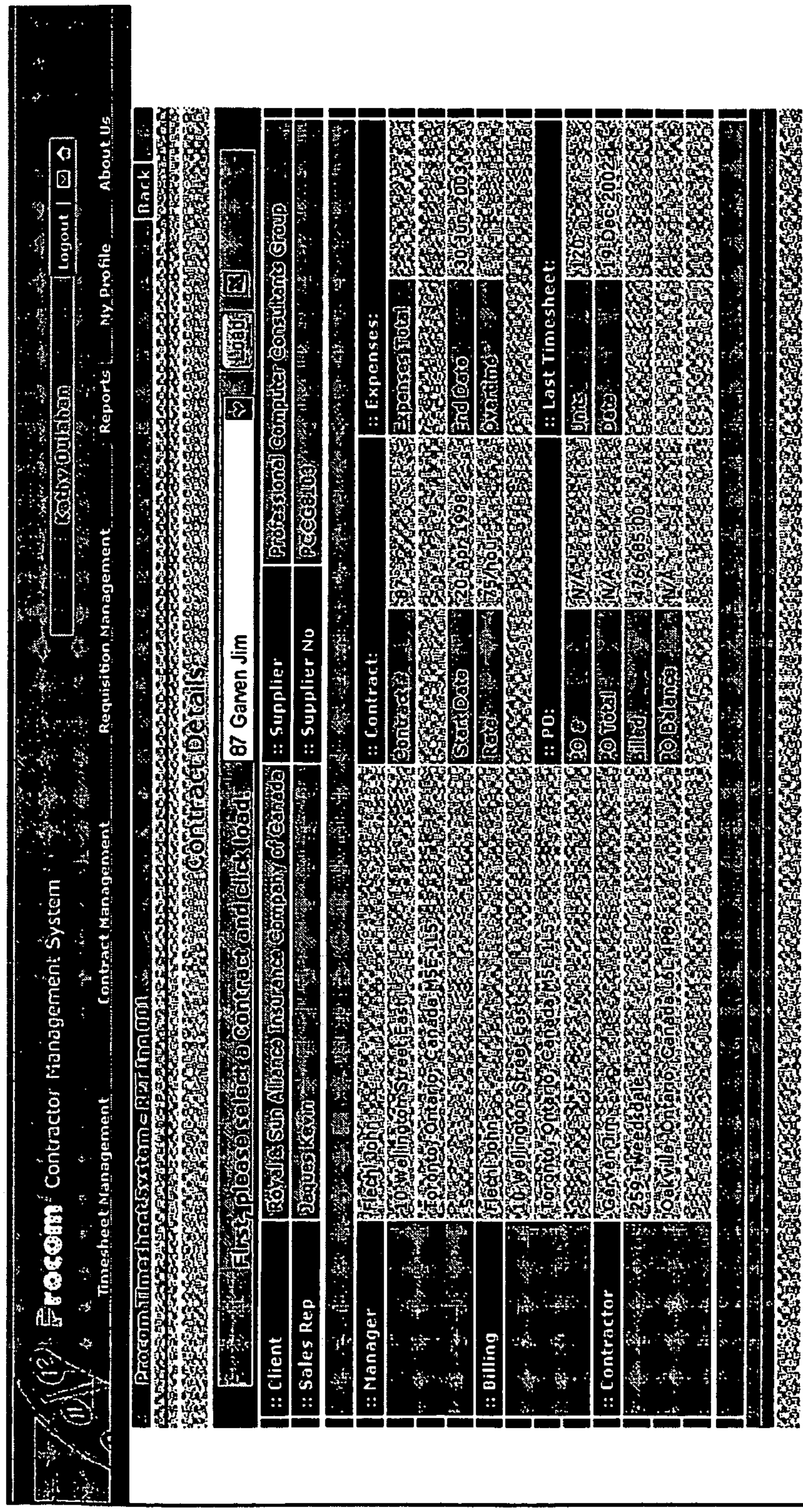
Figure 60:
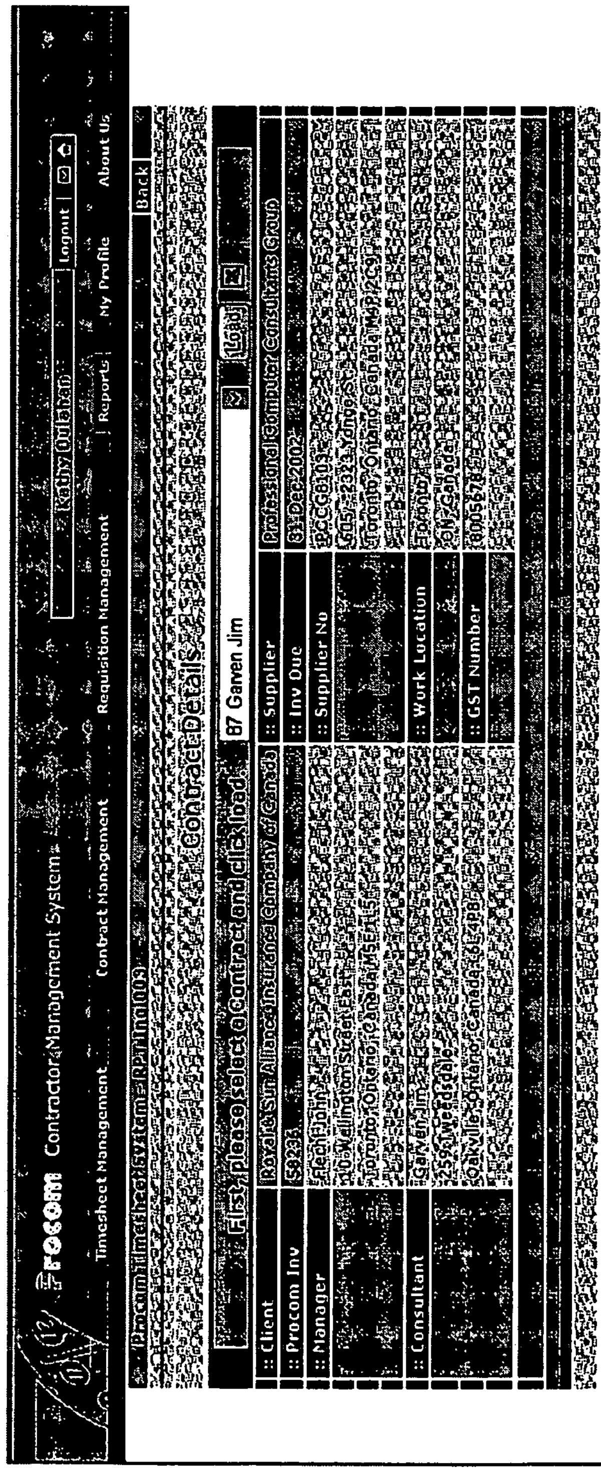
Figure 61:
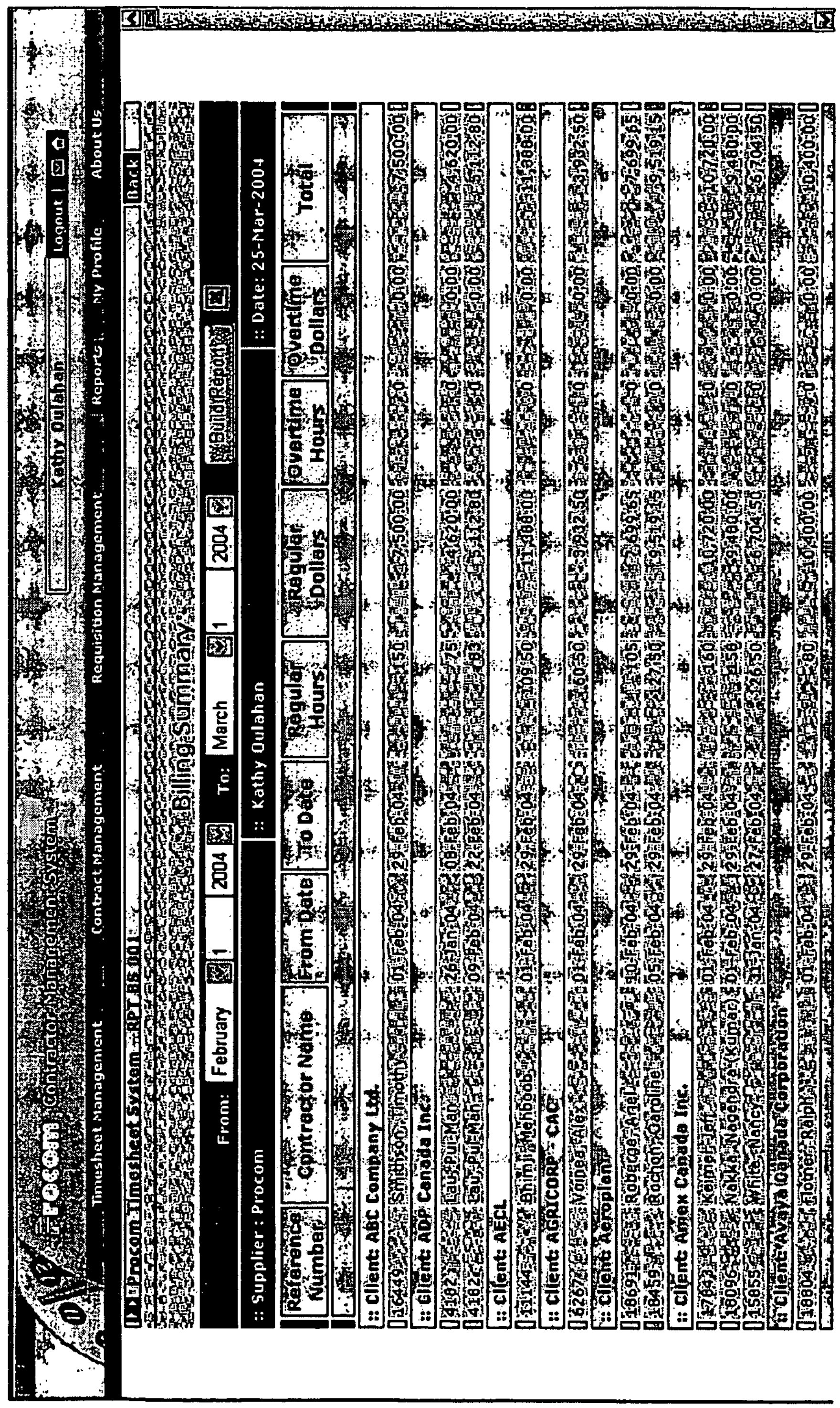

FIG. 50 indicates various report options 500 which can be selected and run by a supplier user of the present invention. Such reports can be, for example, a purchase order dollar expiry by manager, which is shown in greater detail in interface 510 of FIG. 51 including items 512 such as purchase order number, client name, contractor name, rate, dollars approved and dollars remaining, for example. Other purchase order (PO) reports from interface 500 can be: a purchase order date expiry by manager (shown in greater detail in interface 520 in FIG. 52), a purchase order list by manager (shown in greater detail in interface 530 in FIG. 53), and a purchase order detail (shown in greater detail in interface 540 in FIG. 54).

Figure 62:
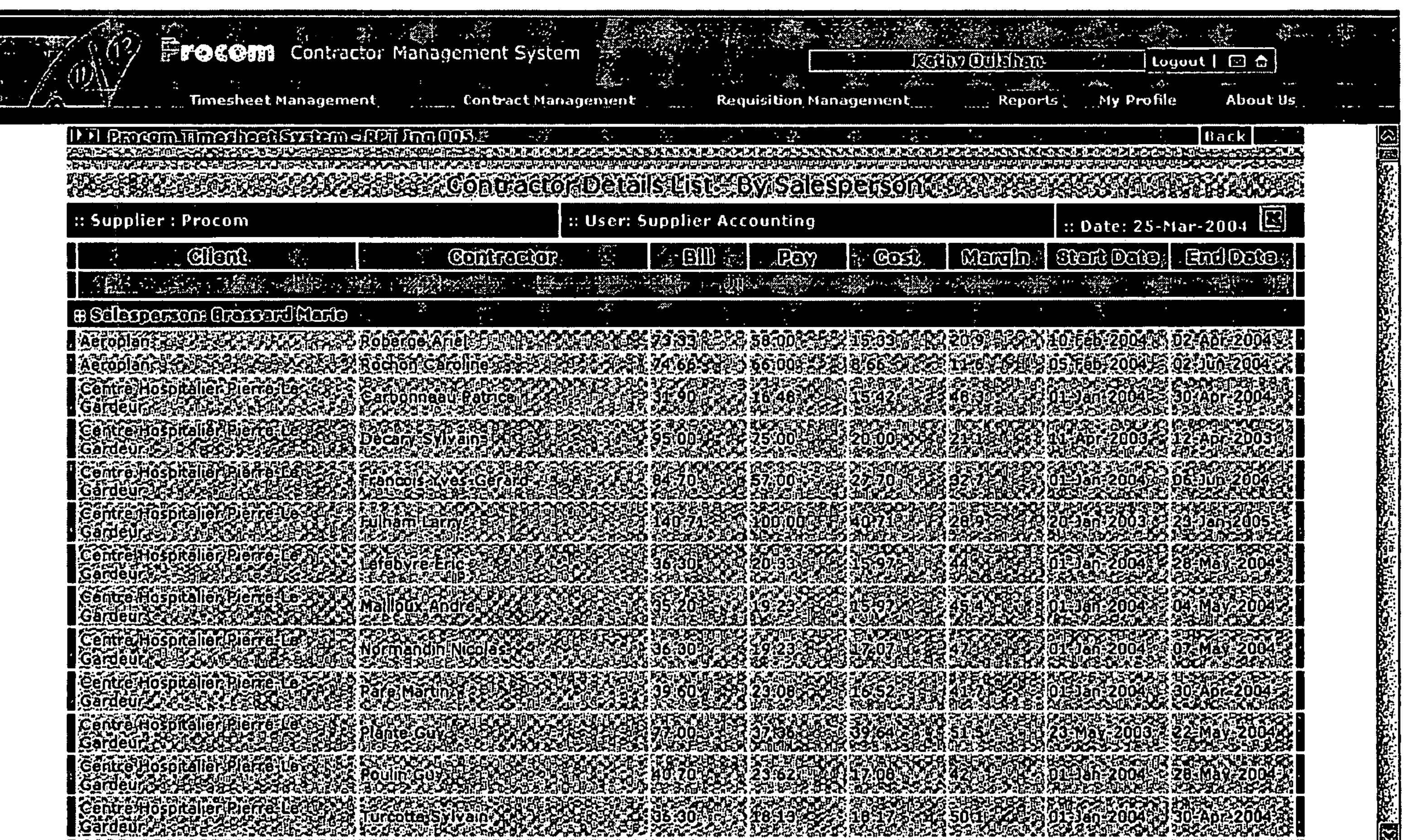
Figure 64:
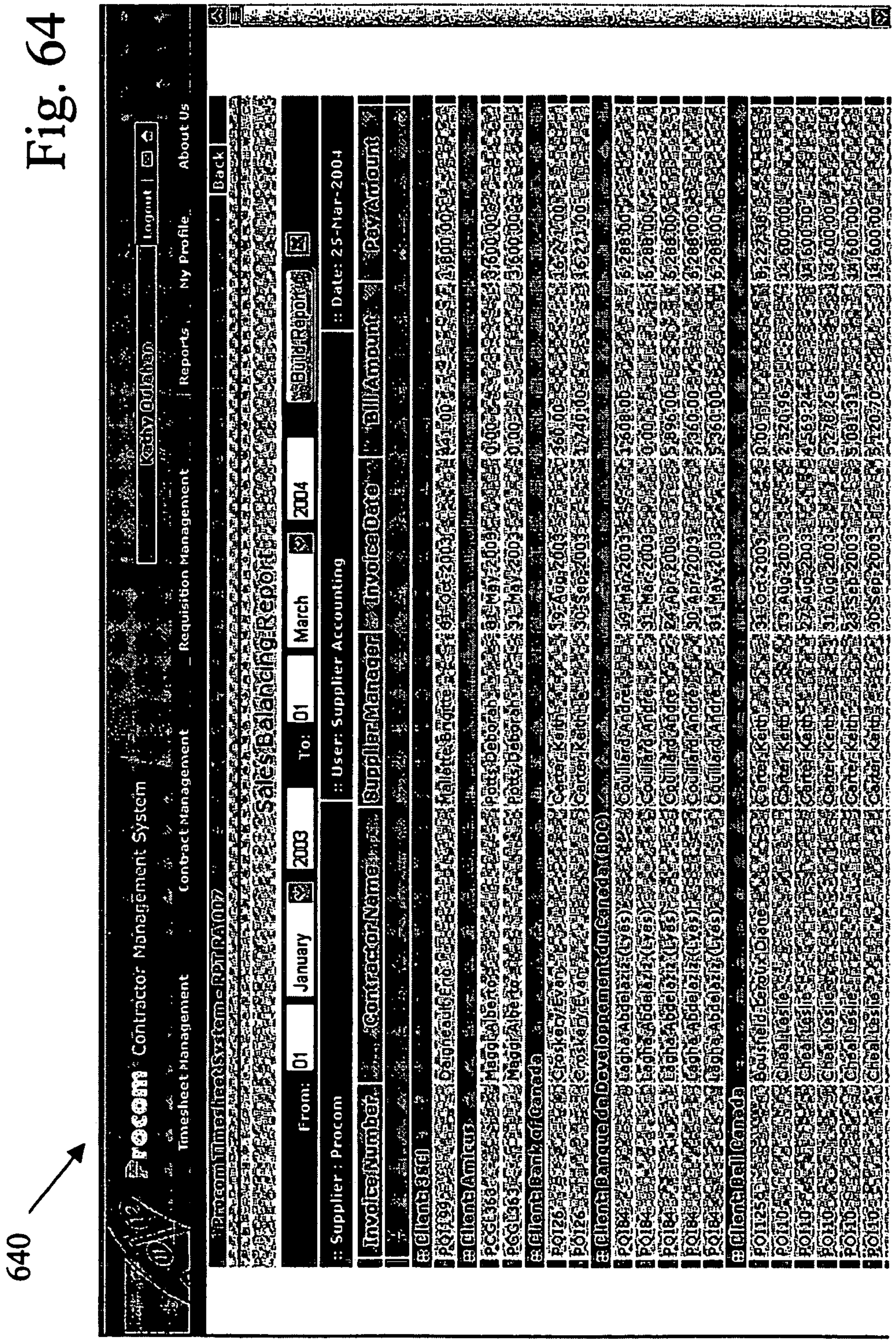
Figure 65:
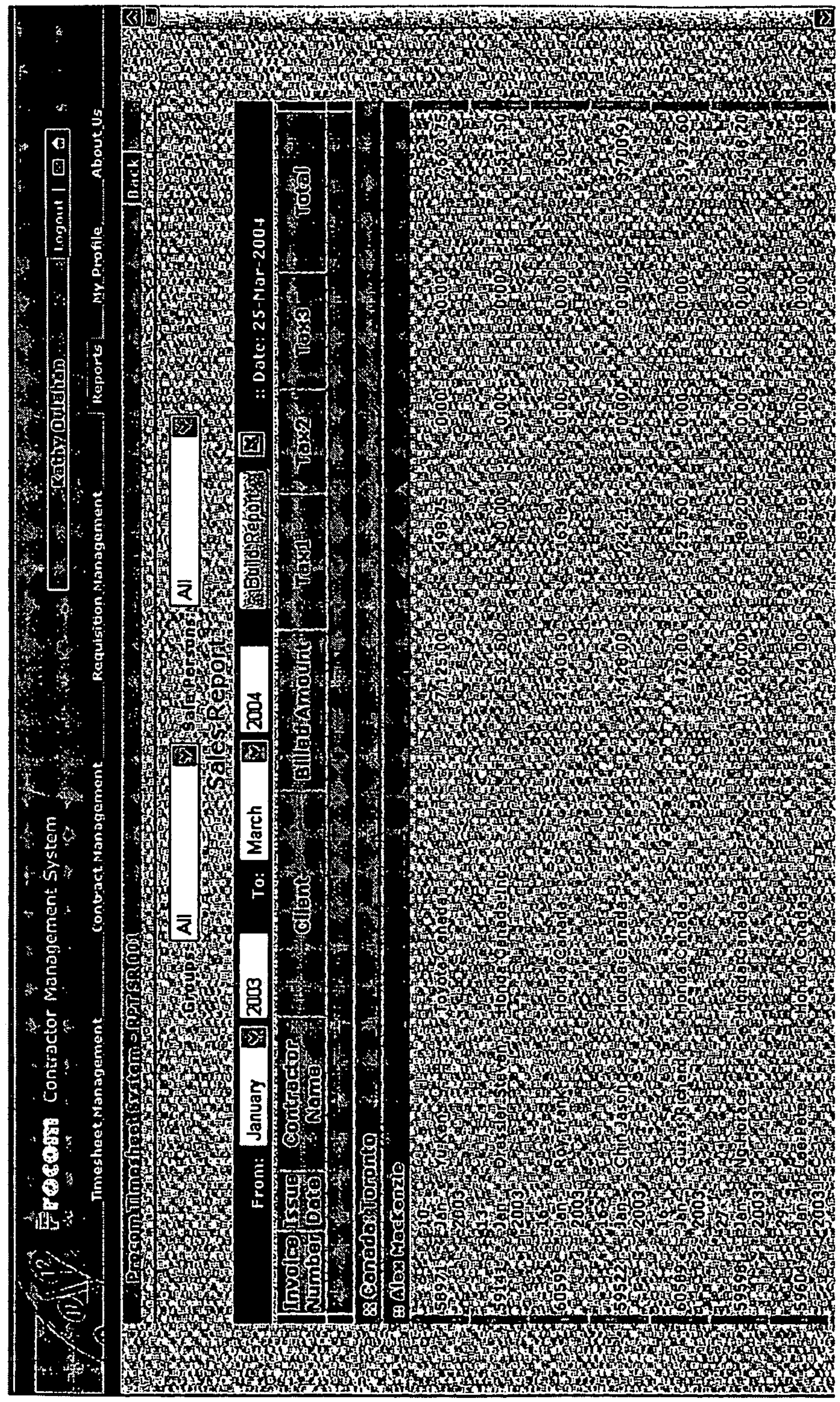

Timesheet reports can also be provided as shown in interface 500 in FIG. 50, including timesheet list by manager (detail shown in interface 550 in FIG. 55), timesheet not submitted by manager (detail shown in interface 560 in FIG. 56), and timesheet submission status (detail shown in interface 570 in FIG. 57). Billing reports can also be provided, such as full contract details as shown at 580 in FIG. 58, 590 in FIG. 59 and 600 in FIG. 60, as well as billing summary report 610 in FIG. 61. A sample contractor details list report by salesperson 620 is shown in FIG. 62, and a list of active contractors report 630 is shown in FIG. 63. A sales balancing report 640 is shown in FIG. 64 and a sales report 650 is shown in FIG. 65.

Figure 66:
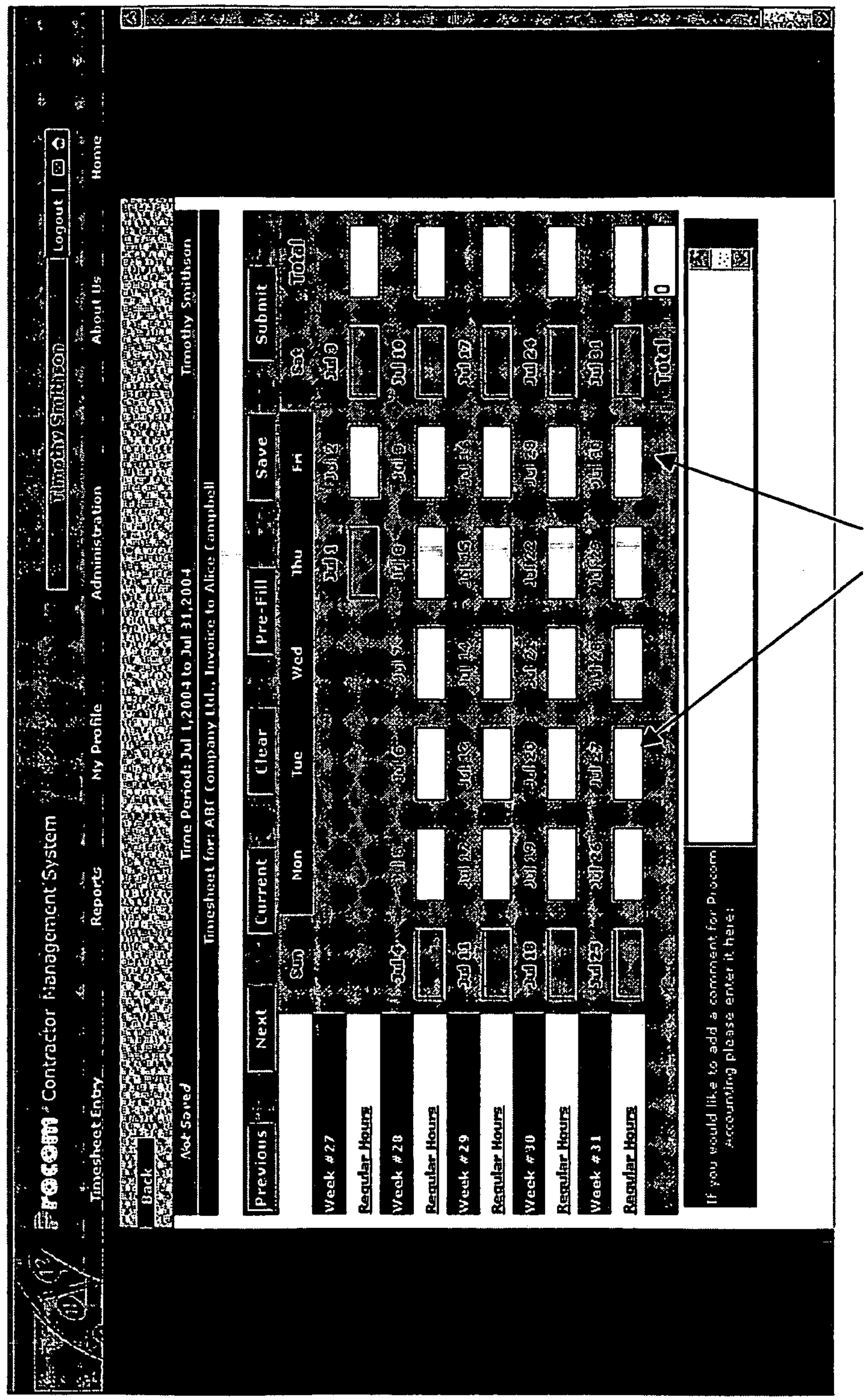
Figure 67:
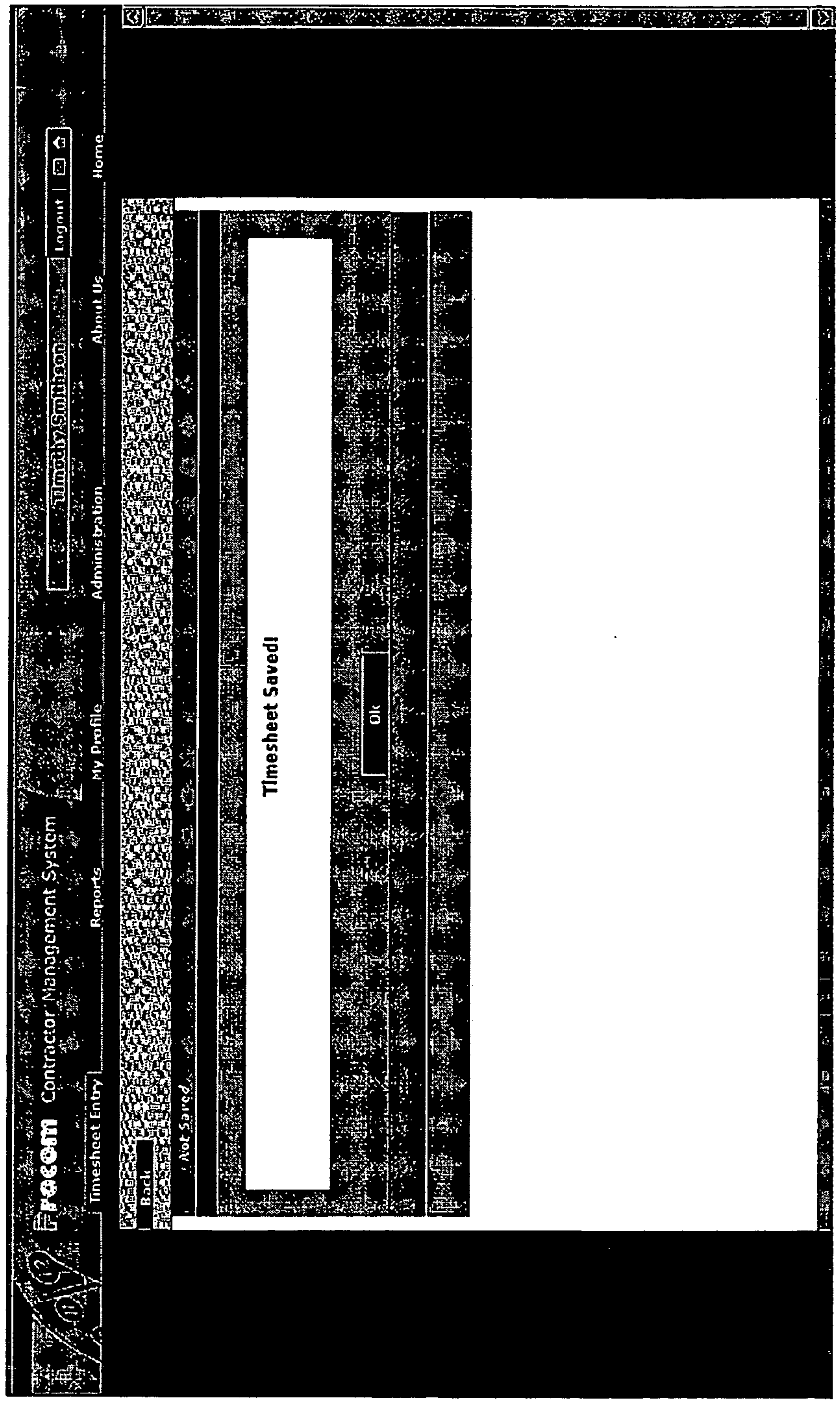
Figure 68:
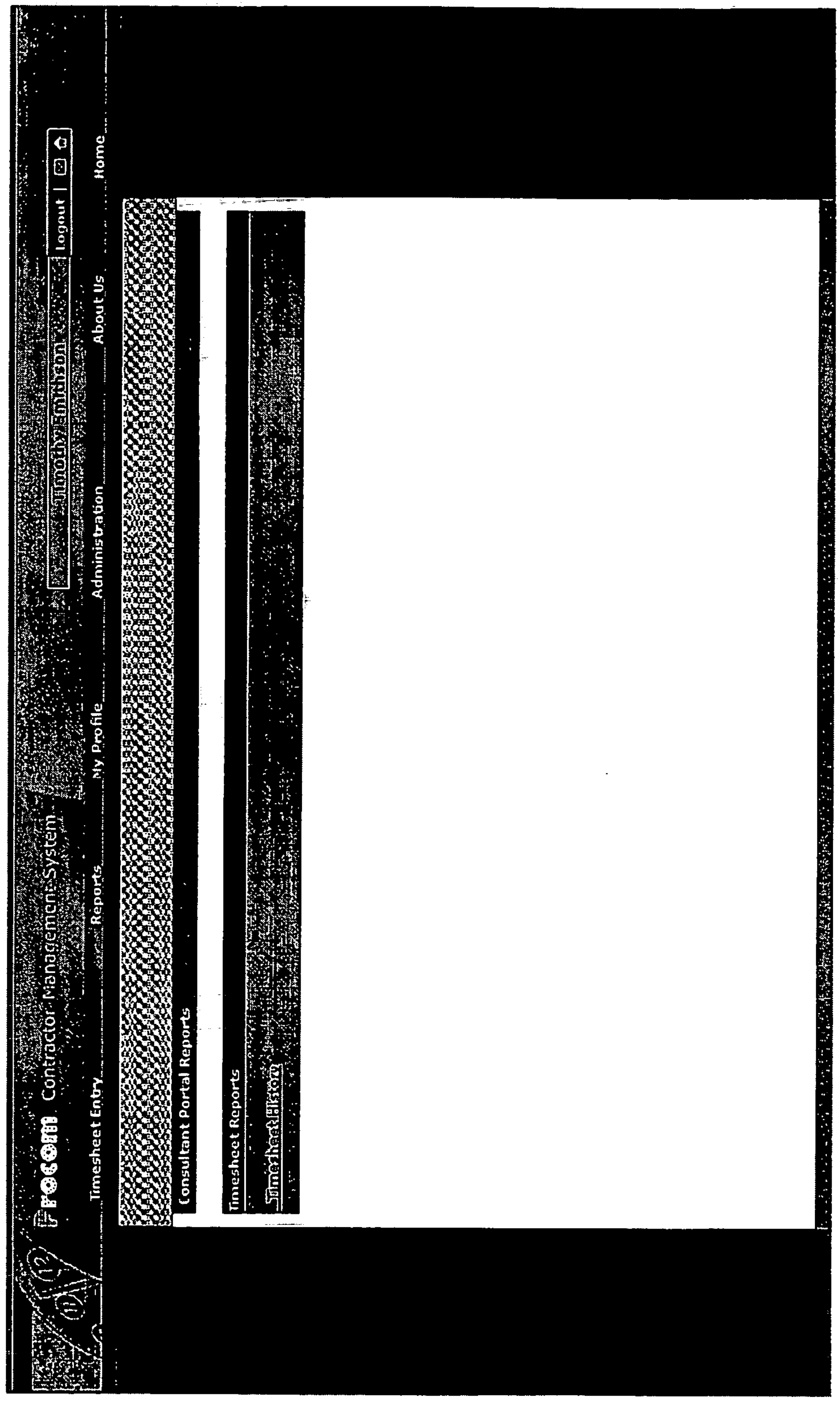
Figure 69:
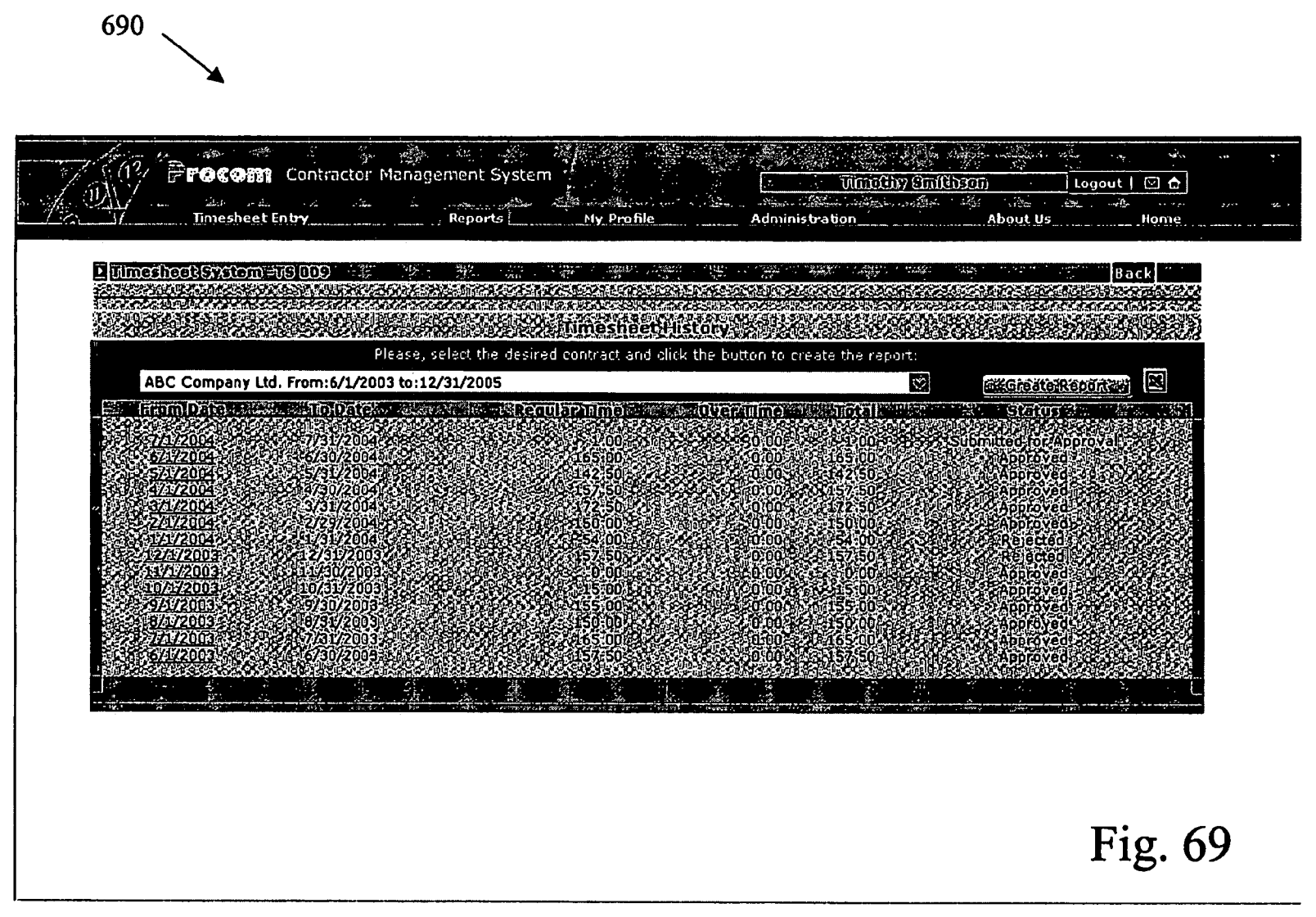

Consultant interfaces can also be provided, as shown, for example, in FIGS. 66 through 69. FIG. 66 shows a sample timesheet 660 with fields 662 for timesheet data entry. FIG. 67 shows a sample confirmation page 670 indicating successful timesheet entry. FIG. 68 is an interface 680 allowing a selection of a timesheet history report, and FIG. 69 shows a sample timesheet history report 690.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

What is claimed and desired to be secured by Letters Patent is:

1. An apparatus for managing time related work activities of at least one worker for at least one client, said apparatus comprising:

(a) a computer system, said computer system including a time sheet component for electronically transmitting to at least one client information related to time worked by at least one worker, said time sheet component further including a time sheet interface for allowing a first user to electronically record time worked by at least one worker for a given time period;

(b) said computer system further including a management component for automatically analyzing time electronically recorded by said first user by comparing time electronically recorded for a specified period by said first user to at least one predetermined cost management criteria to obtain cost management information relating to time electronically recorded by said first user; and (c) said computer system further including a communication component operably associated with said management component for automatically communicating to at least one user of said computer system cost management information obtained by said management component.

2. An apparatus as set forth in claim 1, wherein:

(a) said management component is a web site accessible by said client and said first user by way of a public network.

3. An apparatus as set forth in claim 1, wherein:

(a) said at least one predetermined cost management criteria is one of: (i) federal holidays, (ii) state holidays, (iii) at least one client specific business rule; (iv) required period to submit time sheet, (v) contract expiration; and (vi) purchase order exhaustion.

4. An apparatus as set forth in claim 3, wherein:

(a) said communication component communicates to at least one vendor cost management information obtained by said management component.

5. An apparatus as set forth in claim 1, wherein:

(a) said management component is accessible to said client so that said client can vary said at least one predetermined cost management criteria.

6. An apparatus as set forth in claim 1, wherein:

(a) said cost management information communicated to said at least one user includes at least one of funds remaining and days until purchase order is exhausted.

7. An apparatus for managing time related work activities of at least one worker for at least one client, said apparatus comprising:

(a) a computer system, said computer system including a time sheet component for electronically transmitting to at least one client information related to time worked by at least one worker, said time sheet component further including a time sheet interface for permitting a first user to electronically record time worked by at least one worker for a given time period; and, (b) said computer system further including a management component for preventing said first user from recording time on said time sheet interface where time sought to be entered does not comply with at least one predetermined criteria relating to one of purchase order exhaustion and contract expiration.

8. An apparatus as set forth in claim 7, wherein:

(a) said computer system further includes a communication component for informing at least one user other than said first user that time was attempted to be recorded that does not comply with said at least one predetermined criteria relating to one of purchase order exhaustion and contract expiration.

9. An apparatus for managing time related work activities of at least one worker for at least one client, said apparatus comprising:

(a) a computer system, said computer system including a time sheet component for electronically transmitting to at least one client information related to time worked by at least one worker, said time sheet component further including a time sheet interface for permitting a first user to electronically record time worked by at least one worker for a given time period; and, (b) said computer system further including a management component for treating differently time sought to be entered by said first user that does not comply with at least one predetermined criteria relating to one of purchase order exhaustion and contract expiration from time sought to be entered by said first user that does comply with at least one predetermined criteria relating to one of purchase order exhaustion and contract expiration.

10. An apparatus as set forth in claim 9, wherein:

(a) said management component provides a notification to at least one user that time sought to be entered does not comply with at least one predetermined criteria relating to one of purchase order exhaustion and contract expiration.

11. An apparatus as set forth in claim 9, wherein:

(a) said management component prevents entry of time that does not comply with at least one predetermined criteria relating to one of purchase order exhaustion and contract expiration.

12. An apparatus as set forth in claim 11, wherein:

(a) said management component is accessible by said client to allow said client to alter said at least one predetermined criteria to allow for entry of time even though the time sought to be entered did not comply with said at least one predetermined criteria prior to alteration by said client.

13. A method of electronically managing time related work activities of at least one worker for at least one client, said method including the steps of:

(a) providing an electronic time managing system for managing time related work activities, said time managing system including a time sheet component accessible by said at least one client and a first user;

(b) operating said time sheet component to allow a first user to electronically record time worked by said at least one worker for said at least one client;

(c) electronically monitoring time recorded by said first user to ascertain information relating to a purchase order issued by said at least one client for services of said at least one worker; and, (d) electronically transmitting updated purchase order information to a user based on said time electronically recorded by said first user.

14. A method as recited in claim 13, wherein:

(a) said updated purchase order information includes funds remaining for a given purchase order.

15. A method as recited in claim 13, wherein:

(a) said updated purchase order information includes number of working days until a given purchase order is exhausted.

16. A method as recited in claim 13, wherein:

(a) said updated purchase order information includes a notice to at least one user that a given purchase order is nearing exhaustion.

17. A method of electronically managing time related work activities of a plurality of workers for a single client, said method comprising the steps of:

(a) providing an electronic time managing system electronically accessible by said client and each of said plurality of workers;

(b) operating said electronic time managing system to allow each of said plurality of workers to electronically record data relating to time worked for said client;

(c) automatically consolidating said data relating to time electronically recorded by each of said plurality of workers; and (d) operating said electronic time managing system to allow at least one user to electronically access said consolidated data.

18. A method as recited in claim 17, further including the steps of:

(a) consolidating said data relating to time electronically recorded by each of said plurality of workers to form a consolidated invoice; and, (b) electronically transmitting said consolidated invoice to said client.

19. A method as recited in claim 18, further including the step of:

(a) storing time sheet details for each of said plurality of workers, said time sheet details include at least time worked by each of said plurality of workers for a given period;

(b) operating said electronic time managing system to allow said client to electronically access said time sheet details.

20. A method of electronically managing time related work activities of at least one worker for at least one client, said method comprising the steps of:

providing an electronic time managing system electronically accessible by said client and said at least one worker for managing time related work activities;

operating said electronic time managing system to allow at least one user to input information specific to said at least one user;

creating a user profile for said at least one user based on information input by said at least one user; and, operating said electronic time managing system based on said user profile.

21. A method as recited in claim 20, further including the step of:

(a) limiting access to said electronic time managing system based on said user profile.

22. A method as recited in claim 20, further including the step of:

(a) monitoring said user profile to ascertain at least one criteria of said at least one user; and, (b) adapting said electronic time managing system to satisfy said at least one criteria.

* * * * *